(12) United States Patent
Cumming

(10) Patent No.: US 7,979,330 B2
(45) Date of Patent: Jul. 12, 2011

(54) CONDITIONAL RATE MODELLING

(76) Inventor: Andrew Cumming, Wentworth Falls (AU)

( * ) Notice: Subject to any disclaimer, the term of this patent is extended or adjusted under 35 U.S.C. 154(b) by 1559 days.

(21) Appl. No.: 11/297,476

(22) Filed: Dec. 9, 2005

(65) Prior Publication Data

US 2006/0095292 A1 May 4, 2006

Related U.S. Application Data

(63) Continuation of application No. PCT/AU2004/000770, filed on Jun. 10, 2004.

(30) Foreign Application Priority Data

Jun. 10, 2003 (AU) ................................ 2003902883

(51) Int. Cl.
*G06Q 40/00* (2006.01)

(52) U.S. Cl. ........................................ 705/35; 705/36 R
(58) Field of Classification Search ............... 705/35–45
See application file for complete search history.

(56) References Cited

U.S. PATENT DOCUMENTS

| 5,761,386 | A | 6/1998 | Lawrence et al. |
| 5,812,988 | A | 9/1998 | Sandretto |
| 6,343,272 | B1 * | 1/2002 | Payne et al. ................. 705/4 |
| 6,381,554 | B1 | 4/2002 | Matsuo et al. |
| 7,590,581 | B1 * | 9/2009 | Payne et al. ............. 705/36 R |
| 7,756,770 | B2 * | 7/2010 | Dembo et al. ........... 705/36 R |
| 2003/0014356 | A1 | 1/2003 | Browne et al. |

* cited by examiner

*Primary Examiner* — Richard C Weisberger
(74) *Attorney, Agent, or Firm* — Connolly Bove Lodge & Hutz LLP

(57) ABSTRACT

A system for generating a model of unknown values of several rate series at specified times includes a computing device configured to receive input indicative of the parametric model type of the unconditional rate dynamics; receive input indicative of a known or unknown rate value for each rate series and for each specified time into the computing device; generate the values of the known rate changes; generate an unconditional multidimensional probability distribution of the known and unknown rate changes; generate a multidimensional probability distribution of the unknown rate changes conditional on the known rate changes taking their known values; and provide output from the computing device indicative of the modelled values of the unknown values of the several rate series. The several rate series have unconditional rate dynamics characterized by a parametric model type in several dimensions, each rate series having at least one known value.

47 Claims, 2 Drawing Sheets

CONDITIONAL RATE MODELLING

CROSS REFERENCE TO RELATED APPLICATIONS

This application is a Continuation of Application PCT/AU04/000770 filed on Jun. 10, 2004. Application PCT/AU04/000770 claims priority for Australian Application 2003902883 filed on Jun. 10, 2003. The entire contents of each of PCT/AU04/000770 and AU2003902883 is incorporated herein by reference.

FIELD OF THE INVENTION

The invention relates to conditional rate modelling of market rates and, in particular, to modelling unknown values of several rate series at specified times.

The invention has been developed primarily for use in modelling the zero coupon rate curves of several bond issuers given limited trading data and will be described hereinafter with reference to this application. However, it will be appreciated that the invention is not limited to this particular field of use.

BACKGROUND OF THE INVENTION

Institutions that are active in financial markets routinely apply mathematically based models to value financial instruments in their trading portfolios. A valuation model typically takes as input the current values of a number of market rates and gives as output a theoretical price, or fair value, of the instrument in question. This allows the valuation of a financial instrument that may not have been traded recently, provided that the input market rates are available.

These input market rates are typically the traded prices of simpler financial instruments of which an example is a foreign exchange rate. Market rates are only known if the trade took place in the relevant instrument during the time interval of interest. If a trade did not take place, one could use the rate corresponding to the last trade that took place, but that will cause inaccuracy because of the lack of currency of the rate.

A basic use of valuation models is to determine the daily profit and loss of trading portfolios. This involves comparing the value of a trading portfolio at the end of one day with its value at the end of the previous trading day, and requires the valuation of financial instruments that may not have traded in the course of the trading day. Valuation models are also used to inform trading decisions and to assess the risks arising out of trading portfolios. Market risk is the risk of the value of a trading portfolio decreasing. Credit risk is the risk of a counter-party of a trade defaulting on contractual obligations. The amount of loss attributable to a default depends, at least in part, on the market value of the trades of the defaulting counter-party at the time of default.

The analysis of market risk involves making probabilistic assumptions as to how market rates may change in the future. The impact of possible market rate changes on the value of the trading portfolio is then quantified and various measures of risk can be calculated.

A common method of market risk assessment is historical simulation. Historically observed rate changes of several rate series together are assumed to be statistically independent and to form a representative random sample and are applied to current rates. The resulting sets of rates (one for each historical time interval) are then used to revalue an existing trading portfolio. This gives a set of a hypothetical future portfolio values used to calculate measures of market risk arising out of the trading portfolio. However, this method disadvantageously requires gaps in the historical rate series to have been filled before the analysis begins. It also assumes that a complete set of current rates exists.

One known approach is to set each unknown rate to its previous known value. This can cause long sequences of repeated values, which leads to underestimation of risk, and sudden large jumps to the next known value, which leads to overestimation of risk.

Another approach is to fill gaps in each rate series by linearly interpolating between the known rates. This involves graphing, for each rate series, the known values, drawing straight lines between consecutive known values and reading off the unknown rates from the resulting graph. This approach tends to cause underestimation of risk because it ignores the inherent variation in rates and does not take into account the fact that the rate series are correlated.

A significant disadvantage of prior art methods of modeling unknown rates is that they do not take into account all known rates, including those of other rate series and those known at other times, that are related to the unknown rates. The effect of this is inaccuracy in any pricing or analysis of risk that depends on such rates.

OBJECT OF THE INVENTION

It is an object of the present invention to provide a method of modelling unknown values of several rate series at specified times that overcomes or substantially ameliorates one or more of the disadvantages of the prior art, or to provide a useful alternative.

SUMMARY OF THE INVENTION

According to a first aspect of the invention there is provided a computer-implemented method of modelling unknown values of several rate series at specified times, the several rate series having unconditional rate dynamics characterised by a parametric model type in several dimensions and each rate series having at least one known value, the method comprising the steps of:

specifying the parametric model type of the unconditional rate dynamics;
  specifying a known or unknown rate value for each rate series and for each specified time;
  calculating the values of the known rate changes;
  calculating an unconditional multidimensional probability distribution of the known and unknown rate changes; and
  computing a multidimensional probability distribution of the unknown rate changes conditional on the known rate changes taking their known values.

According to a second aspect of the invention there is provided a computer-implemented method of modelling the dynamics of specified zero coupon rate series of one or more bond issuers at specified trading dates conditional on specified trades in bonds of the issuers, the specified zero coupon rate series having unconditional dynamics characterised by a parametric model type in several dimensions, the method comprising the steps of:

specifying the unconditional dynamics of the specified zero coupon rate series;
  specifying the trades in the bonds of the one or more issuers; and
  calculating iteratively the dynamics of the specified zero coupon rate series at the specified trading dates conditional on the specified trades in the bonds of the one or more issuers.

According to a third aspect of the invention there is provided a computer-implemented method of modelling the dynamics of specified zero coupon rate series of one or more bond issuers at specified trading dates conditional on specified trades in bonds of the one or more issuers, the number of specified zero coupon rate series of each issuer being equal and the specified zero coupon rate series determining zero coupon rate spread series having unconditional dynamics characterised by a parametric model type in several dimensions, the method comprising the steps of:

specifying the unconditional dynamics of the determined zero coupon rate spread series;

specifying the trades in the bonds of the one or more issuers; and calculating iteratively the dynamics of the specified zero coupon rate series at the specified trading dates conditional on the specified trades in the bonds of the one or more issuers.

According to a fourth aspect of the invention there is provided a computer-implemented method of detecting the known values, of several rate series at specified times, that are extreme, the method comprising the steps of:

assigning a known or unknown rate value for each rate series and for each specified time;

specifying a subset of the known rates comprising those that are to be accepted without question;

specifying a confidence level and constructing, for each known rate that is not to be accepted without question and for each subset of the known rates that does not include the given known rate and that includes the known rates that are to be accepted without question, a confidence interval, based on the given confidence level, for the given rate conditional on the rates belonging to the given subset taking their known values; and iteratively constructing a subset of the known rates that are not to be accepted without question such that, for each rate belonging to the subset, the value of the rate does not lie within the confidence interval, based on the given confidence level, constructed for the rate conditional on the known rates which do not belong to the subset taking their known values, and for each known rate that does not belong to the subset and that is not to be accepted without question, the value of the rate lies within the confidence interval, based on the given confidence level, constructed for the rate conditional on the known rates, with the exception of the given known rate, which do not belong to the subset taking their known values.

According to another aspect of the invention there is provided a computer-implemented method of modelling the dynamics of specified maturity-parameterised rate series at specified times conditional on specified observed values of the rate series, each rate series being assigned specified maturities and the rate series with their specified maturities having unconditional dynamics characterised by a parametric model type in several dimensions, the method comprising the steps of:

specifying the unconditional dynamics of the specified rate series with their specified maturities;

specifying the observed values of the specified rate series; and calculating iteratively the dynamics of the specified rate series at the specified times conditional on the specified observed values of the rate series.

It can be seen that there is provided a method of modelling unknown values of several rate series at specified times which provides more accurate results than can be obtained by using prior art methods.

BRIEF DESCRIPTION OF THE DRAWINGS

Preferred embodiments of the present invention will now be described, by way of example only, with reference to the accompanying drawings in which.

It will be understood that throughout the detailed description of the invention and in the claims, when some one or more given rate series have, at some given times, unconditional dynamics "characterised by a defined parametric model type", the defined parametric model type is to mean:

the parametric model type of each rate series is unconditionally Brownian Motion or Geometric Brownian Motion, and the parametric model type of the one or more rate series together is unconditionally Brownian Motion, Geometric Brownian Motion or a combination of the two, and, for each rate series, there are assigned a standard deviation and a mean of the rate series changes per unit interval of time, and, for each pair of rate series, there is assigned a correlation coefficient of the rate series changes per unit interval of time; or the parametric model type of each rate series is unconditionally mean-reverting Brownian Motion or mean-reverting Geometric Brownian Motion, and the parametric model type of the one or more rate series together is unconditionally mean-reverting Brownian Motion, mean-reverting Geometric Brownian Motion or a combination of the two, and, for each rate series, there are assigned a standard deviation and a mean of the rate series changes per unit interval of time, a long-term average value of the rate series and a speed of mean reversion, and, for each pair of rate series, there is assigned a correlation coefficient of the rate series changes per unit interval of time; or the rate series changes are unconditionally normal, and, for each rate series change over a time interval determined by consecutive times, there are assigned a standard deviation and a mean of the rate series changes, and, for each pair of rate series changes over time intervals determined by consecutive times, there is assigned a correlation coefficient of the rate series changes.

DETAILED DESCRIPTION OF THE PREFERRED EMBODIMENTS

Figure 1:
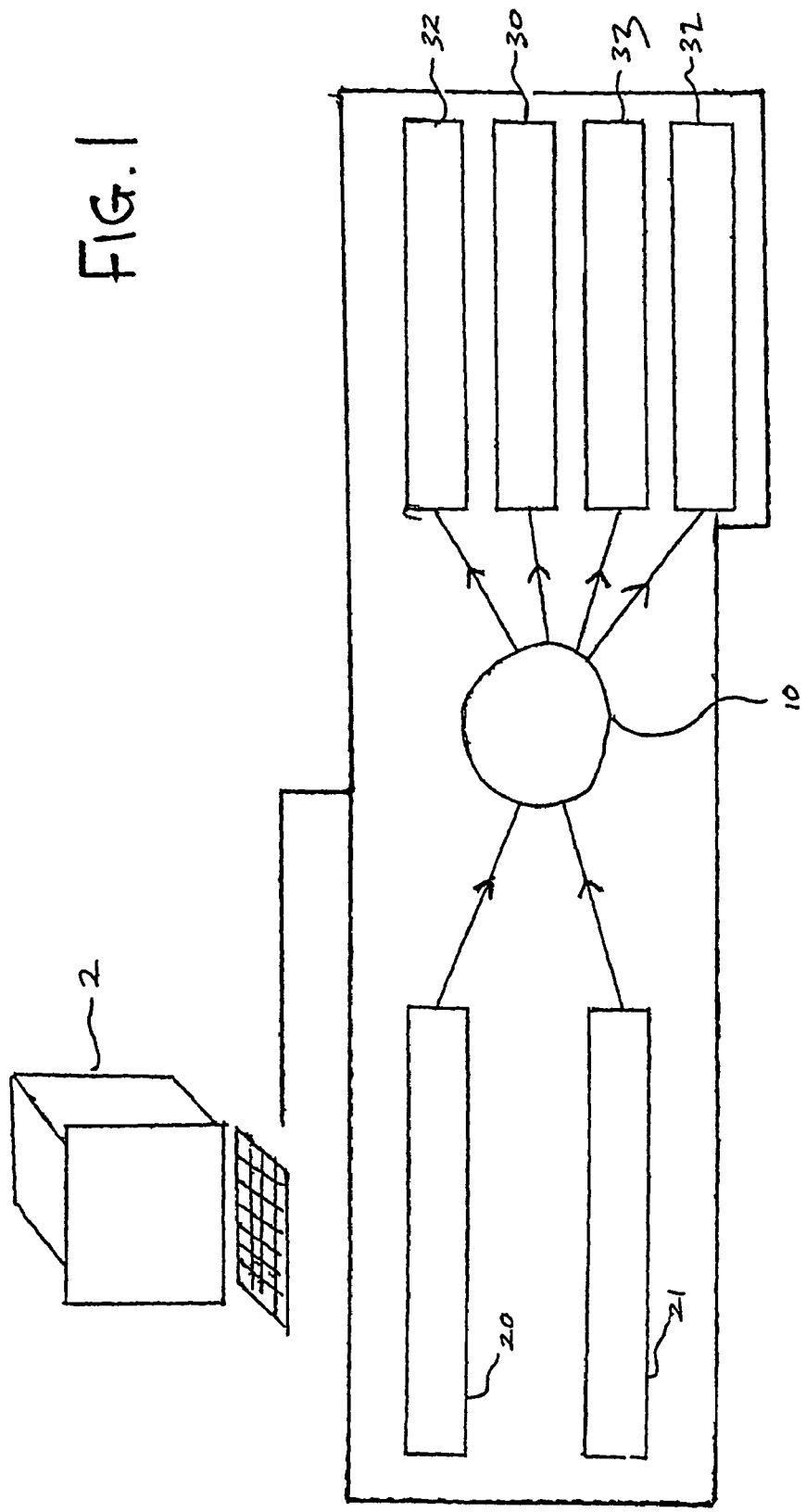
FIG. 1 is a block diagram of a modelling system according to a preferred embodiment.

Referring to FIG. 1, the modelling system 1 is software installed on a computer 2 and comprises a modelling engine 10 which processes two sets of input data taken from two input files 20 and 21. The first file contains the unconditional rate dynamics 20 for the several rate series and the second file contains the incomplete rate data 21 for the several rate series.

The unconditional rate dynamics is stored in tabular form. There is a first table where each column corresponds to a rate series and where there are three rows, the first corresponds to the parametric model type of the rate series (Brownian Motion or Geometric Brownian motion), the second row corresponds to the standard deviation of the rate changes per unit interval of time for the rate series, and the third row corresponding to the mean of the rate changes per unit interval of time for the rate series. Each cell of the table contains a specification of the relevant parameter. There is a second table where both of the rows and the columns correspond to rate series and each cell in the table contains the value of the correlation coefficient of the rate changes for the pair of rate series determined by the rows and the column of the cell.

The incomplete rate data is also stored in tabular form. There is a table where each column corresponds to a rate series, each row corresponds to a specified point in time and each cell in the table contains a rate value for the rate series determined by the column of the cell at the point in time determined by the row of the cell. The rows are ordered in ascending order of the associated points in time. Rate values are either known or unknown.

Each unknown rate value is indicated by an asterisk "*" and each known rate value is indicated by the known numerical value. On selection, the modelling engine can generate any one of four sets of outputs for storage into an output files. The first set of outputs comprises the marginal distributions 30 of the unknown rate values or of the unknown rate changes over time intervals determined by successive points in time. The remaining three sets of outputs 31, 32 and 33 each comprise filled values for the unknown values so as to complete the incomplete rate data 21. The second set of outputs fills the unknown values using expected rate changes 31. The third set of outputs fills the unknown values using expected values 32. The fourth set of outputs fills the unknown values using simulated values 33. The simulated values 33 can be generated any number of times with freshly simulated values for each simulation. For each simulation, the unknown values are all simulated together.

Figure 2:
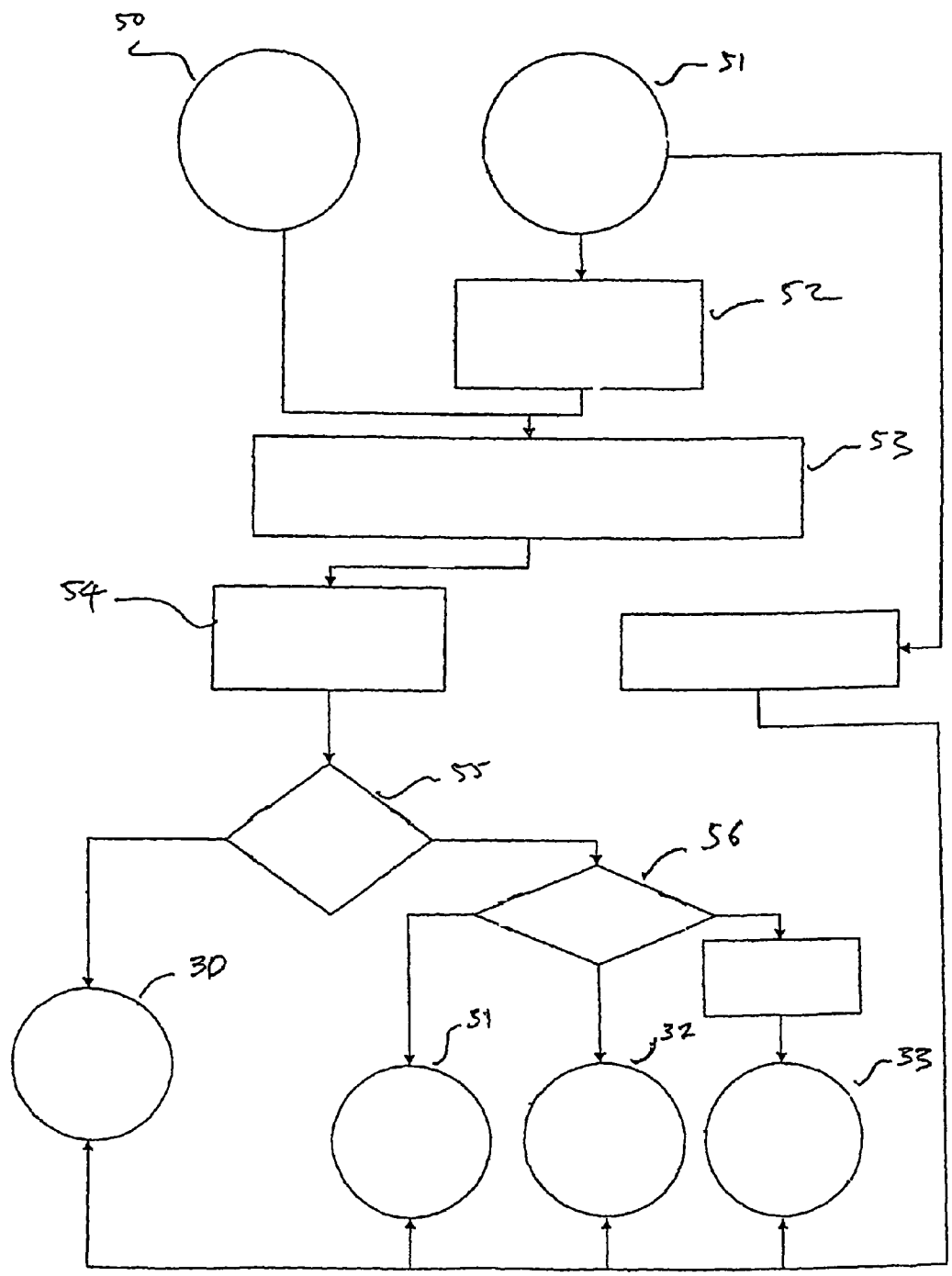
FIG. 2 is a process flow diagram for modelling unknown values according to a preferred embodiment.

Referring to FIG. 2, the unconditional rate dynamics is specified 50 into the unconditional rate dynamics input file 20. This involves specifying, for each rate series, the parametric model, the standard deviation and the mean of the rate changes per unit interval of time, and specifying, for each pair of rate series, the correlation coefficient of the rate changes.

Conditional Rate Modelling: (Geometric) Brownian Motion

A stochastic process $B=(B_t)_{t \in R}$ is a one-dimensional Brownian Motion (BM) if there exist $\mu \in R$ and $\sigma \geq 0$ such that:

(1) $B_{t_2}-B_{t_1}$ is a normally distributed random variable for $t_1 \leq t_2$,
(2) $E(B_{t_2}-B_{t_1})=(t_2-t_1)\mu$ for $t_1 \leq t_2$,
(3) $\mathrm{var}(B_{t_2}-B_{t_1})(t_2-t_1)\sigma^2$ for $t_1 \leq t_2$, and (4) $B_{t_2}-B_{t_1}$ and $B_{t_2'}-B_{t_1'}$ are independent whenever $\underline{m}([t_1,t_2] \cap [t_1',t_2'])=0$,
for $t_1 \leq t_2$ and $t_1' \leq t_2'$, where $\underline{m}$ is Lebesgue measure on R.

Note that (1)-(3) imply that $B_{t+1}-B_t \sim N(\mu,\sigma^2)$ for any $t \in R$.

A stochastic process $B=(B_t)_{t \in R}$ is a one-dimensional Geometric Brownian Motion (GBM) if $(\ln(B_t))_{t \in R}$ is a one-dimensional Brownian Motion.

We start with m rate series $R^{(1)}, \ldots, R^{(m)}$ where $m \geq 1$.

Each $R^{(j)}=(R_t^{(j)})_{t \in R}$ is a stochastic process, where $R_t^{(j)}$ is the value of the $j^{th}$ rate series at time t. We assume that time here is the time underlying the assumed rate dynamics, and this may be different from calendar time. For example, time could be measured in trading days or calendar days.

Now each $R^{(j)}$ is going to be either a BM or a GBM.

Put $$X_t^{(j)} \stackrel{df}{=} \begin{cases} R_t^{(j)} & \text{if } R^{(j)} \text{ is to be a } BM \\ \ln(R_t^{(j)}) & \text{if } R^{(j)} \text{ is to be a } GBM, \end{cases} \text{ for } j \in \{1, \ldots, m\}$$

and $t \in R$.

For $t \in R$, put $$X_t \stackrel{df}{=} \begin{pmatrix} X_t^{(1)} \\ \vdots \\ X_t^{(m)} \end{pmatrix}.$$

Then $$X \stackrel{df}{=} (X_t)_{t \in R}$$

is a vector-valued stochastic process.

We also have the stochastic process $$X^{(j)} \stackrel{df}{=} (X_t^{(j)})_{t \in R}$$

for each $j \in \{1, \ldots, m\}$.

Now each $X^{(j)}$ is going to be a BM. But we make the stronger assumption that X is an m-dimensional Brownian Motion: that is, we assume that there exists $\mu=(\mu_j) \in R^m$ and a matrix $\kappa=(\kappa_{j,j'})_{(j,j')}$, where $1 \leq j,j' \leq m$, such that:

(1) $X_{t_2}-X_{t_1}$ is a normally distributed random variable for $t_1 \leq t_2$,
(2) $E(X_{t_2}-X_{t_1})=(t_2-t_1)\mu$ for $t_1 \leq t_2$,
(3) $\mathrm{cov}(X_{t_2}-X_{t_1},X_{t_2}-X_{t_1})=(t_2-t_1)\kappa$ for $t_1 \leq t_2$, and (4) $X_{t_2}-X_{t_1}$ and $X_{t_2'}-X_{t_1'}$ are independent whenever $\underline{m}([t_1,t_2] \cap [t_1',t_2'])=0$, for $t_1 \leq t_2$ and $t_1' \leq t_2'$.

Note that (1)-(4) imply that each $X^{(j)}$ is a one-dimensional BM.

In particular, if we put $$\sigma_j \stackrel{df}{=} \sqrt{\kappa_{j,j}}$$

for $j \in \{1, \ldots, m\}$, we have:

(1) $X_{t_2}^{(j)}-X_{t_1}^{(j)}$ is a normally distributed random variable for $t_1 \leq t_2$,
(2) $E(X_{t_2}^{(j)}-X_{t_1}^{(j)})=(t_2-t_1)\mu_j$ for $t_1 \leq t_2$,
(3) $\mathrm{cov}(X_{t_2}^{(j)}-X_{t_1}^{(j)},X_{t_2}^{(j)}-X_{t_1}^{(j)})\sigma_j^2$ for $t_1 \leq t_2$, and (4) $X_{t_2}^{(j)}-X_{t_1}^{(j)}$ and $X_{t_2'}^{(j)}-X_{t_1'}^{(j)}$ are independent whenever $\underline{m}([t_1,t_2] \cap [t_1',t_2'])=0$,
for $t_1 \leq t_2$ and $t_1' \leq t_2'$.

$$\mu = \begin{pmatrix} \mu_1 \\ \vdots \\ \mu_m \end{pmatrix}$$

is the mean vector of rate changes per unit interval of time and $\kappa=(\kappa_{j,j'})_{(j,j')}$ is the covariance matrix of rate changes per unit interval of time.

The covariance matrix can be determined by giving a volatility vector $$\sigma = \begin{pmatrix} \sigma_1 \\ \vdots \\ \sigma_m \end{pmatrix}$$

per unit interval of time and a correlation matrix $\rho = (\rho_{j,j'})_{(j,j')}$, where $$\sigma_j \stackrel{df}{=} \sqrt{\kappa_{j,j}}$$

and $$\rho_{j,j'} \stackrel{df}{=} \frac{\kappa_{j,j'}}{\sigma_j \sigma_{j'}}.$$

Then $\kappa_{j,j'} = \rho_{j,j'} \sigma_j \sigma_{j'}$ for $j,j' \in \{1, \ldots, m\}$.

Note that if either of $\sigma_j$ or $\sigma_{j'}$ is zero, then $\rho_{j,j'}$ is undefined, but $\kappa_{j,j'} = 0$, so that any value for $\rho_{j,j'}$ (say, 0 or 1) will yield the correct value for $\kappa_{j,j'}$.

Note that the term volatility is used to denote the standard deviation of rate changes.

Note also that if $R^{(j)}$ is a GBM, we have $X_{t_2}^{(j)} - X_{t_1}^{(j)} = \ln(R_{t_2}^{(j)}) - \ln(R_{t_1}^{(j)}) = \ln(R_{t_2}^{(j)}/R_{t_1}^{(j)})$. For $R^{(j)}$ a GBM, we assume that $R_t^{(j)} > 0$ for all $t \in R$, because $\ln(x)$ is not defined for $x \leq 0$.

For $j \in \{1, \ldots, m\}$, let us define $$\Delta_{t_1,t_2}^{(j)} \stackrel{df}{=} X_{t_2}^{(j)} - X_{t_1}^{(j)}$$

for $t_1 \leq t_2$.

We then define $$\Delta_{t_1,t_2} \stackrel{df}{=} \begin{pmatrix} \Delta_{t_1,t_2}^{(1)} \\ \vdots \\ \Delta_{t_1,t_2}^{(m)} \end{pmatrix}$$

for $t_1 \leq t_2$.

The assumption of an m-dimensional Brownian Motion then reduces to:

(1) $\Delta_{t_1,t_2} \sim N((t_2-t_1)\mu,(t_2-t_1)\kappa)$ for $t_1 \leq t_2$, and (2) $\Delta_{t_1,t_2}$ and $\Delta_{t_1',t_2'}$ are independent whenever $m([t_1,t_2] \cap [t_1',t_2']) = 0$,
for $t_1 \leq t_2$ and $t_1' \leq t_2'$.

This constitutes our assumed unconditional rate dynamics.

Referring to FIG. 2, the incomplete rate data is specified 51 in the incomplete series of rates input file 20.

We now restrict our attention to n+1 times $t_0, t_1, \ldots, t_n$ satisfying $t_0 < t_1 < \ldots < t_n$, where $n \geq 1$. We then have the n time intervals $[t_0, t_1], \ldots, [t_{n-1}, t_n]$. We suppose that the values of some of the rates $R_{t_i}^{(j)}$, where $j \in \{1, \ldots, m\}$ and $i \in \{0, 1, \ldots, n\}$, are known and the others are unknown. We wish to determine what the known rates imply about the unknown rates, given the assumed unconditional rate dynamics. In particular, we wish to:

(1) determine the probability distribution of the unknown rates,
(2) estimate the unknown rates, and
(3) simulate the unknown rates.

First observe that $\Delta_{t_i,t_{i'}}^{(j)}$ is known if and only if $R_{t_i}^{(j)}$ and $R_{t_{i'}}^{(j)}$ are both known, for $i < i'$.

Let us define $$\Delta_i^{(j)} \stackrel{df}{=} \Delta_{t_{i-1},t_i}^{(j)}$$

for $j \in \{1, \ldots, m\}$ and $i \in \{1, \ldots, n\}$, and $$\Delta t_i \stackrel{df}{=} t_i - t_{i-1}$$

for $i \in \{1, \ldots, n\}$.

Then the Brownian Motion assumption implies that $E(\Delta_i^{(j)}) = \Delta t_i \mu_j$ and $\text{cov}(\Delta_i^{(j)}, \Delta_{i'}^{(j')}) = \delta_{i,i'} \Delta t_i \kappa_{j,j'}$, where $$\delta_{i,i'} \stackrel{df}{=} \begin{cases} 1 & \text{if } i = i' \\ 0 & \text{if } i \neq i' \end{cases}$$

is the Kronecker delta function. The Brownian Motion assumption also implies that $$\Delta \stackrel{df}{=} (\Delta_i^{(j)})_{1 \leq j \leq m, 1 \leq i \leq n}$$

is multivariate normal in $R^{mn}$.

Referring to FIG. 2, the runs and the unknown rate changes are determined 52.

Let us call a known rate change of the form $\Delta_{t_i,t_{i'}}^{(j)}$ run if:
(1) $1 \leq j \leq m$,
(2) $0 \leq i < i' \leq n$, and
(3) $R_{t_k}^{(j)}$ is unknown for all $k$ satisfying $i < k < i'$,
and let the length of the run be $i' - i$.

Every run is of length $\geq 1$.

If $\Delta_{t_i,t_{i'}}^{(j)}$ is a run of length 1, we have $\Delta_{t_i,t_{i'}}^{(j)} = \Delta_{i'}^{(j)}$ and $R_{t_{i-1}}^{(j)}$ and $R_{t_i}^{(j)}$ are both known, and, for any run $\Delta_{t_i,t_{i'}}^{(j)}$, both $R_{t_i}^{(j)}$ and $R_{t_{i'}}^{(j)}$ are known.

Suppose that there are M runs. Let $\xi$ be a random vector in $R^M$ whose components consist of the runs. Then there is a vector $x \in R^M$ such that the condition $\xi = x$ expresses the fact that the known rate changes take their known values. Now suppose that there are N unknowns of the form $\Delta_i^{(j)}$ where $1 \leq j \leq m$ and $1 \leq i \leq n$. Let $\theta$ be a random vector in $R^N$ whose components consist of these unknown rate changes.

For any run $\Delta_{t_i,t_{i'}}^{(j)}$, we have $$\Delta_{t_i,t_{i'}}^{(j)} = \sum_{k=i+1}^{i'} \Delta_k^{(j)},$$

so that all the components of $\xi$ and $\theta$ are of the form $$\sum_{k=i+1}^{i'} \Delta_k^{(j)}.$$

Now $$E\left(\sum_{k=i+1}^{i'} \Delta_k^{(j)}\right) = \sum_{k=i+1}^{i'} E(\Delta_k^{(j)})$$
$$= \sum_{k=i+1}^{i'} \Delta t_k \mu_j$$

and $$cov\left(\sum_{k=i_1+1}^{i'_1} \Delta_k^{(j)}, \sum_{k'=i_2+1}^{i'_2} \Delta_{k'}^{(j')}\right) = \sum_{k=i_1+1}^{i'_1}, \sum_{k'=i_2+1}^{i'_2} cov(\Delta_k^{(j)}, \Delta_{k'}^{(j')})$$
$$= \sum_{k=i_1+1}^{i'_1}, \sum_{k'=i_2+1}^{i'_2} \delta_{k,k'} \Delta t_k \kappa_{j,j'}.$$

Thus we can calculate $$E\binom{\xi}{\theta} \text{ and } cov\left(\binom{\xi}{\theta}, \binom{\xi}{\theta}\right).$$

We also have $$\binom{\xi}{\theta}$$

multivariate normal in $R^{M+N}$.

Consider a run $\xi_\alpha$ of length $\geq 2$, for some $\alpha \in \{1, \ldots, M\}$. Then $$\xi_\alpha = \sum_{k=i+1}^{i'} \Delta_k^{(j)}$$

for some j and i'>i+1, where $\Delta_{i+1}^{(j)}, \ldots, \Delta_{i'}^{(j)}$ are all unknown. So there exist $\alpha_k \in \{1, \ldots, N\}$, for k=i+1, \ldots, i', satisfying $$\xi_\alpha = \sum_{k=i+1}^{i'} \theta_{\alpha_k}.$$

The algebraic dependence is preserved almost everywhere (a.e. or with probability one) if we replace $\xi$ by any random $\xi'$ such that $$E\binom{\xi'}{\theta} = E\binom{\xi}{\theta} \text{ and } cov\left(\binom{\xi'}{\theta}, \binom{\xi'}{\theta}\right) = cov\left(\binom{\xi}{\theta}, \binom{\xi}{\theta}\right).$$

This follows from the proof of the following result:

Let $$\xi = \begin{pmatrix} \xi_1 \\ \vdots \\ \xi_M \end{pmatrix} \text{ and } \theta = \begin{pmatrix} \theta_1 \\ \vdots \\ \theta_N \end{pmatrix}$$

be random vectors. Suppose that each $\xi_i$ is an affine function of $\theta_1, \ldots, \theta_N$. Then for any $\xi'$ such that $$E(\xi') = E(\xi) \text{ and } cov\left(\binom{\xi'}{\theta}, \binom{\xi'}{\theta}\right) = cov\left(\binom{\xi}{\theta}, \binom{\xi}{\theta}\right),$$

we have $\xi' = \xi$ a.e.

Proof

Put $$\eta \stackrel{df}{=} \binom{\xi}{\theta} \text{ and } \eta' \stackrel{df}{=} \binom{\xi'}{\theta},$$

and suppose that $E(\eta')=E(\eta)$ and $cov(\eta', \eta')=cov(\eta, \eta)$.

Let $i \in \{1, \ldots, M\}$. It is enough to show that $\xi_i' = \xi_i$ a.e.

We have $\sigma_{\xi_i'} = \sigma_{\xi_i}$ because $cov(\eta, \eta) = cov(\eta', \eta')$.

First suppose that $\sigma_{\xi_i} = 0$. Then $\xi_i' = E(\xi_i')$ a.e. and $\xi_i = E(\xi_i)$ a.e.

But $E(\xi_i) = E(\xi_i')$, because $E(\eta) = E(\eta')$. Thus $\xi_i = \xi_i'$ a.e.

Now suppose that $\sigma_{\xi_i} > 0$.

But $$\xi_i = \lambda_i + \sum_{j=1}^{N} \lambda_{i,j} \theta_j$$

for some real numbers $\lambda_i, \lambda_{1,j}, \ldots, \lambda_{N,j}$.

Then $$cov(\xi_i', \xi_i) = cov\left(\xi_i', \lambda_i + \sum_{j=1}^{N} \lambda_{i,j} \theta_j\right)$$
$$= cov\left(\xi_i', \sum_{j=1}^{N} \lambda_{i,j} \theta_j\right)$$
$$= \sum_{j=1}^{N} \lambda_{i,j} cov(\xi_i', \theta_j)$$
$$= \sum_{j=1}^{N} \lambda_{i,j} cov(\xi_i', \theta_j)$$

(because $cov(\eta, \eta) = cov(\eta', \eta')$)

$$= cov\left(\xi_i, \lambda_i + \sum_{j=1}^{N} \lambda_{i,j} \theta_j\right) = \sigma_{\xi_i}^2,$$

so that $$\rho(\xi_i', \xi_i) = \frac{cov(\xi_i', \xi_i)}{\sigma_{\xi_i'}\sigma_{\xi_i}} = \frac{\sigma_{\xi_i}^2}{\sigma_{\xi_i}^2} = 1,$$

whence $$\frac{\xi_i' - E(\xi_i')}{\sigma_{\xi_i'}} = \frac{\xi_i - E(\xi_i)}{\sigma_{\xi_i}} \quad a.e..$$

But $E(\xi_i')=E(\xi_i)$ and $\sigma_{\xi_i'}=\sigma_{\xi_i}$. Thus we have $\xi_i'=\xi_i$ a.e.

Referring to FIG. 2, $cov(\xi,\xi)$ is decomposed 53.

We now wish to determine the distribution of $\theta$ conditional on $\xi=x$.

Now $cov(\xi,\xi)$ is an M by M symmetric real matrix. So there is an orthonormal basis $\{b_1, \ldots, b_M\}$ of $R^M$ consisting of eigenvectors of $cov(\xi,\xi)$. Put $$B \stackrel{df}{=} (b_1|\ldots|b_M).$$

Then B is orthogonal and $$B^T cov(\xi,\xi) B = \begin{pmatrix} \lambda_1 & & 0 \\ & \ddots & \\ 0 & & \lambda_M \end{pmatrix},$$

where $\lambda_j$ is the eigenvalue of $cov(\xi,\xi)$ corresponding to the eigenvector $b_j$, for $j \in \{1, \ldots, M\}$. Note that $\lambda_j \geq 0$ for each j, because $cov(\xi,\xi)$ is non-negative definite.

Without loss of generality, there is a unique $r \in \{0, 1, \ldots, M\}$ such that $\lambda_1 \geq \ldots \geq \lambda_r > \lambda_{r+1} = \lambda_M = 0$ (reordering the columns of B and renaming the eigenvalues, if necessary).

Put $$D \stackrel{df}{=} \begin{pmatrix} \begin{matrix} \frac{1}{\sqrt{\lambda_1}} & & 0 \\ & \ddots & \\ 0 & & \frac{1}{\sqrt{\lambda_r}} \end{matrix} & 0 \\ \hline 0 & 0 \end{pmatrix},$$

an M by M matrix.

We also put $$Z \stackrel{df}{=} DB^T(\xi - E(\xi)).$$

Say $$Z = \begin{pmatrix} Z_1 \\ \vdots \\ Z_M \end{pmatrix}$$

and $B=(b_{ij})_{(i,j)}$.

Then $E(Z)=0$ and $$Z = \begin{pmatrix} \frac{1}{\sqrt{\lambda_1}} \sum_{j=1}^{M} b_{j1}(\xi_j - E(\xi_j)) \\ \vdots \\ \frac{1}{\sqrt{\lambda_r}} \sum_{j=1}^{M} b_{jr}(\xi_j - E(\xi_j)) \\ \hline 0 \end{pmatrix},$$

so that $Z_j=0$ for $j=r+1, \ldots, M$.

We also have $$\begin{aligned} cov(Z, Z) &= E(Z, Z^T) \\ &= E(DB^T(\xi - E(\xi))(\xi - E(\xi))^T BD) \\ &= DB^T E((\xi - E(\xi))(\xi - E(\xi))^T)BD \\ &= DB^T cov(\xi, \xi) BD \\ &= D\begin{pmatrix} \begin{matrix} \lambda_1 & & 0 \\ & \ddots & \\ 0 & & \lambda_r \end{matrix} & 0 \\ \hline 0 & 0 \end{pmatrix} D \\ &= \begin{pmatrix} I_r & 0 \\ \hline 0 & 0 \end{pmatrix}, \end{aligned}$$

$(E(Z)=0)$ where $I_r$ is the r by r identity matrix.

Put $$B(r) \stackrel{df}{=} (b_1|\cdots|b_r),$$

$$D(r) \stackrel{df}{=} \begin{pmatrix} \sqrt{\lambda_1} & & 0 \\ & \ddots & \\ 0 & & \sqrt{\lambda_r} \end{pmatrix}$$

and $$Z(r) \stackrel{df}{=} \begin{pmatrix} Z_1 \\ \vdots \\ Z_r \end{pmatrix}.$$

Now $Z=DB^T(\xi-E(\xi))$.

So $D(r)^{-1}B(r)^T(\xi-E(\xi))=Z(r)$ (ignoring the last M−r equations because $Z_{r+1}=\ldots=Z_M=0$).

Thus $(b_1|\ldots|b_r)^T(\xi-E(\xi))=D(r)Z(r)$.

Now each $\lambda_j$ is the eigenvalue of $cov(\xi,\xi)$ corresponding to the eigenvector $b_j$, and $\{b_1, \ldots, b_M\}$ is an orthonormal basis of $R^M$. So we have $\lambda_j=Q_{cov(\xi,\xi)}(b_j)$ for $j=1, \ldots, M$, where $Q_{cov(\xi,\xi)}$ is the quadratic form associated with the matrix $cov(\xi,\xi)$. But $\lambda_j=0$, for $j=r+1, \ldots, M$, so that $b_j^T(\xi-E(\xi))=0$ a.e. for $j=r+1, \ldots, M$. Therefore we have $(b_{r+1}|\ldots|b_M)^T(\xi-E(\xi))=0$ a.e.

Thus we have $(b_1|\ldots|b_r)^T(\xi-E(\xi))=D(r)Z(r)$ and $(b_{r+1}|\ldots|b_M)^T(\xi-E(\xi))=0$ a.e.

Therefore $(b_1|\ldots|b_r)^T\xi=(b_1|\ldots|b_r)^TE(\xi)+D(r)Z(r)$ and $(b_{r+1}|\ldots|b_M)^T\xi=(b_{r+1}|\ldots|b_M)^TE(\xi)$ a.e.

Given that $(b_{r+1}|\ldots|b_M)^T\xi=(b_{r+1}|\ldots|b_M)^TE(\xi)$ a.e., we make the assumption of consistency that $$(b_{r+1}|\ldots|b_M)^T x=(b_{r+1}|\ldots|b_M)^T E(\xi).$$

We now show that $(\xi=x \Leftrightarrow B(r)^T\xi=B(r)^Tx)$ a.e.
It is clear that $\xi=x \Rightarrow B(r)^T\xi=B(r)^Tx$.
So suppose that $B(r)^T\xi=B(r)^Tx$.
Now $$B^T\xi = \begin{pmatrix} B(r)^T\xi \\ (b_{r+1}|\cdots|b_M)^T\xi \end{pmatrix}.$$

But $B(r)^T\xi=B(r)^Tx$ by hypothesis,
$(b_{r+1}|\ldots|b_M)^T\xi=(b_{r+1}|\ldots|b_M)^TE(\xi)$ a.e.
and $(b_{r+1}|\ldots|b_M)^TE(\xi)=(b_{r+1}|\ldots|b_M)^Tx$ by the assumption of consistency.

Thus $$B^T\xi = \begin{pmatrix} B(r)^Tx \\ (b_{r+1}|\cdots|b_M)^Tx \end{pmatrix} \text{ a.e..}$$

But $$\begin{pmatrix} B(r)^Tx \\ (b_{r+1}|\cdots|b_M)^Tx \end{pmatrix} = B^Tx,$$

so that $B^T\xi=B^Tx$ a.e.
But $B$ is orthogonal. Therefore $\xi=x$ a.e.
So we have shown that $B(r)^T\xi=B(r)^Tx \Rightarrow (\xi=x$ a.e.$)$, which implies that $(B(r)^T\xi=B(r)^Tx \Rightarrow \xi=x)$ a.e.
Therefore $(\xi=x \Leftrightarrow B(r)^T\xi=B(r)^Tx)$ a.e.
So we have $(\xi=x \Leftrightarrow B(r)^TE(\xi)+D(r)Z(r)=B(r)^Tx)$ a.e.
Thus $$E(\theta \mid \xi = x) = E(\theta \mid D(r)Z(r) = B(r)^T(x - E(\xi)))$$
$$= E(\theta \mid Z(r) = D(r)^{-1}B(r)^T(x - E(\xi)))$$

Now $E(Z(r))=0$ and $cov(Z(r),Z(r))=I_r$ which is non-singular.
So, by the Theorem on Normal Correlation, we have $$E(\theta \mid Z(r) = D(r)^{-1}B(r)^T(x - E(\xi)))$$
$$= E(\theta) + cov(\theta, Z(r))cov(Z(r),$$
$$Z(r))^{-1}(D(r)^{-1}B(r)^T(x - E(\xi)) - E(Z(r)))$$
$$= E(\theta) + cov(\theta, Z(r))D(r)^{-1}B(r)^T(x - E(\xi)).$$

Thus $$E(\theta \mid \xi = x) = E(\theta) + cov(\theta, Z(r))D(r)^{-1}B(r)^T(x - E(\xi))$$
$$= E(\theta) + cov(\theta, D(r)^{-1}B(r)^T$$
$$(\xi - E(\xi)))D(r)^{-1}B(r)^T(x - E(\xi))$$
$$= E(\theta) + cov(\theta, \xi - E(\xi))B(r)D(r)^{-1}D(r)^{-1}B(r)^T(x - E(\xi))$$
$$= E(\theta) + cov(\theta, \xi)B(r)\begin{pmatrix} 1/\lambda_1 & & 0 \\ & \ddots & \\ 0 & & 1/\lambda_r \end{pmatrix}B(r)^T(x - E(\xi)).$$

We now define $$cov(\xi, \xi)^\oplus \stackrel{df}{=} B(r)\begin{pmatrix} 1/\lambda_1 & & 0 \\ & \ddots & \\ 0 & & 1/\lambda_r \end{pmatrix}B(r)^T.$$

Referring to FIG. 2, $E(\theta|\xi=x)$ is calculated 54.
Then we get $E(\theta|\xi=x)=E(\theta)+cov(\theta,\xi)cov(\xi,\xi)^\oplus(x-E(\xi))$.
We also have $$cov(\theta, \theta|\xi = x)$$
$$= cov(\theta, \theta|Z(r) = D(r)^{-1}B(r)^T(x - E(\xi)))$$
$$= cov(\theta, \theta|Z(r))$$
$$= cov(\theta, \theta) - cov(\theta, Z(r))cov(Z(r), (Z(r))^{-1}cov(\theta, Z(r))^T$$
(by the Theorem on Normal Correlation)
$$= cov(\theta, \theta) - cov(\theta, Z(r))I_r cov(\theta, Z(r))^T$$
$$= cov(\theta, \theta) - cov(\theta, D(r)^{-1}B(r)^T(\xi - E(\xi)))$$
$$cov(\theta, D(r)^{-1}B(r)^T(\xi - E(\xi)))^T$$
$$= cov(\theta, \theta) - cov(\theta, D(r)^{-1}B(r)^T\xi)cov(\theta, D(r)^{-1}B(r)^T\xi)^T$$
$$= cov(\theta, \theta) - cov(\theta, \xi)B(r)D(r)^{-1}D(r)^{-1}B(r)^T cov(\theta, \xi)^T$$
$$= cov(\theta, \theta) - cov(\theta, \xi)cov(\xi, \xi)^\oplus cov(\theta, \xi)^T.$$

Referring to FIG. 2, $cov(\theta,\theta|\xi=x)$ is calculated 54.
Thus we have $$cov(\theta,\theta|\xi=x)=cov(\theta,\theta)-cov(\theta,\xi)cov(\xi,\xi)^\oplus cov(\theta,\xi)^T.$$

Note that if $r=0$, we have $E(\theta|\xi=x)=E(\theta)$ and $cov(\theta,\theta|\xi=x)=cov(\theta,\theta)$.
We also have $$cov(\xi, \xi)^\oplus \stackrel{df}{=} B\begin{pmatrix} \begin{array}{ccc|c} \frac{1}{\lambda_1} & & 0 & \\ & \ddots & & 0 \\ 0 & & \frac{1}{\lambda_r} & \\ \hline & 0 & & 0 \end{array} \end{pmatrix}B^T = \left(\sum_{k=1}^r \frac{b_{ik}b_{jk}}{\lambda_k}\right)_{(i,j)}.$$

Note that the construction of $cov(\xi,\xi)^\oplus$ does not depend on the normality of $\xi$. If $cov(\xi,\xi)$ is non-singular, one can show that $cov(\xi,\xi)^\oplus=cov(\xi,\xi)^{-1}$. One can also show that the value of $cov(\xi,\xi)^\oplus$ is independent of the choice and ordering of the members of the basis of eigenvectors of $cov(\xi,\xi)$.

Note also that the derivation of the formulae for $E(\theta|\xi=x)$ and $cov(\theta,\theta|\xi=x)$ only depends on the normality of $$\begin{pmatrix} \xi \\ \theta \end{pmatrix}$$

and not on our interpretation of $\theta$ and $\xi$ as unknown and known rate changes, respectively.

We now give a slight generalisation of Theorem 3.3.4 of Y. L. Tong, *The Multivariate Normal Distribution*, Springer:
Suppose that $$\begin{pmatrix} \xi \\ \theta \end{pmatrix}$$

is unconditionally normal where $\xi$ and $\theta$ are random vectors in $R^M$ and $R^N$, respectively. Let $x \in R^M$. Then $\theta$, conditional on $\xi = x$, is normally distributed.

Proof

First suppose that $$\begin{pmatrix} \xi \\ \theta \end{pmatrix}$$

is non-singular.

Let A be any M by N real matrix and define $$\varphi_A \stackrel{df}{=} \begin{pmatrix} I_M & 0 \\ A & I_N \end{pmatrix}.$$

Then $\varphi_A: R^M \to R^N$ is non-singular, $\varphi_A^{-1} = \varphi_{-A}$ and $\det(\varphi_A) = \det(I_M)\det(I_N) = 1$.

But $\varphi_A$ non-singular and $$\begin{pmatrix} \xi \\ \theta \end{pmatrix}$$

non-singular normal imply that $$\begin{pmatrix} \xi' \\ \theta' \end{pmatrix} \stackrel{df}{=} \varphi_A \begin{pmatrix} \xi \\ \theta \end{pmatrix} = \begin{pmatrix} \xi \\ A\xi + \theta \end{pmatrix}$$

is also non-singular normal.

We have $\xi' = \xi$ and $\theta' = A\xi + \theta$.

Then $E(\xi') = E(\xi)$, $E(\theta') = AE(\xi) + E(\theta)$, $cov(\xi', \xi') = cov(\xi, \xi)$, $cov(\theta', \theta') = cov(A\xi + \theta, A\xi + \theta)$,
$= cov(A\xi, A\xi) + cov(A\xi, \theta) + cov(\theta, A\xi) + cov(\theta, \theta)$
$= Acov(\xi, \xi)A^T + Acov(\xi, \theta) + cov(\theta, \xi)A^T + cov(\theta, \theta)$, and $cov(\theta', \xi')$   $(= cov(\xi', \theta')^T)$
$= cov(A\xi, \xi) + cov(\theta, \xi)$
$= Acov(\xi, \xi) + cov(\theta, \xi)$.

We can now choose A to ensure that $cov(\theta', \xi') = 0$.

Thus we require $Acov(\xi, \xi) + cov(\theta, \xi) = 0$, so that $A = -cov(\theta, \xi)cov(\xi, \xi)^{-1}$ ($\xi$ is non-singular).

Put $$\psi \stackrel{df}{=} \varphi_{-cov(\theta,\xi)cov(\xi,\xi)^{-1}}.$$

Then $$\begin{pmatrix} \xi' \\ \theta' \end{pmatrix} = \psi \begin{pmatrix} \xi \\ \theta \end{pmatrix} = \begin{pmatrix} \xi \\ g(\xi, \theta) \end{pmatrix},$$

where $$g(x_1, x_2) \stackrel{df}{=} x_2 - cov(\theta, \xi)cov(\xi, \xi)^{-1}x_1,$$

for $x_1 \in R^M$ and $x_2 \in R^N$.

Then $cov(\xi, g(\xi, \theta)) = 0$. But $\xi$ and $g(\xi, \theta)$ are normal because $$\begin{pmatrix} \xi \\ \theta \end{pmatrix}$$

is normal.

Now $\psi$ is non-singular and $$\begin{pmatrix} \xi \\ \theta \end{pmatrix}$$

is non-singular normal.

So $$\psi \begin{pmatrix} \xi \\ \theta \end{pmatrix} = \begin{pmatrix} \xi \\ g(\xi, \theta) \end{pmatrix}$$

is non-singular normal.

Therefore the distribution function of $$\psi \begin{pmatrix} \xi \\ \theta \end{pmatrix}$$

is absolutely continuous.

Notation

Let $F_X$ denote the distribution function of X and $f_X$ the density function of X, for any random variable X.

Then we have $$F_{\psi\begin{pmatrix}\xi\\\theta\end{pmatrix}}\begin{pmatrix} x_1 \\ x_2 \end{pmatrix} = \int_{\begin{pmatrix}-\infty\\\vdots\\-\infty\end{pmatrix}}^{\begin{pmatrix}x_1\\x_2\end{pmatrix}} f_{\psi\begin{pmatrix}\xi\\\theta\end{pmatrix}} dm_1 dm_2$$

for $x_1 \in R^M$ and $x_2 \in R^N$, where $m_1$ is M-dimensional Lebesgue measure and $m_2$ is N-dimensional Lebesgue measure.

Now $$f_{\psi\binom{\xi}{\theta}}\binom{x_1}{x_2} = \frac{1}{(2\pi)^{\frac{M+N}{2}}\sqrt{\det\left(\mathrm{cov}\left(\psi\binom{\xi}{\theta},\psi\binom{\xi}{\theta}\right)\right)}}$$

$$e^{\frac{1}{2}Q_{\mathrm{cov}\left(\psi\binom{\xi}{\theta},\psi\binom{\xi}{\theta}\right)^{-1}}\left(\binom{x_1}{x_2}-E\left(\psi\binom{\xi}{\theta}\right)\right)}$$

But $\det\left(\mathrm{cov}\left(\psi\binom{\xi}{\theta},\psi\binom{\xi}{\theta}\right)\right) = \det\left(\psi^2 \circ \mathrm{cov}\left(\binom{\xi}{\theta},\binom{\xi}{\theta}\right)\right)$ $$= \det(\psi)^2 \det\left(\mathrm{cov}\left(\binom{\xi}{\theta},\binom{\xi}{\theta}\right)\right)$$

$$= \det\left(\mathrm{cov}\left(\binom{\xi}{\theta},\binom{\xi}{\theta}\right)\right),$$

because $\det(\psi)=1$.
We also have $$Q_{\mathrm{cov}\left(\psi\binom{\xi}{\theta},\psi\binom{\xi}{\theta}\right)^{-1}}\left(\binom{x_1}{x_2}-E\left(\psi\binom{\xi}{\theta}\right)\right) = \left(\binom{x_1}{x_2}-E\left(\psi\binom{\xi}{\theta}\right)\right)^T \mathrm{cov}\left(\psi\binom{\xi}{\theta},\right.$$

$$\left.\psi\binom{\xi}{\theta}\right)^{-1}\left(\binom{x_1}{x_2}-E\left(\psi\binom{\xi}{\theta}\right)\right)$$

$$= \left(\binom{x_1}{x_2}-E\left(\psi\binom{\xi}{\theta}\right)\right)^T \left(\psi\mathrm{cov}\left(\binom{\xi}{\theta},\right.\right.$$

$$\left.\left.\binom{\xi}{\theta}\right)\psi^T\right)^{-1}\left(\binom{x_1}{x_2}-E\left(\psi\binom{\xi}{\theta}\right)\right)$$

$$= \left(\binom{x_1}{x_2}-E\left(\psi\binom{\xi}{\theta}\right)\right)^T (\psi^{-1})^T \mathrm{cov}\left(\binom{\xi}{\theta},\right.$$

$$\left.\binom{\xi}{\theta}\right)^{-1}\psi^{-1}\left(\binom{x_1}{x_2}-E\left(\psi\binom{\xi}{\theta}\right)\right)$$

$$= \left(\psi^{-1}\binom{x_1}{x_2}-E\binom{\xi}{\theta}\right)^T \mathrm{cov}\left(\binom{\xi}{\theta},\right.$$

$$\left.\binom{\xi}{\theta}\right)^{-1}\left(\psi^{-1}\binom{x_1}{x_2}-E\binom{\xi}{\theta}\right)$$

$$= Q_{\mathrm{cov}\left(\binom{\xi}{\theta},\binom{\xi}{\theta}\right)^{-1}}\left(\psi^{-1}\binom{x_1}{x_2}-E\binom{\xi}{\theta}\right).$$

So $f_{\psi\binom{\xi}{\theta}}\binom{x_1}{x_2} =$ $$\frac{1}{(2\pi)^{\frac{M+N}{2}}\sqrt{\det\left(\mathrm{cov}\left(\binom{\xi}{\theta},\binom{\xi}{\theta}\right)\right)}}e^{-\frac{1}{2}Q_{\mathrm{cov}\left(\binom{\xi}{\theta},\binom{\xi}{\theta}\right)^{-1}}\left(\psi^{-1}\binom{x_1}{x_2}-E\binom{\xi}{\theta}\right)}.$$

Thus we have $$f_{\psi\binom{\xi}{\theta}} = f_{\binom{\xi}{\theta}} \circ \psi^{-1}.$$

Now we also have $|\det((\psi^{-1})')|$ (the absolute value of the determinant of the Jacobian of $\psi^{-1}$) $= |\det(\psi^{-1})| = \frac{1}{\det(\psi)} = 1$.

Thus $$F_{\psi\binom{\xi}{\theta}}\binom{x_1}{x_2} \int_{-\infty}^{\binom{x_1}{x_2}} \left(f_{\binom{\xi}{\theta}} \circ \psi^{-1}\right) dm_1 dm_2 =$$

$$\int_{-\infty}^{\binom{x_1}{x_2}} \left(f_{\binom{\xi}{\theta}} \circ \psi^{-1}\right) |\det((\psi^{-1})')| dm_1 dm_2 =$$

$$\int_{-\infty}^{\psi^{-1}\binom{x_1}{x_2}} f_{\binom{\xi}{\theta}} dm_1 dm_2 \text{ (by a change of variable)} =$$

$$F_{\binom{\xi}{\theta}}\left(\psi^{-1}\binom{x_1}{x_2}\right) = F_{\binom{\xi}{\theta}}\binom{x_1}{x_2 + \mathrm{cov}(\theta,\xi)\mathrm{cov}(\xi,\xi)^{-1}x_1} =$$

$$F_\theta(x_2 + \mathrm{cov}(\theta,\xi)\mathrm{cov}(\xi,\xi)^{-1}x_1 \mid \xi = x_1) F_\xi(x_1).$$

But $F_{\psi\binom{\xi}{\theta}}\binom{x_1}{x_2} = F_{\binom{\xi}{g(\xi,\theta)}}\binom{x_1}{x_2} = F_{g(\xi,\theta)}(x_2) F_\xi(x_1)$, because $\xi$ and $g(\xi, \theta)$ are independent.
Thus $F_\theta(x_2+\mathrm{cov}(\theta,\xi)\mathrm{cov}(\xi,\xi)^{-1}x_1|\xi=x_1)F_\xi(x_1) = F_{g(\xi,\theta)}(x_2)F_\xi(x_1),$ for all $x_1 \in R^M$ and all $x_2 \in R^N$.
But $\xi$ is non-singular, so that $F_\xi(x_1)>0$ for all $x_1 \in R^M$.
Thus $F_\theta(x_2+\mathrm{cov}(\theta,\xi)\mathrm{cov}(\xi,\xi)^{-1}x_1|\xi=x_1)=F_{g(\xi,\theta)}(x_2)$ for all $x_1$ and $x_2$.
Now take $x_1=x$.
Then $F_\theta(x_2+\mathrm{cov}(\theta,\xi)\mathrm{cov}(\xi,\xi)^{-1}x|\xi=x)=F_{g(\xi,\theta)}(x_2)$ for all $x_2 \in R^N$.
But $g(\xi,\theta)$ is normal and $\mathrm{cov}(\xi,\theta)\mathrm{cov}(\xi,\xi)^{-1}x \in R^N$ is a constant.
Therefore the distribution of $\theta$, conditional on $\xi=x$, is normal.
Now suppose that $$\binom{\xi}{\theta}$$

is singular.

Put $M_1 \overset{df}{=} \mathrm{rank}(\mathrm{cov}(\xi,\xi))$ and $N_1 \overset{df}{=} \mathrm{rank}\left(\mathrm{cov}\left(\binom{\xi}{\theta},\binom{\xi}{\theta}\right)\right) - M_1.$ Then there exist $x' \in R^{M_1}$, random vectors $\xi'$ and $\theta'$ of dimension $M_1$ and $N_1$ respectively, an M by $M_1$ matrix A, an N by $M_1$ matrix $B_1$ and an N by $N_1$ matrix $B_2$ such that $$\begin{pmatrix} \xi \\ \theta \end{pmatrix} = \left( \begin{array}{c|c} A & 0 \\ \hline B_1 & B_2 \end{array} \right) \begin{pmatrix} \xi' \\ \theta' \end{pmatrix} \text{ a.e.,}$$

$(\xi = x \Leftrightarrow \xi' = x')$ a.e. and $$\begin{pmatrix} \xi' \\ \theta' \end{pmatrix}$$

is non-singular normal. Because $$\begin{pmatrix} \xi' \\ \theta' \end{pmatrix}$$

is non-singular normal, $\theta'$, conditional on $\xi' = x'$, is normally distributed. But when $\xi' = x'$, we have $\theta = B_1 x' + B_2 \theta'$ a.e., where $B_1 x'$ is constant and $\theta'$ is normal. Thus $\theta$, conditional on $\xi' = x'$, is an affine function of a normally distributed random vector and is therefore normal. But $(\xi' = x' \Leftrightarrow \xi = x)$ a.e. Therefore $\theta$, conditional on $\xi = x$, is normally distributed.

Let us now return to our interpretation of $\xi$ and $\theta$ as known and unknown rate changes. We have shown that $\theta$, conditional on $\xi = x$, is $N(E(\theta|\xi = x), \text{cov}(\theta, \theta|\xi = x))$.

Now $$E(\theta | \xi = x) = \begin{pmatrix} E(\theta_1 | \xi = x) \\ \vdots \\ E(\theta_N | \xi = x) \end{pmatrix}$$

and $\text{cov}(\theta, \theta|\xi=x) = (\text{cov}(\theta_k, \theta_{k'}|\xi=x))_{(k,k')}$.

For $\Delta_i^{(j)}$ unknown, let $\alpha_{ij} \in \{1, \ldots, N\}$ be its index in $\theta$, so that $\Delta_i^{(j)} = \theta_{\alpha_{ij}}$.

Conditional Distributions of Rate Changes

For each unknown $\Delta_i^{(j)}$, we have $E(\Delta_i^{(j)}|\xi=x) = E(\theta_{\alpha_{ij}}|\xi=x)$ and $\text{var}(\Delta_i^{(j)}|\xi=x) = \text{cov}(\theta_{\alpha_{ij}}, \theta_{\alpha_{ij}}|\xi=x)$, so that $\Delta_i^{(j)}$, conditional on $\xi=x$, is $N(E(\Delta_i^{(j)}|\xi=x), \text{var}(\Delta_i^{(j)}|\xi=x))$. For each known $\Delta_i^{(j)}$, let $x_i^{(j)}$ be the known value of $\Delta_i^{(j)}$. Then $E(\Delta_i^{(j)}|\xi=x) = x_i^{(j)}$ and $\text{var}(\Delta_i^{(j)}|\xi=x) = 0$, so that $\Delta_i^{(j)}$, conditional on $\xi=x$, is $N(x_i^{(j)}, 0)$. Thus we know $E(\Delta_i^{(j)}|\xi=x)$ and $\text{cov}(\Delta_i^{(j)}|\xi=x)$ for all $\Delta_i^{(j)}$ (and $\Delta_i^{(j)}$ is normally distributed).

Now, for every pair $(\Delta_{i_1}^{(j_1)}, \Delta_{i_2}^{(j_2)})$, we have $$\text{cov}\left(\Delta_{i_1}^{(j_1)}, \Delta_{i_2}^{(j_2)} \mid \xi = x\right) = $$

$$\begin{cases} 0 & \text{if either of } \Delta_{i_1}^{(j_1)} \text{and } \Delta_{i_2}^{(j_2)} \text{is known} \\ \text{cov}(\theta_{\alpha_{i_1 j_1}}, \theta_{\alpha_{i_2 j_2}} | \xi = x) & \text{otherwise} \end{cases}$$

Then, for any j and $i < i'$, we can calculate the conditional mean of a rate change:

$$E(\Delta_{t_i,t_{i'}}^{(j)} \mid \xi = x) = E\left(\sum_{k=i+1}^{i'} \Delta_k^{(j)} \mid \xi = x\right) \sum_{k=i+1}^{i'} E(\Delta_k^{(j)} \mid \xi = x)$$

and the conditional variance of a rate change:

$$\text{var}(\Delta_{t_i,t_{i'}}^{(j)} \mid \xi = x) = \sum_{k_1=i+1}^{i'} \sum_{k_2=i+1}^{i'} \text{cov}(\Delta_{k_1}^{(j)}, \Delta_{k_2}^{(j)} \mid \xi = x)$$

Thus $\Delta_{t_i,t_{i'}}^{(j)}$, conditional on $\xi=x$, is $N(E(\Delta_{t_i,t_{i'}}^{(j)}|\xi=x), \text{var}(\Delta_{t_i,t_{i'}}^{(j)}|\xi=x))$.

We can also calculate the conditional covariance of a pair of rate changes:

$$\text{cov}\left(\Delta_{t_{i_1},t_{i_1'}}^{(j_1)}, \Delta_{t_{i_2},t_{i_2'}}^{(j_2)} \mid \xi = x\right) = \sum_{k_1=i_1+1}^{i_1'} \sum_{k_2=i_2+1}^{i_2'} \text{cov}\left(\Delta_{k_1}^{(j_1)}, \Delta_{k_2}^{(j_2)} \mid \xi = x\right)$$

and the conditional correlation of a pair of rate changes:

$$\rho\left(\Delta_{t_{i_1},t_{i_1'}}^{(j_1)}, \Delta_{t_{i_2},t_{i_2'}}^{(j_2)} \mid \xi = x\right) = \frac{\text{cov}\left(\Delta_{t_{i_1},t_{i_1'}}^{(j_1)}, \Delta_{t_{i_2},t_{i_2'}}^{(j_2)} \mid \xi = x\right)}{\sqrt{\text{var}\left(\Delta_{t_{i_1},t_{i_1'}}^{(j_1)} \mid \xi = x\right)} \sqrt{\text{var}\left(\Delta_{t_{i_2},t_{i_2'}}^{(j_2)} \mid \xi = x\right)}}$$

provided that $$\text{var}\left(\Delta_{t_{i_1},t_{i_1'}}^{(j_1)} \mid \xi = x\right) > 0 \text{ and } \text{var}\left(\Delta_{t_{i_2},t_{i_2'}}^{(j_2)} \mid \xi = x\right) > 0.$$

We can clearly also calculate the conditional multivariate normal distribution of any vector of rate changes.

We will make use of the following well-known result:

Lemma

If $X \sim N(\mu, \sigma^2)$, then $$E(e^X) = e^{\mu + \frac{1}{2}\sigma^2}$$

and $\text{var}(e^X) = e^{2\mu + \sigma^2}(e^{\sigma^2} - 1)$

Proof

We use integration by substitution.

We have $$E(e^X) = \int_{-\infty}^{+\infty} e^x \frac{1}{\sigma\sqrt{2\pi}} e^{-\frac{1}{2}\left(\frac{x-\mu}{\sigma}\right)^2} dx$$

$$= \int_{-\infty}^{+\infty} \frac{1}{\sigma\sqrt{2\pi}} e^{-\frac{1}{2}\left(\left(\frac{x-\mu}{\sigma}\right)^2 - 2x\right)} dx.$$

Now $$\left(\frac{x-\mu}{\sigma}\right)^2 - 2x = \left(\frac{x-\mu}{\sigma}\right)^2 - 2\sigma\left(\frac{x-\mu}{\sigma}\right) - 2\mu$$

-continued $$= \left(\frac{x-\mu}{\sigma} - \sigma\right)^2 - 2\mu - \sigma^2.$$

Let us make the substitution $$y \stackrel{df}{=} \frac{x-\mu}{\sigma} - \sigma.$$

Then $$\frac{dy}{dx} = \frac{1}{\sigma} \text{ and}$$

$$E(e^X) = \int_{-\infty}^{+\infty} \frac{1}{\sigma\sqrt{2\pi}} e^{-\frac{1}{2}y^2} e^{-\frac{1}{2}(-2\mu-\sigma^2)} dx$$

$$= e^{\mu+\frac{1}{2}\sigma^2} \int_{-\infty}^{+\infty} \frac{1}{\sigma\sqrt{2\pi}} e^{-\frac{1}{2}y^2} dx$$

$$= e^{\mu+\frac{1}{2}\sigma^2} \int_{-\infty}^{+\infty} \frac{1}{\sqrt{2\pi}} e^{-\frac{1}{2}y^2} \frac{dy}{dx} dx$$

$$= e^{\mu+\frac{1}{2}\sigma^2} \int_{-\infty}^{+\infty} \frac{1}{\sqrt{2\pi}} e^{-\frac{1}{2}y^2} dy$$

$$= e^{\mu+\frac{1}{2}\sigma^2}.$$

Now put $Y=e^X$, so that $Y^2=e^{2X}$.
But $2X \sim N(2\mu, 4\sigma^2)$, so that $$E(Y^2) = e^{2\mu + \frac{4\sigma^2}{2}} = e^{2(\mu+\sigma^2)}.$$

Then $\text{var}(e^X) = \text{var}(Y) = E(Y^2) - (E(Y))^2 = e^{2(\mu+\sigma^2)} - e^{2\mu+\sigma^2} = e^{2\mu+\sigma^2}(e^{\sigma^2} - 1)$.

Marginal Distributions of Rates 30

Let $\phi$ be a condition expressing the fact that the known rates take their known values. Then $E(\Delta_{t_i,t_{i'}}^{(j)}|\phi) = E(\Delta_{t_i,t_{i'}}^{(j)}|\xi=x)$, and $\text{var}(\Delta_{t_i,t_{i'}}^{(j)}|\phi) = \text{var}(\Delta_{t_i,t_{i'}}^{(j)}|\xi=x)$, and so on. We wish to calculate the distribution of $R_{t_i}^{(j)}$, conditional on $\phi$, for each unknown $R_{t_i}^{(j)}$ where $j \in \{1, \ldots, m\}$ and $i \in \{0, 1, \ldots, n\}$. Let $j \in \{1, \ldots, m\}$. We suppose that $R_{t_k}^{(j)}$ is known for some k.

Forward Calculation

Suppose $R_{t_i}^{(j)}$ is not known and $R_{t_k}^{(j)}$ is known for some k<i, and $R_{t_\alpha}^{(j)}$ is not known for k<α<i.

Case $R^{(j)}$ BM

We have $\Delta_{t_k,t_i}^{(j)} = R_{t_i}^{(j)} - R_{t_k}^{(j)}$, so that $R_{t_i}^{(j)} = R_{t_k}^{(j)} + \Delta_{t_k,t_i}^{(j)}$.

Then $R_{t_i}^{(j)}$, conditional on $\phi$, is $N(R_{t_k}^{(j)} + E(\Delta_{t_k,t_i}^{(j)}|\xi=x), \text{var}(\Delta_{t_k,t_i}^{(j)}|\xi=x))$.

Case $R^{(j)}$ GBM

We have $$\Delta_{t_k,t_i}^{(j)} = \ln(R_{t_i}^{(j)}/R_{t_k}^{(j)}),$$

so that $\ln(R_{t_i}^{(j)}) = \ln(R_{t_k}^{(j)}) + \Delta_{t_k,t_i}^{(j)}$.

Then $\ln(R_{t_i}^{(j)})$, conditional on $\phi$, is $N(\ln(R_{t_k}^{(j)}) + E(\Delta_{t_k,t_i}^{(j)}|\xi=x), \text{var}(\Delta_{t_k,t_i}^{(j)}|\xi=x))$.

If we put $$\mu \stackrel{df}{=} \ln(R_{t_k}^{(j)}) + E(\Delta_{t_k,t_i}^{(j)}|\xi=x) \text{ and } \sigma^2 \stackrel{df}{=} \text{var}(\Delta_{t_k,t_i}^{(j)}|\xi=x),$$

we also have $$E(R_{t_i}^{(j)}|\varphi) = e^{\mu + \frac{\sigma^2}{2}}$$

and $\text{var}(R_{t_i}^{(j)}|\phi) = e^{2\mu+\sigma^2}(e^{\sigma^2}-1)$.

Backward Calculation

Suppose $R_{t_i}^{(j)}$ is not known and $R_{t_k}^{(j)}$ is known for some k>i, and $R_{t_\alpha}^{(j)}$ is not known for i<α<k.

Case $R^{(j)}$ BM

We have $\Delta_{t_i,t_k}^{(j)} = R_{t_k}^{(j)} - R_{t_i}^{(j)}$, so that $R_{t_i}^{(j)} = R_{t_k}^{(j)} - \Delta_{t_i,t_k}^{(j)}$.

Then $R_{t_i}^{(j)}$, conditional on $\phi$, is $N(R_{t_k}^{(j)} - E(\Delta_{t_i,t_k}^{(j)}|\xi=x), \text{var}(\Delta_{t_i,t_k}^{(j)}|\xi=x))$.

Case $R^{(j)}$ GBM

We have $$\Delta_{t_i,t_k}^{(j)} = \ln(R_{t_k}^{(j)}/R_{t_i}^{(j)}),$$

so that $\ln(R_{t_i}^{(j)}) = \ln(R_{t_k}^{(j)}) - \Delta_{t_i,t_k}^{(j)}$.

Then $\ln(R_{t_i}^{(j)})$, conditional on $\phi$, is $N(\ln(R_{t_k}^{(j)}) - E(\Delta_{t_i,t_k}^{(j)}|\xi=x), \text{var}(\Delta_{t_i,t_k}^{(j)}|\xi=x))$.

If we put $$\mu \stackrel{df}{=} \ln(R_{t_k}^{(j)}) - E(\Delta_{t_i,t_k}^{(j)}|\xi=x) \text{ and } \sigma^2 \stackrel{df}{=} \text{var}(\Delta_{t_i,t_k}^{(j)}|\xi=x),$$

we also have $$E(R_{t_i}^{(j)}|\varphi) = e^{\mu + \frac{\sigma^2}{2}}$$

and $\text{var}(R_{t_i}^{(j)}|\phi) = e^{2\mu+\sigma^2}(e^{\sigma^2}-1)$.

Filling the Unknown Rates 56

We now give three methods of filling the unknown rates. Using the first method, we fill the unknown rates in such a way that the rate changes take their expected values conditional on $\phi$. This method is equivalent to filling the unknown rates with their conditional modes (conditional on $\phi$). Using the second method, we fill the unknown rates with their expected values conditional on $\phi$. Using the third method, we simulate the unknown rates conditional on $\phi$. In each case, we suppose that, for each j, $R_{t_k}^{(j)}$ is known for some k. For each unknown rate $R_{t_i}^{(j)}$, we will let $$\tilde{R}_{t_i}^{(j)}$$

denote its filled value.

Method 1: Expected Rate Changes 31

We set each unknown $\Delta_i^{(j)}$ to $E(\Delta_i^{(j)}|\xi=x)$ and "back out" the unknown rates.

Forward Calculation
Suppose $$R_{t_i}^{\tilde{(j)}}$$

is not known and $R_{t_k}^{(j)}$ is known for some k<i, and $R_{t_\alpha}^{(j)}$ is not known for k<α<i.

Case $R^{(j)}$ BM

We have $$R_{t_i}^{\tilde{(j)}} - R_{t_k}^{(j)} = E(\Delta_{t_k,t_i}^{(j)}|\xi = x),$$

so that $$\tilde{R}_{t_i}^{(j)} = R_{t_k}^{(j)} + E(\Delta_{t_k,t_i}^{(j)}|\xi = x).$$

Case $R^{(j)}$ GBM

We have $$\left(\frac{\tilde{R}_{t_i}^{(j)}}{R_{t_k}^{(j)}}\right) = E\left(\Delta_{t_k,t_i}^{(j)} \mid \xi = x\right),$$

so that $$\tilde{R}_{t_i}^{(j)} = R_{t_k}^{(j)} \exp\left(E(\Delta_{t_k,t_i}^{(j)}|\xi = x)\right)$$

Backward Calculation

Suppose $R_{t_i}^{(j)}$ is not known and $R_{t_k}^{(j)}$ is known for some k>i, and $R_{t_\alpha}^{(j)}$ is not known for i<α<k.

Case $R^{(j)}$ BM

We have $$R_{t_k}^{(j)} - \tilde{R}_{t_i}^{(j)} = E(\Delta_{t_i,t_k}^{(j)}|\xi = x),$$

so that $$\tilde{R}_{t_i}^{(j)} = R_{t_k}^{(j)} - E(\Delta_{t_i,t_k}^{(j)}|\xi = x).$$

Case $R^{(j)}$ GBM

We have $$\left(\frac{R_{t_k}^{(j)}}{\tilde{R}_{t_i}^{(j)}}\right) = E\left(\Delta_{t_i,t_k}^{(j)} \mid \xi = x\right),$$

so that $$\tilde{R}_{t_i}^{(j)} = R_{t_k}^{(j)} \exp\left(-E(\Delta_{t_i,t_k}^{(j)}|\xi = x)\right).$$

Method 2: Expected Rates 32

We take $$\tilde{R}_{t_i}^{(j)} = E(R_i^{(j)}|\varphi)$$

for each unknown rate $R_{t_i}^{(j)}$.

Forward Calculation

Suppose $R_{t_i}^{(j)}$ is not known and $R_{t_k}^{(j)}$ is known for some k<i, and $R_{t_\alpha}^{(j)}$ is not known for k<α<i.

Case $R^{(j)}$ BM

We have $R_{t_i}^{(j)} - R_{t_k}^{(j)} = \Delta_{t_k,t_i}^{(j)}$, so that $R_{t_i}^{(j)} = R_{t_k}^{(j)} + \Delta_{t_k,t_i}^{(j)}$.

Then $$\tilde{R}_{t_i}^{(j)} = E(R_{t_i}^{(j)} \mid \varphi)$$
$$= R_{t_k}^{(j)} + E(\Delta_{t_k,t_i}^{(j)} \mid \varphi)$$
$$= R_{t_k}^{(j)} + E(\Delta_{t_k,t_i}^{(j)} \mid \xi = x)$$

Case $R^{(j)}$ GBM

We have $$\left(\frac{R_{t_i}^{(j)}}{R_{t_k}^{(j)}}\right) = \Delta_{t_k,t_i}^{(j)},$$

so that $R_{t_i}^{(j)} = R_{t_k}^{(j)} \exp(\Delta_{t_k,t_i}^{(j)})$.

Then $$\tilde{R}_{t_i}^{(j)} = E\left(R_{t_k}^{(j)} \exp(\Delta_{t_k,t_i}^{(j)}) \mid \varphi\right)$$
$$= R_{t_k}^{(j)} E(\exp(\Delta_{t_k,t_i}^{(j)}) \mid \varphi)$$
$$= R_{t_k}^{(j)} \exp\left(E(\Delta_{t_k,t_i}^{(j)} \mid \varphi) + \frac{1}{2}\mathrm{var}(\Delta_{t_k,t_i}^{(j)} \mid \varphi)\right)$$
$$= R_{t_k}^{(j)} \exp\left(E(\Delta_{t_k,t_i}^{(j)} \mid \xi = x) + \frac{1}{2}\mathrm{var}(\Delta_{t_k,t_i}^{(j)} \mid \xi = x)\right).$$

Backward Calculation

Suppose $R_{t_i}^{(j)}$ is not known and $R_{t_k}^{(j)}$ is known for some k>i, and $R_{t_\alpha}^{(j)}$ is not known for i<α<k.

Case $R^{(j)}$ BM

We have $(R_{t_k}^{(j)} - R_{t_i}^{(j)} = \Delta_{t_i,t_k}^{(j)}$, so that $(R_{t_i}^{(j)} = R_{t_k}^{(j)} - \Delta_{t_i,t_k}^{(j)}$.

Then $$\tilde{R}_{t_i}^{(j)} = E(R_{t_i}^{(j)}|\varphi) = R_{t_k}^{(j)} - E(\Delta_{t_i,t_k}^{(j)}|\xi = x).$$

Case $R^{(j)}$ GBM

We have $$\left(\frac{R_{t_k}^{(j)}}{R_{t_i}^{(j)}}\right) = \Delta_{t_i,t_k}^{(j)},$$

so that $R_{t_i}^{(j)} = R_{t_k}^{(j)} \exp(-\Delta_{t_i,t_k}^{(j)})$.

Then $$R_{t_i}^{\tilde{(j)}} = E(R_{t_i}^{(j)} | \varphi)$$
$$= R_{t_k}^{(j)} \exp\left(-E(\Delta_{t_i,t_k}^{(j)} | \xi = x) + \frac{1}{2} \text{var}(\Delta_{t_i,t_k}^{(j)} | \xi = x)\right).$$

Method 3: Simulated Rates 33

The approach here is to take a random drawing $\tilde{\theta}$ from $N(E(\theta|\xi=x), \text{cov}(\theta,\theta|\xi=x))$ which, together with the known rates, then determines $$\tilde{R}_{t_i}^{(j)}$$

for each unknown rate $R_{t_i}^{(j)}$. There is an orthonormal basis $\{s_1, \ldots, s_N\}$ of $R^N$ consisting of eigenvectors of $\text{cov}(\theta,\theta|\xi=x)$. Say $$s_j = \begin{pmatrix} s_{1j} \\ \vdots \\ s_{Nj} \end{pmatrix}$$

for j 1, ..., N. Put $$S \stackrel{df}{=} (s_1|\ldots|s_N) = (s_{ij})_{(i,j)}.$$

Then S is orthogonal and $$S^T \text{cov}(\theta, \theta | \xi = x) S = \begin{pmatrix} \mu_1 & & 0 \\ & \ddots & \\ 0 & & \mu_N \end{pmatrix},$$

where $\mu_j$ is the eigenvalue of $\text{cov}(\theta,\theta|\xi=x)$ corresponding to the eigenvector $s_j$, for $j=1, \ldots, N$. Without loss of generality, there is a unique t such that $0 \leq t \leq N$ and $\mu_1 \geq \mu_2 \geq \ldots \geq \mu_t > 0$ and $\mu_j=0$ for $j=t+1, \ldots, N$ (reordering the columns of B and renaming the eigenvectors and eigenvalues if necessary).

If t=0, we have $\text{cov}(\theta,\theta|\xi=x)=0$, so that we can take $\tilde{\theta}=E(\theta|\xi=x)$.

So suppose that t>0.

Let $\eta \sim N(E(\theta|\xi=x), \text{cov}(\theta,\theta|\xi=x))$. We can think of $\eta$ as "$\theta$ conditional on $\xi=x$". Let $E^*(\ )$ and $\text{cov}^*(,)$ denote the expectation and covariance operators, respectively, arising out of the conditional distribution $N(E(\theta|\xi=x), \text{cov}(\theta,\theta|\xi=x))$. Then we have $E^*(\eta)=E(\theta|\xi=x)$ and $\text{cov}^*(\eta,\eta)=\text{cov}(\theta,\theta|\xi=x)$.

$$\text{Put } \Delta^\oplus \stackrel{df}{=} \left(\begin{array}{ccc|c} \frac{1}{\sqrt{\mu_1}} & & 0 & \\ & \ddots & & 0 \\ 0 & & \frac{1}{\sqrt{\mu_t}} & \\ \hline & 0 & & 0 \end{array}\right)$$

and $$W \stackrel{df}{=} \Delta^\oplus S^T(\eta - E^*(\eta)).$$

Then $$E*(W) = 0, \text{ } \text{cov}*(W, W) = \left(\begin{array}{c|c} I_t & 0 \\ \hline 0 & 0 \end{array}\right)$$

and $$W = \begin{pmatrix} \frac{1}{\sqrt{\mu_1}} \sum_{j=1}^{N} s_{j1}(\eta_j - E*(\eta_j)) \\ \vdots \\ \frac{1}{\sqrt{\mu_t}} \sum_{j=1}^{N} s_{jt}(\eta_j - E*(\eta_j)) \\ \hline 0 \end{pmatrix},$$

so that $W_j=0$ for $j=t+1, \ldots, N$.

Thus $\tilde{W}_1, \ldots, \tilde{W}_t$ are uncorrelated $N(0,1)$ and therefore independent.

Now $$S(t) \stackrel{df}{=} (s_1| \ldots |s_t), \Delta(t) \stackrel{df}{=} \begin{pmatrix} \sqrt{\mu_1} & & 0 \\ & \ddots & \\ 0 & & \sqrt{\mu_t} \end{pmatrix} \text{ and } W(t) \stackrel{df}{=} \begin{pmatrix} W_1 \\ \vdots \\ W_t \end{pmatrix}.$$

Now $W=\Delta^\oplus S^T(\eta-E^*(\eta))$ implies that $\Delta(t)^{-1}S(t)^T(\eta-E^*(\eta))=W(t)$, so that $S(t)^T(\eta-E^*(\eta))=\Delta(t)W(t)$. We also have $(s_{t+1}| \ldots |s_N)^T(\eta-E^*(\eta))=0$ a.e.

But $S(t)=(s_1| \ldots |s_t)$. Thus we have $$S^T(\eta - E*(\eta)) = \begin{pmatrix} \Delta(t)W(t) \\ 0 \end{pmatrix} a.e..$$

Then $$\eta = E*(\eta) + S\begin{pmatrix} \Delta(t)W(t) \\ 0 \end{pmatrix}$$

a.e., because S is orthogonal.

Let $\tilde{W}_1, \ldots, \tilde{W}_t$ be uncorrelated drawings from $N(0,1)$. Then $$\tilde{\theta} = E(\theta | \xi = x) + S\begin{pmatrix} \sqrt{\mu_1} \tilde{W}_1 \\ \vdots \\ \sqrt{\mu_t} \tilde{W}_t \\ 0 \end{pmatrix}$$

can be taken to be a random drawing from $N(E(\theta|\xi=x), \text{cov}(\theta,\theta|\xi=x))$.

So we have shown how to take a random drawing $\tilde{\theta}$ from $N(E(\theta|\xi=x), \text{cov}(\theta,\theta|\xi=x))$ for t=0 and for t>0.

For $\Delta_i^{(j)}$ unknown, we can now take its simulated value, $\tilde{\Delta}_i^{(j)}$, to be $\tilde{\theta}_{\alpha_{ij}}$.

Finally, we use these $\tilde{\Delta}_i^{(j)}$ to derive simulated values of the unknown rates:

Forward Calculation

Suppose $R_{t_i}^{(j)}$ is not known and $R_{t_k}^{(j)}$ is known for some k<i and $R_{t_\alpha}^{(j)}$ is not known for k<α<i.

Case $R^{(j)}$ BM

We require $$\tilde{R}_{t_i}^{(j)} - R_{t_k}^{(j)} = \sum_{\alpha=k+1}^{i} \tilde{\Delta}_\alpha^{(j)},$$

so that $$\tilde{R}_{t_i}^{(j)} = R_{t_k}^{(j)} + \sum_{\alpha=k+1}^{i} \tilde{\Delta}_\alpha^{(j)}.$$

Case $R^{(j)}$ GBM

We require $$\ln(\tilde{R}_{t_i}^{(j)} / R_{t_k}^{(j)}) = \sum_{\alpha=k+1}^{i} \tilde{\Delta}_\alpha^{(j)},$$

so that $$\tilde{R}_{t_i}^{(j)} = R_{t_k}^{(j)} \exp\left(\sum_{\alpha=k+1}^{i} \tilde{\Delta}_\alpha^{(j)}\right).$$

Backward Calculation

Suppose $R_{t_i}^{(j)}$ is not known and $R_{t_k}^{(j)}$ is known for some k>i and $R_{t_\alpha}^{(j)}$ is not known for i<α<k.

Case $R^{(j)}$ BM

We require $$R_{t_k}^{(j)} - \tilde{R}_{t_i}^{(j)} = \sum_{\alpha=i+1}^{k} \tilde{\Delta}_\alpha^{(j)},$$

so that $$\tilde{R}_{t_i}^{(j)} = R_{t_k}^{(j)} - \sum_{\alpha=i+1}^{k} \tilde{\Delta}_\alpha^{(j)}.$$

Case $R^{(j)}$ GBM

We require $$\ln(R_{t_k}^{(j)} / \tilde{R}_{t_i}^{(j)}) = \sum_{\alpha=i+1}^{k} \tilde{\Delta}_\alpha^{(j)},$$

so that $$\tilde{R}_{t_i}^{(j)} = R_{t_k}^{(j)} \exp\left(-\sum_{\alpha=i+1}^{k} \tilde{\Delta}_\alpha^{(j)}\right).$$

Singularity and the Assumption of Consistency

It is possible to get anomalous results if the known rate changes are not consistent with the dependence relations, obtaining almost everywhere, that are implied by the unconditional rate dynamics, that is, if the assumption of consistency $(b_{r+1}|\ldots|b_M)^T x = (b_{r+1}|\ldots|b_M)^T E(\xi)$ is not satisfied. This assumption of consistency can only fail to be satisfied if $\text{cov}(\xi,\xi)$ is singular. How can one guarantee that $\text{cov}(\xi,\xi)$ is non-singular? $\text{cov}(\xi,\xi)$ is certainly non-singular if the unconditional covariance matrix of rate changes per unit interval of time for all the rate series in question is non-singular. But we can weaken this condition. One can show that if the unconditional covariance matrix of rate changes per unit interval of time for the rate series for which there are known rate changes (runs of length greater than or equal to one) is non-singular, then $\text{cov}(\xi,\xi)$ is also non-singular, so that the assumption of consistency is necessarily satisfied. Note that this is a sufficient, but not a necessary, condition for the assumption of consistency to be satisfied.

Worked Example

We give an example with two rate series and two time intervals because we wish to illustrate correlation effects across rate series and across time intervals. We will give calculated values rounded to six decimal places.

Let the rate series be $R^{(1)}$ and $R^{(2)}$, so that m, the number of rate series, is 2.

We first specify the unconditional rate dynamics.

We suppose that $R^{(1)}$ is a Geometric Brownian Motion and $R^{(2)}$ is a Brownian Motion.

Let the unconditional mean vector, μ, be $$\begin{pmatrix} 1 \\ 0 \end{pmatrix}$$

and the unconditional volatility vector, σ, be $$\begin{pmatrix} 1/2 \\ 1 \end{pmatrix}.$$

These are both expressed per unit interval of time. Let the unconditional correlation matrix, $$\rho = (\rho_{ij})_{(i,j)}, \text{ be } \begin{pmatrix} 1 & \frac{1}{2} \\ \frac{1}{2} & 1 \end{pmatrix}.$$

Then the unconditional covariance matrix per unit interval of time, $$\kappa = (\kappa_{ij})_{(i,j)}, \text{ is } \begin{pmatrix} \sigma_1^2 & \rho_{12}\sigma_1\sigma_2 \\ \rho_{21}\sigma_2\sigma_1 & \sigma_2^2 \end{pmatrix} = \begin{pmatrix} \frac{1}{4} & \frac{1}{4} \\ \frac{1}{4} & 1 \end{pmatrix}.$$

We now specify the incomplete rate data.

We take n, the number of time intervals, to be 2. We consider three times $t_0=0$, $t_1=1$ and $t_2=2$. Then $$\Delta t_1 \stackrel{df}{=} t_1 - t_0 = 1 \text{ and } \Delta t_2 \stackrel{df}{=} t_2 - t_1 = 1.$$

We put $$R \stackrel{df}{=} \begin{pmatrix} R_0^{(1)} & R_0^{(2)} \\ R_1^{(1)} & R_1^{(2)} \\ R_2^{(1)} & R_2^{(2)} \end{pmatrix}$$

and suppose that $$R = \begin{pmatrix} 1 & 1\frac{1}{2} \\ * & 1 \\ 2 & * \end{pmatrix},$$

where asterisks denote unknown rates. That is, we suppose that $R_0^{(1)}=1$, $R_2^{(1)}=2$, $R_0^{(2)}=1\frac{1}{2}$ and $R_1^{(2)}=1$ and that $R_1^{(1)}$ and $R_2^{(2)}$ are unknown. We put $$\varphi \stackrel{df}{=} R_0^{(1)} = 1 \wedge R_2^{(1)} = 2 \wedge R_0^{(2)} = 1\frac{1}{2} \wedge R_1^{(2)} = 1.$$

φ expresses what is known about the rate values.

We now determine the runs ξ and the unknown rate changes θ.

We have two runs:
$\Delta_{0,2}^{(1)} = \Delta_1^{(1)} + \Delta_2^{(1)} = \ln(2/1) = \ln(2)$
and $\Delta_1^{(2)} = 1 - 1\frac{1}{2} = -\frac{1}{2}$.

So we take $$\xi \stackrel{df}{=} \begin{pmatrix} \Delta_1^{(1)} + \Delta_2^{(1)} \\ \Delta_1^{(2)} \end{pmatrix},$$

so that $\xi_1 = \Delta_1^{(1)} + \Delta_2^{(1)}$ and $\xi_2 = \Delta_1^{(2)}$, and we will apply the conditioning $\xi = x$ where $$x \stackrel{df}{=} \begin{pmatrix} \ln(2) \\ -\frac{1}{2} \end{pmatrix} = \begin{pmatrix} 0.693147 \\ -\frac{1}{2} \end{pmatrix}.$$

The condition $\xi = x$ expresses the fact that the known rate changes take their known values.

We have $$M \stackrel{df}{=} \dim(\xi) = 2.$$

We $$\text{put } \Delta \stackrel{df}{=} \begin{pmatrix} \Delta_1^{(1)} & \Delta_1^{(2)} \\ \Delta_2^{(1)} & \Delta_2^{(2)} \end{pmatrix},$$

the matrix of rate changes over time intervals determined by successive points of time. Then $$\Delta = \begin{pmatrix} * & -\frac{1}{2} \\ * & * \end{pmatrix},$$

because $\Delta_1^{(2)} = -\frac{1}{2}$ and $\Delta_1^{(1)}$, $\Delta_2^{(1)}$ and $\Delta_2^{(2)}$ are unknown. Note that $\Delta$ does not contain information about runs of length $\geq 2$. We also put $$\theta \stackrel{df}{=} \begin{pmatrix} \Delta_1^{(1)} \\ \Delta_2^{(1)} \\ \Delta_2^{(2)} \end{pmatrix},$$

the vector of unknown rate changes over time intervals determined by successive points in time. Then $\theta_1 = \Delta_1^{(1)}$, $\theta_2 = \Delta_2^{(1)}$ and $\theta_3 = \Delta_2^{(2)}$.

Let us calculate cov(ξ,ξ).

We have $$\begin{aligned} cov(\xi_1, \xi_1) &= cov(\Delta_1^{(1)} + \Delta_2^{(1)}, \Delta_1^{(1)} + \Delta_2^{(1)}) \\ &= \Delta t_1 \sigma_1^2 + \Delta t_2 \sigma_1^2 \quad (\Delta_1^{(1)} \text{and } \Delta_2^{(1)} \text{are independent)} \\ &= \frac{1}{2}, \end{aligned}$$

$$\begin{aligned} cov(\xi_1, \xi_2) &= cov(\Delta_1^{(1)} + \Delta_2^{(1)}, \Delta_1^{(2)}) \\ &= cov(\Delta_1^{(1)}, \Delta_1^{(2)}) \quad (\Delta_2^{(1)} \text{and } \Delta_1^{(2)} \text{are independent)} \\ &= \Delta t_1 \kappa_{1,2} \\ &= \frac{1}{4}, \end{aligned}$$

and $$\begin{aligned} cov(\xi_2, \xi_2) &= cov(\Delta_1^{(2)}, \Delta_1^{(2)}) \\ &= \Delta t_1 \sigma_2^2 \\ &= 1, \end{aligned}$$

so that $$cov(\xi, \xi) = \begin{pmatrix} \frac{1}{2} & \frac{1}{4} \\ \frac{1}{4} & 1 \end{pmatrix}.$$

Let us now decompose cov(ξ,ξ).

If we take $$b_1 \stackrel{df}{=} \begin{pmatrix} 0.382683 \\ 0.923880 \end{pmatrix},$$

$$b_2 \stackrel{df}{=} \begin{pmatrix} 0.923880 \\ -0.382683 \end{pmatrix},$$

$$\lambda_1 \stackrel{df}{=} 1.103553$$

and $$\lambda_2 \stackrel{df}{=} 0.396447,$$

then $\{b_1, b_2\}$ is an orthonormal basis of eigenvectors of cov $(\xi,\xi)$ with corresponding eigenvalues $\lambda_1, \lambda_2$ satisfying $\lambda_1 \geq \lambda_2 > 0$, so that $$r \stackrel{df}{=} \operatorname{rank}(\operatorname{cov}(\xi,\xi)) = 2.$$

Note that we are not showing the working for this decomposition of $\operatorname{cov}(\xi,\xi)$: standard techniques exist for computing an orthonormal basis of eigenvectors of a real symmetric matrix and the associated eigenvalues.

Note that $\operatorname{cov}(\xi,\xi)$ is non-singular, so that the assumption of consistency is satisfied.

We now put $$B \stackrel{df}{=} (b_1 \mid b_2) = \begin{pmatrix} 0.382683 & 0.923880 \\ 0.923880 & -0.382683 \end{pmatrix}.$$

Then $$\operatorname{cov}(\xi,\xi)^{\oplus} = B \begin{pmatrix} \frac{1}{\lambda_1} & 0 \\ 0 & \frac{1}{\lambda_2} \end{pmatrix} B^T = \begin{pmatrix} 2.285714 & -0.571429 \\ -0.571429 & 1.142857 \end{pmatrix}.$$

We now compute $E(\theta \mid \xi = x)$ and $\operatorname{cov}(\theta, \theta \mid \xi = x)$.

We have $$E(\xi) = \begin{pmatrix} \Delta t_1 \mu_1 + \Delta t_2 \mu_1 \\ \Delta t_1 \mu_2 \end{pmatrix} = \begin{pmatrix} 2 \\ 0 \end{pmatrix},$$

$$E(\theta) = \begin{pmatrix} \Delta t_1 \mu_1 \\ \Delta t_2 \mu_1 \\ \Delta t_2 \mu_2 \end{pmatrix} = \begin{pmatrix} 1 \\ 1 \\ 0 \end{pmatrix},$$

$$\operatorname{cov}(\theta,\theta) = \begin{pmatrix} \operatorname{cov}(\Delta_1^{(1)}, \Delta_1^{(1)}) & \operatorname{cov}(\Delta_1^{(1)}, \Delta_2^{(1)}) & \operatorname{cov}(\Delta_1^{(1)}, \Delta_2^{(2)}) \\ \operatorname{cov}(\Delta_2^{(1)}, \Delta_1^{(1)}) & \operatorname{cov}(\Delta_2^{(1)}, \Delta_2^{(1)}) & \operatorname{cov}(\Delta_2^{(1)}, \Delta_2^{(2)}) \\ \operatorname{cov}(\Delta_2^{(2)}, \Delta_1^{(1)}) & \operatorname{cov}(\Delta_2^{(2)}, \Delta_2^{(1)}) & \operatorname{cov}(\Delta_2^{(2)}, \Delta_2^{(2)}) \end{pmatrix}$$

$$= \begin{pmatrix} \Delta t_1 \sigma_1^2 & 0 & 0 \\ 0 & \Delta t_2 \sigma_1^2 & \Delta t_2 \kappa_{1,2} \\ 0 & \Delta t_2 \kappa_{2,1} & \Delta t_2 \sigma_2^2 \end{pmatrix}$$

$$= \begin{pmatrix} 1/4 & 0 & 1/4 \\ 0 & 1/4 & 1/4 \\ 0 & 1/4 & 1 \end{pmatrix}$$

and $$\operatorname{cov}(\theta,\xi) = \begin{pmatrix} \operatorname{cov}(\Delta_1^{(1)}, \Delta_1^{(1)} + \Delta_2^{(1)}) & \operatorname{cov}(\Delta_1^{(1)}, \Delta_1^{(2)}) \\ \operatorname{cov}(\Delta_2^{(1)}, \Delta_1^{(1)} + \Delta_2^{(1)}) & \operatorname{cov}(\Delta_2^{(1)}, \Delta_1^{(2)}) \\ \operatorname{cov}(\Delta_2^{(2)}, \Delta_1^{(1)} + \Delta_2^{(1)}) & \operatorname{cov}(\Delta_2^{(2)}, \Delta_1^{(2)}) \end{pmatrix}$$

$$= \begin{pmatrix} \Delta t_1 \sigma_1^2 & \Delta t_1 \kappa_{1,2} \\ \Delta t_2 \sigma_1^2 & 0 \\ \Delta t_2 \kappa_{2,1} & 0 \end{pmatrix}$$

$$= \begin{pmatrix} 1/4 & 1/4 \\ 1/4 & 0 \\ 1/4 & 0 \end{pmatrix},$$

so that $$E(\theta \mid \xi = x) = E(\theta) + \operatorname{cov}(\theta,\xi)\operatorname{cov}(\xi,\xi)^{\oplus}(x - E(\xi)) = \begin{pmatrix} 0.368492 \\ 0.324656 \\ -0.675344 \end{pmatrix}$$

and $$\operatorname{cov}(\theta, \theta \mid \xi = x) = \operatorname{cov}(\theta,\theta) - \operatorname{cov}(\theta,\xi)\operatorname{cov}(\xi,\xi)^{\oplus}\operatorname{cov}(\theta,\xi)^T$$

$$= \begin{pmatrix} 0.107143 & -0.107143 & -0.107143 \\ -0.107143 & 0.107143 & 0.107143 \\ -0.107143 & 0.107143 & 0.857143 \end{pmatrix}.$$

Note that $$E(\Delta_1^{(1)} \mid \xi = x) + E(\Delta_2^{(1)} \mid \xi = x) = E(\theta_1 \mid \xi = x) + E(\theta_2 \mid \xi = x)$$

$$= 0.368492 + 0.324656$$

$$= 0.6931487 \text{ (correcting for the round-off error)}$$

$$= \ln(2)$$

$$= \Delta_{0,2}^{(1)}$$

$$= E(\Delta_{0,2}^{(1)} \mid \xi = x)$$

$$= E(\Delta_1^{(1)} + \Delta_2^{(1)} \mid \xi = x).$$

Distribution of Rate Changes

Let us just compute the bivariate conditional distribution of $$\begin{pmatrix} \Delta_1^{(1)} \\ \Delta_2^{(2)} \end{pmatrix}.$$

$$\begin{pmatrix} \Delta_1^{(1)} \\ \Delta_2^{(2)} \end{pmatrix}.$$

conditional on $\xi = x$, $$\sim N\left( \begin{pmatrix} E(\Delta_1^{(1)} \mid \xi = x) \\ E(\Delta_2^{(2)} \mid \xi = x) \end{pmatrix}, \begin{pmatrix} \operatorname{cov}(\Delta_1^{(1)}, \Delta_1^{(1)} \mid \xi = x) & \operatorname{cov}(\Delta_1^{(1)}, \Delta_2^{(2)} \mid \xi = x) \\ \operatorname{cov}(\Delta_2^{(2)}, \Delta_1^{(1)} \mid \xi = x) & \operatorname{cov}(\Delta_2^{(2)}, \Delta_2^{(2)} \mid \xi = x) \end{pmatrix} \right) =$$

-continued $$N\left(\begin{pmatrix} E(\theta_1|\xi=x) \\ E(\theta_3|\xi=x) \end{pmatrix}, \begin{pmatrix} cov(\theta_1,\theta_1|\xi=x) & cov(\theta_1,\theta_3|\xi=x) \\ cov(\theta_3,\theta_1|\xi=x) & cov(\theta_3,\theta_3|\xi=x) \end{pmatrix}\right) =$$

$$N\left(\begin{pmatrix} 0.368492 \\ -0.675344 \end{pmatrix}, \begin{pmatrix} 0.107143 & -0.107143 \\ -0.107143 & 0.857143 \end{pmatrix}\right).$$

We can also compute the conditional correlation coefficient of $\Delta_1^{(1)}$ and $\Delta_2^{(2)}$:

$$\rho(\Delta_1^{(1)}, \Delta_2^{(2)}|\xi=x) = \frac{cov(\Delta_1^{(1)}, \Delta_2^{(2)}|\xi=x)}{\sqrt{var(\Delta_1^{(1)}|\xi=x)}\sqrt{var(\Delta_2^{(2)}|\xi=x)}}$$

$$= \frac{-0.107143}{\sqrt{0.107143}\sqrt{0.857143}}$$

$$= -0.353554.$$

This is a non-zero correlation across the two rate series and across the two time intervals. Note that the Brownian Motion assumption implies that the unconditional correlation coefficient, $\rho(\Delta_1^{(1)},\Delta_2^{(2)})$, is zero.

Marginal Rate Distributions

The unknown rates are $R_1^{(1)}$ and $R_2^{(2)}$.

We can use a backward calculation for $R_1^{(1)}$ since $R_2^{(1)}$ is known.

Now $R^{(1)}$ is a GBM.

Then $\ln(R_1^{(1)})$, conditional on $\phi$, $$\sim N(\ln(R_2^{(1)}) - E(\Delta_{1,2}^{(1)}|\xi=x), var(\Delta_{1,2}^{(1)}|\xi=x)) =$$

$$N(\ln(2) - E(\Delta_2^{(1)}|\xi=x), var(\Delta_2^{(1)}|\xi=x)) =$$

$$N(\ln(2) - E(\theta_2|\xi=x), cov(\theta_2,\theta_2|\xi=x)) = N(0.368492, 0.107143).$$

Thus $\ln(R_1^{(1)})$ is normally distributed with an expected value of 0.368492 and a variance of 0.107143.

We must use a forward calculation for $R_2^{(2)}$ because $R_1^{(2)}$ is the only known rate for $R^{(2)}$.

Now $R^{(2)}$ is a Brownian Motion.

Then $R_2^{(2)}$, conditional on $\phi$, $$\sim N(R_1^{(2)} + E(\Delta_{1,2}^{(2)}|\xi=x), var(\Delta_{1,2}^{(2)}|\xi=x)) =$$

$$N(1 + E(\theta_3|\xi=x), cov(\theta_3,\theta_3|\xi=x)) = N(0.324656, 0.857143).$$

Thus $R_2^{(2)}$ is normally distributed with an expected value of 0.324656 and a variance of 0.857143.

Filling the Unknown Rates

Method 1: Expected Rate Changes

The filled value of $R_1^{(1)}$ is:

$$\tilde{R}_1^{(1)} = R_2^{(1)} \exp(-E(\Delta_{1,2}^{(1)}|\xi=x))$$

$$= 2\exp(-E(\theta_2|\xi=x))$$

$$= 2\exp(-0.324656)$$

$$= 1.445553.$$

The filled value of $R_2^{(2)}$ is $$\tilde{R}_2^{(2)} = R_1^{(2)} + E(\Delta_{1,2}^{(2)}|\xi=x)$$

$$= 1 + E(\theta_3|\xi=x)$$

$$= 1 - 0.647344$$

$$= 0.324656.$$

Method 2: Expected Rates

The filled value of $R_1^{(1)}$ is:

$$\tilde{R}_1^{(1)} = E(R_1^{(1)}|\varphi)$$

$$= R_2^{(1)} \exp\left(-E(\Delta_{1,2}^{(1)}|\xi=x) + \frac{1}{2}var(\Delta_{1,2}^{(1)}|\xi=x)\right)$$

$$= 2\exp\left(-E(\theta_2|\xi=x) + \frac{1}{2}cov(\theta_2,\theta_2|\xi=x)\right)$$

$$= 2\exp\left(-0.324656 + \frac{1}{2}0.107143\right)$$

$$= 1.525105.$$

The filled value of $R_2^{(2)}$ is:

$$\tilde{R}_2^{(2)} = E(R_2^{(2)}|\varphi)$$

$$= R_1^{(2)} + E(\Delta_{1,2}^{(2)}|\xi=x)$$

$$= 0.324656.$$

Method 3: Simulated Rates

We first decompose $cov(\theta,\theta|\xi=x)$.

If we take $$s_1 = \begin{pmatrix} -0.154488 \\ 0.154488 \\ 0.975892 \end{pmatrix}, s_2 = \begin{pmatrix} -0.690024 \\ 0.690024 \\ -0.218479 \end{pmatrix}, s_3 = \begin{pmatrix} 0.707107 \\ 0.707107 \\ 0 \end{pmatrix},$$

$$\mu_1 = 0.891067, \mu_2 = 0.180362 \text{ and } \mu_3 = 0,$$

then $\{s_1, s_2, s_3\}$ is an orthonormal basis of eigenvectors of $cov(\theta,\theta|\xi=x)$ with corresponding eigenvalues $\mu_1, \mu_2, \mu_3$ and $\mu_1 \geq \mu_2 > \mu_3 = 0$.

Then $$t \stackrel{df}{=} rank(cov(\theta,\theta|\xi=x)) = 2.$$

Put $$S^{df} = (s_1|s_2|s_3) = \begin{pmatrix} -0.154488 & -0.690024 & 0.707107 \\ 0.154488 & 0.690024 & 0.707107 \\ 0.975892 & -0.218479 & 0 \end{pmatrix}.$$

Let us just do one simulation.

Let $\tilde{W}_1 = 0.065137$ and $\tilde{W}_2 = -0.617774$ be independent random drawings from $N(0,1)$, the standard normal distribution.

Then take $$\tilde{\theta} = E(\theta|\xi = x) + S \begin{pmatrix} \sqrt{\mu_1} \tilde{W}_1 \\ \sqrt{\mu_2} \tilde{W}_2 \\ 0 \end{pmatrix} = \begin{pmatrix} 0.540029 \\ 0.153118 \\ -0.558022 \end{pmatrix}.$$

Now take
$\tilde{\Delta}_1^{(1)} = \tilde{\theta}_1 = 0.540029$,
$\tilde{\Delta}_2^{(1)} = \tilde{\theta}_2 = 0.153118$
and
$\tilde{\Delta}_2^{(2)} = \tilde{\theta}_3 = -0.558022$.
Note that $\tilde{\Delta}_1^{(1)} + \tilde{\Delta}_2^{(1)} = \ln(2) = \Delta_{0,2}^{(1)} = \Delta_1^{(1)} + \Delta_2^{(1)}$.
We can then take the simulated value of $R_1^{(1)}$ to be:

$$\tilde{R}_1^{(1)} = R_2^{(1)} \exp(-\tilde{\Delta}_2^{(1)})$$
$$= 2\exp(-\tilde{\Delta}_2^{(1)})$$
$$= 1.716057$$
$$(= R_0^{(1)} \exp(-\tilde{\Delta}_1^{(1)})),$$

and the simulated value of $R_2^{(2)}$ to be:

$$\tilde{R}_2^{(2)} = R_1^{(2)} + \tilde{\Delta}_2^{(2)}$$
$$= 1 + \tilde{\Delta}_2^{(2)}$$
$$= 0.441978.$$

Detecting Extreme Rates

Suppose that we are given (complete or incomplete) rate data together with the unconditional rate dynamics of the rate series concerned. Let K be the set of known rates. For each rate x belonging to K, let us use x to denote the rate considered as a random variable and let [x] denote the known value. Let $K_0$ be a subset, possibly empty, of K that consists of the known rates whose values are to be accepted without question. We wish to partition $K \backslash K_0$ into two sets, E and N, such that, for each $x \in E$, [x] is extreme relative to the values of the known rates in $K_0 \cup N$, and, for each $x \in N$, [x] is not extreme relative to the values of the known rates in $K_0 \cup N \backslash \{x\}$. The idea is that the values of the extreme rates, that is, those belonging to E, are to be considered potentially spurious.

For simplicity, we will assume that the conditional rate dynamics is Brownian Motion or Geometric Brownian Motion, or a combination of the two.

For simplicity, we will use a two-sided confidence interval, centred on the mean, for x if the rate series to which x belongs is a Brownian Motion (or is normally distributed) and a two-sided confidence interval, centred on the mean, for ln(x) if the rate series to which x belongs is a Geometric Brownian Motion (or is lognormally distributed). Note that other confidence intervals could be used.

Suppose $X \subseteq K$ and $x \notin X$.

If the rate series to which x belongs is a Brownian Motion (or is normally distributed), let $\mu(x,X)$ be the mean of x conditional on the known rates in X (taking their known values), let $\sigma(x,X)$ be the standard deviation of x conditional on the known rates in X, and put $$\eta(x, X) \stackrel{df}{=} \begin{cases} \left| \frac{[x] - \mu(x, X)}{\sigma(x, X)} \right| & \sigma(x, X) > 0 \\ 0 & \sigma(x, X) = 0 \wedge [x] = \mu(x, X) \\ +\infty & \text{otherwise.} \end{cases}$$

If the rate series to which x belongs is a Geometric Brownian Motion (or is lognormally distributed), let $\mu(x,X)$ be the mean of ln(x) conditional on the known rates in X, let $\sigma(x,X)$ be the standard deviation of ln(x) conditional on the known rates in X, and put $$\eta(x, X) \stackrel{df}{=} \begin{cases} \left| \frac{\ln([x]) - \mu(x, X)}{\sigma(x, X)} \right| & \sigma(x, X) > 0 \\ 0 & \sigma(x, X) = 0 \wedge \ln([x]) = \mu(x, X) \\ +\infty & \text{otherwise.} \end{cases}$$

Note that $\mu(x,X)$ and $\sigma(x,X)$ depend on calculated conditional rate dynamics.

Note also that $\eta(x,X)$ is the distance, measured in standard deviations, of the known value of x from the conditional mode of x.

Now let $p \in [0,1]$ be some nominated confidence level.

We define $$\varphi(x, X, p) \stackrel{df}{=} \begin{cases} \text{false if } X \text{ contains no known rate for the} \\ \text{rate series to which } x \text{ belongs} \\ \eta(x, X) > N^{-1}\left(\frac{p+1}{2}\right) \text{ otherwise} \end{cases},$$

"the value of x is extreme relative to the known rates in X", where $N^{-1}()$ is the inverse of the cumulative normal distribution function.

One can use the following algorithm to determine the sets E and N:

```
E ← ∅
N ← K\K_0
repeat
{
    if {x ∈ N\K_0| φ(x,N\{x},p)}≠∅
    {
        // exclude the most extreme rate
        choose x ∈ N\K_0 such that η(x,N\{x})=sup{η(y,N\{y}) | y ∈ N\K_0}
        N ← N\{x}
        E ← E∪{x}
        // are some rates now misclassified as extreme?
```

```
            repeat
            {
                (for each y ∈ E)
                (if ¬ φ(y,N,p)
                    {
                        N ← N∪{y}
                        E ← E\{y}
                    }
                )
            } until E does not change
        }
    } until E does not change
```
Note that the sets E and N are not uniquely determined.

Modelling Zero Coupon Rate Series as a (Geometric) Brownian Motion

The modelling system 1 allows the modelling of the zero coupon rate curves of several bond issuers at several trading dates given a number of bond trades, where specified zero coupon rate series of the several issuers are assumed to follow a (Geometric) Brownian Motion in several dimensions.

For each issuer, a set of maturity buckets, that is, a set of disjoint intervals covering all maturities of interest, is specified. For each issuer and each maturity bucket, a representative or standard maturity falling in the maturity bucket is specified. For each issuer, a pricing function for bonds of the issuer and a method of interpolation for zero coupon rates of the issuer are specified. For each issuer and each standard maturity, the rate type, that is, the compounding frequency and the notional number of days in a year, of the standard maturity zero coupon rate series of the issuer is specified. These rate types may vary from one standard maturity to another for the same issuer. The standard maturity zero coupon rate series, of the specified rate types, of the several issuers are assumed to follow a Brownian Motion or a Geometric Brownian Motion, or a combination of the two, in several dimensions. This involves, first, specifying, for each standard maturity zero coupon rate series of each issuer, the parametric model type (Brownian Motion or Geometric Brownian Motion), the volatility (standard deviation of the rate changes) per unit interval of time and the mean of the rate changes per unit interval of time, and, second, specifying a correlation coefficient of the rate changes for each pair of standard maturity zero coupon rate series (not necessarily of the same issuer). The unit interval of time relative to which the parameters for the (Geometric) Brownian Motion in several dimensions are expressed can be measured as calendar time or as trading time. The assumption of a (Geometric) Brownian Motion in several dimensions together with its associated parameters can be described as the specification of the unconditional zero coupon rate dynamics.

A number of trading dates, not necessarily uniformly spaced, are specified. For each trading date, zero or more traded bonds are specified. This involves specifying, for each traded bond, the issuer of the bond, the settlement date, the maturity date, the annual coupon rate, the annual coupon frequency and the traded yield whose compounding frequency is taken to be the given annual coupon frequency. Note that a bond that traded on two dates is here treated as two traded bonds because of the two trading dates, the two settlement dates and the two traded yields. It is assumed that, for each issuer and each trading date, the maturities of the traded bonds (of the given issuer) that traded on the given trading date are distinct. The specification of the trading dates and the traded bonds can be described as the specification of the traded bond data.

A standard maturity zero coupon rate series for a given issuer is taken to be "known" at a given trading date if there is a traded bond whose issuer is the given issuer, whose trading date is the given trading date and whose maturity, calculated from the given trading date, falls in the maturity bucket associated with the standard maturity zero coupon rate series. A standard maturity zero coupon rate series for a given issuer is taken to be "unknown" at a given trading date if it is not "known" at the given trading date. It is assumed that each standard maturity zero coupon rate series is "known" at at least one trading date. Note that a standard maturity zero coupon rate series that is "known" at some trading date does not have its value, at the given trading date, known with any certainty. Both the "known" and the "unknown" standard maturity zero coupon rates can be considered to be random.

The modelling method provides a way of estimating both the "known" and the "unknown" standard maturity zero coupon rates, for all issuers, all standard maturities and all trading dates, and depends on both the assumed unconditional zero coupon rate dynamics and the traded bond data. The modelling method employs an iterative technique for estimating the "known" and "unknown" standard maturity zero coupon rates and generates, for each issuer and each trading date, a zero coupon rate curve whose maturity points consist of, first, the maturities of the traded bonds whose issuers and trading dates are those associated with the curve, and, second, the standard maturities for the maturity buckets, for the issuer associated with the curve, in which the maturity of no traded bond, whose issuer and trading date are those associated with the curve, falls.

The modelling of zero coupon curves involves the following steps:

Step 1

For each issuer and each trading date for which there is at least one "known" standard maturity zero coupon rate for the given issuer at the given trading date, a zero coupon rate curve is constructed whose maturity points consist of the maturities of the traded bonds whose issuers and trading dates are those associated with the curve. Each zero coupon rate curve is constructed in such a way that pricing the traded bonds, associated with the curve, from the curve is consistent with the traded bond data associated with the curve. The curves are thus calibrated against the traded bond data. The curve construction employs not only the yields of the traded bonds, but also the specified pricing function for bonds of the issuer associated with the curve in question and the specified method of interpolation for zero coupon rates for the same issuer. The constructed curves are calibrated against the traded bond data, but do not incorporate correlation effects (or, more precisely, covariance effects) across issuers and trading dates. The curves are used to provide initial estimates for the "known" standard maturity zero coupon rates, and no interpolation is necessary to calculate these estimates from the curves. This step can be described as calculating initial estimates for the "known" standard maturity zero coupon rates.

Step 2

The "unknown" standard maturity zero coupon rates, for all issuers and all trading dates, are filled using the expected values of the standard maturity zero coupon rate changes conditional on the "known" standard maturity zero coupon rates (for all issuers and all trading dates) taking the current estimates of their values. In an alternative version, the "unknown" standard maturity zero coupon rates, for all issuers and all trading dates, are filled with their expected values conditional on the "known" standard maturity zero coupon rates (for all issuers and all trading dates) taking the current estimates of their values. The filling relies on the modelling method of aspect one. The filled values then provide estimates of the "unknown" standard maturity zero coupon rates. This step can be described as estimating the "unknown" standard maturity zero coupon rates, given estimates of the "known" standard maturity zero coupon rates.

Step 3

Given the current estimates of the "unknown" standard maturity zero coupon rates, a zero coupon rate curve is constructed for each issuer and for each trading date. The maturity points of each curve consist of, first, the maturities of the traded bonds whose issuers and trading dates are those associated with the curve, and, second, the standard maturities for the maturity buckets, for the issuer associated with the curve, in which the maturity of no traded bond, whose issuer and trading date are those associated with the curve, falls. These curves are constructed in such a way that, first, they are calibrated against the traded bond data and, second, the constructed zero coupon rates corresponding to "unknown" standard maturity zero coupon rates are determined by the given estimates of the "unknown" standard maturity zero coupon rates. The constructed curves provide the next estimates of the "known" standard maturity zero coupon rates, using the specified methods of interpolation, if need be. This step can be described as recalibrating the estimates of the "known" standard maturity zero coupon rates.

Steps 2 and 3 are repeated, as a pair of steps, until the successive estimates of the "known" standard maturity zero coupon rates are equal (or, in practice, until the successive estimates are sufficiently close), that is, until convergence is reached. Note that the repeated execution of steps 2 and 3 allows the progressive incorporation of correlation effects across bond maturities, issuers and trading dates into the estimates of the "known" and "unknown" standard maturity zero coupon rates. When (and if) convergence is reached, the most recent iterates of the curves constructed in step 3 can be taken to be reasonable proxies for the modes of the zero coupon rates conditional on the traded bond data or, in the alternative version, reasonable proxies for the expected values of the zero coupon curves conditional on the traded bond data. The generated zero coupon rate curves have two notable properties. First, the values of the "unknown" standard maturity zero coupon rates determined by the generated zero coupon rate curves are consistent with the expected values of the standard maturity zero coupon rate changes conditional on the "known" standard maturity zero coupon rates taking values determined by the generated curves, or, in the alternative version, the values of the "unknown" standard maturity zero coupon rates determined by the generated curves are the expected values of the "unknown" standard maturity zero coupon rates conditional on the "known" standard maturity zero coupon rate taking values determined by the generated curves. This means that correlation effects across issuers, maturities and trading dates have been incorporated into the generated curves. Second, the generated curves are calibrated against the traded bond data. The two properties together justify taking the generated zero coupon rate curves to be reasonable proxies for the modes of the zero coupon rates conditional on the traded bond data or, in the alternative version, reasonable proxies for the expected values of the zero coupon curves conditional on the traded bond data.

The generated curves enable the pricing, at any of the specified trading dates, of bonds (of the several issuers) other than the specified traded bonds. Thus one can estimate the values of portfolios of bonds of the several issuers at the specified trading dates in a manner consistent with the traded bond data. Such estimated portfolio values incorporate correlation effects across the trading dates, as well as across maturities and across issuers. Note that it is possible to include specified trading dates on which no specified traded bonds of any issuer traded. An example might be a future trading date.

A further two steps allow the approximate simulation of the zero coupon rate curves and of the "known" and "unknown" standard maturity zero coupon rates. The idea behind these two steps is that the values of the "known" standard maturity zero coupon rates are largely determined by the traded bond data and the conditional variation is largely concentrated in the "unknown" standard maturity zero coupon rates.

Step 4

The "unknown" standard maturity zero coupon rates are filled using simulated values conditional on the "known" standard maturity zero coupon rates taking values that result from convergence after the repeated execution of steps 2 and 3, where the alternative version of step 2 is not used. This manner of filling relies on the modelling method of aspect one. This step can be described as simulating the "unknown" standard maturity zero coupon rates.

Step 5

Given the simulated values of the "unknown" standard maturity zero coupon rates provided by step 4, a zero coupon rate curve is constructed for each issuer and for each trading date. The maturity points of each curve consist of, first, the maturities of the traded bonds whose issuers and trading dates are those associated with the curve, and, second, the standard maturities for the maturity buckets, for the issuer associated with the curve, in which the maturity of no traded bond, whose issuer and trading date are those associated with the curve, falls. The curves are constructed in such a way that, first, they are calibrated against the traded bond data and, second, the constructed zero coupon rates corresponding to the "unknown" standard maturity zero coupon rates are determined by the simulated values provided by step 4. The constructed curves are simulated and are correlated in a manner consistent with both the assumed unconditional zero coupon rate dynamics and the traded bond data. Simulated values of the "known" standard maturity zero coupon rates can be derived from the simulated curves, using the specified methods of interpolation, if need be. This step can be described as simulating the "known" standard maturity zero coupon rates.

Steps 4 and 5 are repeated, as a pair of steps, to provide as many simulations of the calibrated zero coupon rate curves and of the associated "known" and "unknown" standard maturity zero coupon rates as is desired. These simulations are conditional on the traded bond data.

The simulated curves enable the pricing, at any of the specified trading dates, of bonds (of the several issuers) other than the specified traded bonds. Thus one can simulate the values of portfolios of bonds of the several issuers at the specified trading dates in a manner consistent with the traded bond data. Such simulations incorporate correlation effects across the trading dates, as well as across maturities and across issuers.

Modelling Zero Coupon Rate Spread Series as a (Geometric) Brownian Motion

The modelling system 1 allows the modelling of the zero coupon rate curves of several bond issuers at several trading dates given a number of bond trades, where specified zero coupon rate spread series of the several issuers are assumed to follow a (Geometric) Brownian Motion in several dimensions.

For each issuer, a set of maturity buckets is specified. It is assumed that the number of maturity buckets is the same for all issuers. For each issuer and each maturity bucket, a representative or standard maturity falling in the maturity bucket is specified.

The maturity buckets for each issuer are ordered in ascending order of the associated standard maturities. This ordering is used to set up a correspondence between the maturity buckets of any given issuer and those of any other issuer. The standard maturities for any given issuer would normally be chosen to be equal to the corresponding standard maturities for the other issuers.

For each issuer, a pricing function for bonds of the issuer and a method of interpolation for zero coupon rates of the issuer are specified. For each issuer and each standard maturity, the rate type, that is, the compounding frequency and the notional number of days in a year, of the standard maturity zero coupon rate series of the issuer is specified.

It is assumed that one of the issuers, the base issuer, is, at all times, of a strictly higher credit quality than the other issuers.

The standard maturity zero coupon rate spread series can be specified in one of two ways. Firstly, the standard maturity zero coupon rate spread series for the base issuer are the standard maturity zero coupon rate series for the base issuer (one for each maturity bucket of the base issuer). For each of the remaining issuers and for each maturity bucket of the given issuer, there is a standard maturity zero coupon rate spread series defined to be the difference between the standard maturity zero coupon rate series associated with the given issuer and the given maturity bucket and the standard maturity zero coupon rate series associated with the base issuer and the maturity bucket, of the base issuer, that corresponds with the given maturity bucket. In this case, the specified standard maturity zero coupon rate spread series can be described as series of spreads over the base issuer.

Secondly, it is assumed that the issuers are ordered in strictly descending order of credit quality, so that the base issuer is the first issuer. The standard maturity zero coupon rate spread series for the base issuer are the standard maturity zero coupon rate series for the base issuer (one for each maturity bucket of the base issuer). For each of the remaining issuers and for each maturity bucket of the given issuer, there is a standard maturity zero coupon rate spread series defined to be the difference between the standard maturity zero coupon rate series associated with the given issuer and the given maturity bucket and the standard maturity zero coupon rate series associated with the previous issuer and the maturity bucket, of the previous issuer, that corresponds with the given maturity bucket. In this case, the specified standard maturity zero coupon rate spread series can be described as series of successive spreads.

We can refer to the standard maturity zero coupon rate spread series as spread series.

The spread series of the several issuers are assumed to follow a (Geometric) Brownian Motion in several dimensions. This involves, first, specifying, for each spread series of each issuer, the parametric model type (Geometric Brownian Motion or Brownian Motion), the volatility (standard deviation of the spread changes) per unit interval of time and the mean of the spread changes per unit interval of time, and, second, specifying a correlation coefficient of the spread changes for each pair of spread series. The unit interval of time relative to which the parameters for the (Geometric) Brownian Motion in several dimensions are expressed can be measured as calendar time or as trading time. The assumption of a (Geometric) Brownian Motion in several dimensions together with its associated parameters can be described as the specification of the unconditional spread dynamics.

We will make the assumption that each spread series follows a Geometric Brownian Motion. This assumption ensures that spreads are positive. In the case of spreads over the base issuer, positive spreads reflect the assumption that the base issuer is, at all times, the issuer of highest credit quality. In Australia, the base issuer could be taken to be the Commonwealth of Australia. In the case of successive spreads, positive spreads reflect the assumption that the issuers are, at all times, strictly ordered by credit quality. Here, the term issuer can be interpreted to mean issuer class, for example, AAA or AA+, as defined by a ratings agency. Such issuer classes have a defined unchanging ordering by credit quality, whereas the relative credit quality of individual issuers can change over time.

A number of trading dates, not necessarily uniformly spaced, are specified. For each trading date, zero or more traded bonds are specified. This involves specifying, for each traded bond, the issuer of the bond, the settlement date, the maturity date, the annual coupon rate, the annual coupon frequency and the traded yield whose compounding frequency is taken to be the given annual coupon frequency. Note that a bond that traded on two dates is here treated as two traded bonds because of the two trading dates, the two settlement dates and the two traded yields. It is assumed that, for each issuer and each trading date, the maturities of the traded bonds, of the given issuer, that traded on the given trading date are distinct. The specification of the trading dates and the traded bonds can be described as the specification of the traded bond data.

A standard maturity zero coupon rate series for a given issuer is taken to be "known" at a given trading date if there is a traded bond whose issuer is the given issuer, whose trading date is the given trading date and whose maturity, calculated from the given trading date, falls in the maturity bucket associated with the standard maturity zero coupon rate series. A standard maturity zero coupon rate series for a given issuer is taken to be "unknown" at a given trading date if it is not "known" at the given trading date. These definitions of "known" and "unknown" standard maturity zero coupon rate series induce natural definitions of "known" and "unknown" spread series, spreads and spread changes. It is assumed that each spread series is "known" at at least one trading date. A spread series that is "known" at some trading date does not have its value, at the given trading date, known with any certainty. Both the "known" and the "unknown" spreads, as well as the "known" and the "unknown" standard maturity zero coupon rate series, can be considered to be random.

The modelling method provides a way of estimating both the "known" and the "unknown" standard maturity zero coupon rates (for all issuers, all standard maturities and all trading dates) and depends on both the assumed unconditional spread dynamics and the traded bond data. The modelling method employs an iterative technique for estimating the "known" and "unknown" standard maturity zero coupon rates and generates, for each issuer and each trading date, a zero coupon rate curve whose maturity points consist of, first, the maturities of the traded bonds whose issuers and trading dates are those associated with the curve, and, second, the standard maturities for the maturity buckets, for the issuer associated with the curve, in which the maturity of no traded bond, whose issuer and trading date are those associated with the curve, falls.

The modelling method involves the following steps:

Step 1

For each issuer and each trading date for which there is at least one "known" standard maturity zero coupon rate for the given issuer at the given trading date, a zero coupon rate curve is constructed whose maturity points consist of the maturities of the traded bonds whose issuers and trading dates are those associated with the curve. Each zero coupon rate curve is constructed in such a way that pricing the traded bonds, associated with the curve, from the curve is consistent with the traded bond data associated with the curve. The curves are thus calibrated against the traded bond data. The curve construction employs not only the yields of the traded bonds, but also the specified pricing function for bonds of the issuer associated with the curve in question and the specified method of interpolation for zero coupon rates for the same issuer. The constructed curves are calibrated against the traded bond data, but do not incorporate correlation effects across issuers and across trading dates. The curves are used to provide initial estimates for the "known" standard maturity zero coupon rates, and no interpolation is necessary to calculate these estimates from the curves. This step can be described as calculating initial estimates for the "known" standard maturity zero coupon rates.

Step 2

The current estimates of the values of the "known" standard maturity zero coupon rates induce current estimates of the values of the "known" spreads. One cannot simply fill the "unknown" spreads using the expected values of the spread changes conditional on the "known" spreads taking the current estimates of their values because passing from the current estimates of the values of the "known" standard maturity zero coupon rates to the induced current estimates of the values of the "known" spreads involves loss of information. This loss of information can be repaired by adding a set of constraints that relate the "unknown" spreads to the current estimates of the "known" standard maturity zero coupon rates. Each such constraint is linear in the "unknown" spreads. These constraints are, on the face of it, intractable because the assumed unconditional spread dynamics is expressed in terms of spread changes and not in terms of spreads. But the assumed unconditional spread dynamics and the assumption that each spread is "known" at at least one trading date enable the linear constraints to be transformed into non-linear constraints on the "unknown" spread changes. Each of these constraints can be expressed as an equation where the left hand side is a differentiable function of several "unknown" spread changes and the right hand side is a constant that depends on the current estimates of the "known" standard maturity zero coupon rates. Now the problem is the non-linearity of the left hand sides of these constraint equations. The differentiability of the left hand sides enables affine approximations of the left hand sides to be calculated, given some estimate of the "unknown" spread changes. Assuming some estimate of the "unknown" spread changes, one can fill the "unknown" spreads using the expected values of the spread changes conditional both on the "known" spreads taking the current estimates of their values and on the linearised constraint equations being satisfied, where affine approximations of the left hand sides are used. These filled "unknown" spreads are not, in general, consistent with the current estimates of the "known" standard maturity zero coupon rates. But the filled "unknown" spreads, combined with the current induced estimates of the values of the "known" spreads, can provide new estimates of the "unknown" spread changes that, in turn, can provide improved affine approximations of the left hand sides of the constraint equations. An iterative process is used to refine continuously the affine approximations until successive estimates of the filled "unknown" spreads are equal, that is, until convergence is reached. One can prove that, when convergence is reached, the filled "unknown" spreads are necessarily consistent with the current estimates of the "known" standard maturity zero coupon rates. In particular, if the filled "unknown" spreads are taken as the values of the "unknown" spreads, then the linear constraints on the "unknown" spreads that were discussed earlier are satisfied exactly. One can then use the filled "unknown" spreads and the current estimates of the "known" standard maturity zero coupon rates to derive the next estimates of the "unknown" standard maturity zero coupon rates. This step can be described as estimating the "unknown" standard maturity zero coupon rates, given estimates of the "known" standard maturity zero coupon rates.

Step 3

Given the current estimates of the "unknown" standard maturity zero-coupon rates, a zero coupon rate curve is constructed for each issuer and trading date. The maturity points of each curve consist of, first, the maturities of the traded bonds whose issuers and trading dates are those associated with the curve, and, second, the standard maturities for the maturity buckets, for the issuer associated with the curve, in which the maturity of no traded bond, whose issuer and trading date are those associated with the curve, falls. These curves are constructed in such a way that, first, they are calibrated against the traded bond data and, second, the constructed zero coupon rates corresponding to "unknown" standard maturity zero coupon rates are determined by the given estimates of the "unknown" standard maturity zero coupon rates. The constructed curves provide the next estimates of the "known" standard maturity zero coupon rates, using the specified methods of interpolation, if need be. This step can be described as recalibrating the estimates of the "known" standard maturity zero coupon rates.

Steps 2 and 3 are repeated, as a pair of steps, until the successive estimates of the "known" standard maturity zero coupon rates are equal, that is, until convergence is reached. Note that the repeated execution of steps 2 and 3 allows the progressive incorporation of correlation effects across bond maturities, issuers and trading dates into the estimates of the "known" and "unknown" standard maturity zero coupon rates. When convergence is reached, the most recent iterates of the curves constructed in step 3 can be taken to be reasonable proxies for the modes of the zero coupon rates conditional on the traded bond data. The generated zero coupon rate curves have two notable properties. First, the values of the "unknown" standard maturity zero coupon rates determined by the generated zero coupon rate curves are consistent with the expected values of the spread changes conditional on the "known" spreads taking values determined by the generated zero coupon rate curves, where the calculation of the expected values is understood to rely on the affine approximations that result from step 2. This means that correlation effects across issuers, maturities and trading dates have been incorporated into the generated curves. Second, the generated curves are calibrated-against the traded bond data. The two properties together justify taking the generated zero coupon rate curves to be reasonable proxies for the modes of the zero coupon curves rates conditional on the traded bond data.

The generated curves enable the pricing, at any of the specified trading dates, of bonds (of the several issuers) other than the specified traded bonds. Thus one can estimate the values of portfolios of bonds of the several issuers at the specified trading dates in a manner consistent with the traded bond data. Such estimated portfolio values incorporate correlation effects across the trading dates, as well as across maturities and issuers. Note that it is possible to include specified trading dates on which no specified traded bonds of any issuer traded. An example might be a future trading date.

A further two steps allow the approximate simulation of the zero coupon rate curves and of the "known" and "unknown" standard maturity zero coupon rates. The idea behind these two steps is that the values of the "known" standard maturity zero coupon rates are largely determined by the traded bond data and the conditional variation is largely concentrated in the "unknown" spreads. Note that the "known" standard maturity zero coupon rates and the "unknown" spreads together determine the "unknown" standard maturity zero coupon rates.

Step 4

The "unknown" spreads are filled using simulated values conditional both on the "known" spreads taking the values that result from convergence after the repeated execution of steps 2 and 3 and on the linearised constraint equations, that also result from convergence, being satisfied. Note that, because of the affine approximations employed, the filled "unknown" spread values are not, in general, quite consistent with the values of the "known" standard maturity zero coupon rates that result from convergence. One can use the values of the "known" standard maturity zero coupon rates and the simulated values of the "unknown" spreads to derive simulated values of the "unknown" standard maturity zero coupon rates. Because of the possible lack of consistency mentioned above, there is some latitude in the method of deriving the simulated values of the "unknown" standard maturity zero coupon rates. This step can be described as simulating the "unknown" standard maturity zero coupon rates.

Step 5

Given the simulated values of the "unknown" standard maturity zero coupon rates provided by step 4, a zero coupon rate curve is constructed for each issuer and each trading date. The maturity points of each curve consist of, first, the maturities of the traded bonds whose issuers and trading dates are those associated with the curve, and, second, the standard maturities for the maturity buckets, for the issuer associated with the curve, in which the maturity of no traded bond, whose issuer and trading date are those associated with the curve, falls. The curves are constructed in such a way that, first, they are calibrated against the traded bond data and, second, the constructed zero coupon rates corresponding to the "unknown" standard maturity zero coupon rates are determined by the simulated values provided by step 4. The constructed curves are simulated and are correlated in a manner consistent with both the assumed unconditional zero coupon rate dynamics and the traded bond data. Simulated values of the "known" standard maturity zero coupon rates can be derived from the simulated curves, using the specified methods of interpolation, if need be. This step can be described as simulating the "known" standard maturity zero coupon rates.

Steps 4 and 5 are repeated, as a pair of steps, to provide as many simulations of the calibrated zero coupon rate curves and of the associated "known" and "unknown" standard maturity zero coupon rates as is desired. These simulations are conditional on the traded bond data.

The simulated curves enable the pricing, at any of the specified trading dates, of bonds (of the several issuers) other than the specified traded bonds. Thus one can simulate the values of portfolios of bonds of the several issuers at the specified trading dates in a manner consistent with the traded bond data. Such simulations incorporate correlation effects across the trading dates, as well as across maturities and issuers.

In the technical material that follows, it is noted that the assumption is made that the multiplication of any undefined term by zero is equal to zero.

Technical Description: Modelling Bond Curves

Let P(y) be the total price of a given bond as a function of the bond's yield-to-maturity, quoted on some trading date. Note that it is possible to use different bond pricing functions for different bond issuers or even for different bonds of a given issuer. By way of example, let us give the following generalisation of the Reserve Bank of Australia's pricing formula for government bonds:

$$P(y) \stackrel{df}{=} \begin{cases} d^f \left( P_0 d^{n-1} + \frac{FC}{yd}(1-d^n) - C\chi_{\{m \leq EXDAYS\}} \right) & \text{if } n > 1 \\ \frac{P_0 + C\chi_{\{m > EXDAYS\}}}{1 + ym/B} & \text{if } n = 1 \end{cases}$$

where:

n is the number of coupon dates remaining after settlement (so that n−1 whole coupon periods remain unless settlement occurs on a coupon date), y is the yield-to-maturity, expressed as a decimal, $$\chi\{\varphi\} \stackrel{df}{=} \begin{cases} 1 & \text{if } \varphi \text{ is true} \\ 0 & \text{otherwise} \end{cases},$$

for any boolean expression $\varphi$, $P_0$ is the face value of the bond,

F is the annual coupon frequency (a divisor of 12), m is the number of days from settlement to the next coupon date (after settlement), M is the number of days from the last coupon date on or before settlement to the next coupon date (after settlement), $f \stackrel{df}{=} m/M$, the fraction of the current coupon period remaining, $d \stackrel{df}{=} 1/(1 + y/F)$, the discount factor per coupon period, $C \stackrel{df}{=} P_0$ Coupon/F, the normal coupon payment, Coupon is the coupon rate of the bond, expressed as a decimal, and EXDAYS is the length of the ex coupon period in days.

This formula uses bill pricing if settlement falls in the last coupon period. If settlement does not fall in the last coupon period, we have $$P(y) = d^f \left( P_0 d^{n-1} + C \left( \chi_{\{m > EXDAYS\}} + \sum_{j=2}^{n} d^{j-1} \right) \right)$$

If we are given a total bond price P, we can calculate a bond's implied yield by solving the equation P(y)=P numerically for y. There is, in general, no analytical method of calculating implied yields.

Let us represent a zero coupon rate curve for a given issuer and a given trading date by $C=((s_j,r_j))_{j=1,\ldots,n}$, where $n \geq 0$ is the number of maturity points, $r_j$ is the continuously compounding zero coupon rate of maturity $s_j$ days from the trading date, for each $j \in \{1, \ldots, n\}$, and the maturities are ordered $0 < s_1 < \ldots < s_n$. If n=0, the curve is empty, and we will use the notation $C=\emptyset$.

Let I represent an interpolation function: for a given maturity $\tau$ in days and a given zero coupon rate curve C, $I(\tau,C)$ will represent the interpolated continuously compounding zero coupon rate of maturity $\tau$. Note that it is possible to use different interpolation functions for different issuers.

We can price a given bond from a given curve C:

$$P(y) = e^{I(\tau_0,C)\tau_0/B} \sum_{j=1}^{v} e^{-I(\tau_j,C)\tau_j/B} X_j$$

and solve numerically for the yield-to-maturity y, where
  $\tau_0 \geq 0$ is the maturity in days of the settlement of the bond,
  B is the notional number of days in a year, and
  $((\tau_j, X_j))_{j=1, \ldots, v}$ is the schedule of remaining cash-flows of the bond (for each $j=1, \ldots, v$, $X_j$ is the amount paid by the issuer to the bond-holder at the maturity $\tau_j$, on the assumption that the bond-holder owns the bond from settlement until maturity).

Note that the schedule of cash-flows takes account of ex coupon periods. Note also that the notional number of days in a year could here be different from the notional number of days in a year that figures in the bond pricing function.

Now let $C=((s_j,r_j))_{j=1,\ldots,n}$ be a curve for some trading date and let y be the known yield of a bond whose maturity is $\tau$ days from the given trading date. We suppose that $\tau > s_n$ if $n \geq 1$ and $\tau > 0$ if n=0. We now show how to add to C a maturity point corresponding to $\tau$ in a way that is consistent with the yield y. For $x \in \mathbb{R}$, let $C[(\tau,x)]$ be $C \cup \{(\tau,x)\}$. We can solve the equation $$P(y) = e^{I(\tau_0,C[(\tau,x)])\tau_0/B} \sum_{j=1}^{v} e^{-I(\tau_j,C[(\tau,x)])\tau_j/B} X_j$$

numerically for x, where, as before, $((\tau_j, X_j))_{j=1, \ldots, v}$ is the schedule of cash-flows of the bond and $\tau_0 \geq 0$ is the maturity in days of the bond's settlement which is assumed to be no earlier than the given trading date. Let x=r(y,C) be the solution. Then the bond's yield implied by the curve $C \cup \{(\tau, r(y, C))\}$ is y, so that the extended curve $C \cup \{(\tau, r(y, C))\}$ is calibrated against the given yield y.

We now suppose that we have $K \geq 1$ issuers, indexed by $k=1, \ldots, K$. We can associate, with each issuer k, a bond pricing function $P^{(k)}$, a notional number of days in a year $B^{(k)}$ and an interpolation function $I^{(k)}$. For each issuer k, we suppose that we have a family, $(B_m^{(k)})_{m=1, \ldots, \beta^{(k)}}$, of $\beta^{(k)} \geq 1$ maturity buckets, where, for each $m \in \{1, \ldots, \beta^{(k)}\}$, $B_m^{(k)}$ is a closed interval $[a_m^{(k)}, b_m^{(k)}]$ for some $a_m^{(k)}, b_m^{(k)} \in \mathbb{N}$ satisfying $a_1^{(k)}=1$ and $a_m^{(k)}=b_{m-1}^{(k)}+1$ for $m=2, \ldots, \beta^{(k)}$. Then, for each k, we have $$\bigcup_{m=1}^{\beta^{(k)}} B_m^{(k)} \cap \mathbb{N} = \{1, \ldots, b_{\beta^{(k)}}^{(k)}\}$$

and $m(B_m^{(k)} \cup B_{m'}^{(k)})=0$ for distinct $m,m' \in \{1, \ldots, \beta^{(k)}\}$. We will assume that, for each k, $b_{\beta^{(k)}}^{(k)}$ is greater than or equal to the longest maturity (in days) of the bonds of issuer k with which we will be concerned.

We assume that we have N+1 trading dates $D_0, \ldots, D_N$ of interest where $N \geq 0$ and $D_0 < \ldots < D_N$. We also assume that we have N+1 associated times $t_0, \ldots, t_N$. The unit of time for the times $t_0, \ldots, t_N$ could be one trading day or one calendar day. For each $i \in \{0, \ldots, N\}$ and each $k \in \{1, \ldots, K\}$, we suppose that we are given $N(k,i) \geq 0$ bonds of issuer k that traded on the date $D_i$. For each traded bond, we are given, besides the issuer and the trading date, the settlement, the maturity, the coupon rate, the annual coupon frequency (a divisor of 12) and the traded yield. For each (k,i), we suppose that the N(k,i) bonds have distinct maturities. Let these bonds be indexed by $\alpha \in \{1, \ldots, N(k,i)\}$. Let the maturity (in days) of bond $\alpha$ be $\tau_\alpha^{(k,i)}$ and let its traded yield be $y_\alpha^{(k,i)}$. There is no loss of generality in supposing that $0 < \tau_1^{(k,i)} < \ldots < \tau_{N(k,i)}^{(k,i)}$. We will use the symbol $\pi$ to represent the traded bond data.

Definition $$K(k, i, m) \stackrel{df}{=} 1 \leq k \leq K \wedge 0 \leq i \leq N \wedge 1 \leq$$
$$m \leq \beta^{(k)} \wedge (\exists\, \alpha)(1 \leq \alpha \leq N(k, i) \wedge \tau_\alpha^{(k,i)} \in \mathcal{B}_m^{(k)})$$

"Some bond whose issuer is k and whose maturity fell in bucket m traded on date i."

Note that K(k,i,m) depends both on $\pi$ and on the maturity buckets $((B_m^{(k)})_{m=1, \ldots, \beta^{(k)}})_{k=1, \ldots, K}$.

Zero Coupon Rate Series

For each $k \in \{1, \ldots, K\}$ and each $m \in \{1, \ldots, \beta^{(k)}\}$, we have the zero coupon rate series $$R^{(k)}(m) \stackrel{df}{=} \left( R_t^{(k)}(m) \right)_{t \in \mathbb{R}},$$

where $R_t^{(k)}(m)$ is the zero coupon rate of issuer k at time t of compounding frequency $F_m^{(k)}$ and of maturity $M_m^{(k)}$ days, and $F_m^{(k)} \in (0, +\infty]$ and $M_m^{(k)} \in B_m^{(k)}$ are assumed to be specified. $M_m^{(k)}$ can be called the standard maturity for issuer k and bucket m. We will say that $R_{t_i}^{(k)}(m)$ is "known" if K(k,i,m) and "unknown" if $\neg K(k,i,m)$.

We will need the following two conversion functions:

$$FROMCONTINUOUS(r, F) \stackrel{df}{=} r\chi_{\{F=\infty\}} + F(e^{r/F} - 1)\chi_{\{0 < F < \infty\}}$$

$$TOCONTINUOUS(r, F) \stackrel{df}{=} r\chi_{\{F=\infty\}} + F(\ln(1 + r/F))\chi_{\{0 < F < \infty\}}$$

for $F \in (0, +\infty]$ and $r \in \mathbb{R}$.

If r is a continuously compounding rate, then FROMCONTINUOUS(r,F) is the corresponding rate of compounding frequency F. If r is a rate of compounding frequency F, then TOCONTINUOUS(r,F) is the corresponding continuously compounding rate.

Definition

For a curve C and a maturity $\tau$, let $C|\tau$ be the restriction of C to the maturity points $\leq \tau$.

Calibration Functions

Given $k \in \{1, \ldots, K\}$, $i \in \{0, \ldots, N\}$ and $\pi$, we can construct a curve $C^{(k,i)}(\pi)$:

for $k = 1$ to $K$ for $i = 0$ to $N$ $$\begin{bmatrix} C^{(k,i)}(\pi) \leftarrow \phi \\ \text{for } \alpha = 1 \text{ to } N(k,i) \\ C^{(k,i)}(\pi) \leftarrow C^{(k,i)}(\pi)[(\tau_\alpha^{(k,i)}, r(y_\alpha^{(k,i)}, C^{(k,i)}(\pi)))] \end{bmatrix}$$

Note that, when calculating $r(y_\alpha^{(k,i)}, C^{(k,i)}(\pi))$, we use $I^{(k)}$, $B^{(k)}$ and $P^{(k)}$. Once the curve construction has been completed, each curve $C^{(k,i)}(\pi)$, associated with issuer k and trading date $D_i$, has N(k,i) maturity points, and, for each $\alpha \in \{1, \ldots, N(k,i)\}$, the yield of bond $\alpha$ implied by $C^{(k,i)}(\pi)|\tau_\alpha^{(k,i)}$ is the given yield $y_\alpha^{(k,i)}$. Thus we may say that the curves $(C^{(k,i)}(\pi))_{(k,i)}$ are calibrated against the traded bond data $\pi$.

We can now interpolate the "known" standard maturity zero coupon rates:

$$C(\pi) \stackrel{df}{=} (FROMCONTINUOUS(I^{(K)}(M_m^{(k)}, C^{(k,i)}(\pi)), F_m^{(k)}))_{K(k,i,m)}.$$

Suppose that $X = (X_{(k,i,m)})_{\neg K(k,i,m)}$ is an estimate of the "unknown" standard maturity zero coupon rates and $Y = (Y_{(k,i,m)})_{K(k,i,m)}$ is an estimate of the "known" standard maturity zero coupon rates. Then we can form an estimate $R(X, Y) = (R_{(k,i,m)}(X,Y))_{(k,i,m)}$ of all the rates $R_{t_i}^{(k)}(m)$ by putting $$R_{(k,i,m)}(X, Y) \stackrel{df}{=} X_{(k,i,m)} \chi_{\{\neg K(k,i,m)\}} + Y_{(k,i,m)} \chi_{\{K(k,i,m)\}}.$$

We now show how to construct calibrated curves given $\pi$ and an estimate X of the "unknown" (standard maturity zero coupon) rates:

for $k = 1$ to $K$ for $i = 0$ to $N$ $$\begin{bmatrix} C^{(k,i)}(X, \pi) \leftarrow \phi \\ \text{for } m = 1 \text{ to } \beta^{(k)} \\ \begin{bmatrix} \text{if } K(k, i, m) \\ \begin{bmatrix} \text{for } \alpha = 1 \text{ to } N(k, i) \\ C^{(k,i)}(X, \pi) \leftarrow C^{(k,i)}(X, \pi)[(\tau_\alpha^{(k,i)}, r(y_\alpha^{(k,i)}, C^{(k,i)}(X, \pi)))] \end{bmatrix} \\ \text{else} \\ \begin{bmatrix} C^{(k,i)}(X, \pi) \leftarrow \\ C^{(k,i)}(X, \pi) \cup \{(M_m^{(k)}, TOCONTINUOUS(X_{(k,i,m)}, F_m^{(k)}))\} \end{bmatrix} \end{bmatrix} \end{bmatrix}$$

Note that each curve $C^{(k,i)}(X, \pi)$ has $N(k,i) + |\{m \in \{1, \ldots, \beta^{(k)}\} | \neg K(k,i,m)\}|$ maturity points, and, for $\alpha \in \{1, \ldots, N(k,i)\}$, the yield of bond $\alpha$ implied by $C^{(k,i)}(X,\pi)|\tau_\alpha^{(k,i)}$ is the given yield $y_\alpha^{(k,i)}$. Thus the curves $((C^{(k,i)}(X, \pi))_{i=0, \ldots, N})_{k=1, \ldots, K}$ are calibrated against the traded bond data $\pi$.

We also have $$X = (FROMCONTINUOUS(I^{(k)}(M_m^{(k)}, C^{(k,i)}(X,\pi)), F_m^{(k)}))_{\neg K(k,i,m)}.$$

We can define a vector of calibrated "known" rates:

$$C(X, \pi) \stackrel{df}{=} (FROMTONTINUOUS(I^{(k)}(M_m^{(k)}, C^{(k,i)}(X, \pi)), F_m^{(k)}))_{K(k,i,m)}.$$

There can be some loss of information in passing from $(C^{(k,i)}(X,\pi))_{(k,i)}$ to $R(X, C(X,\pi))$.

Modelling Zero Coupon Rate Series as (G)BM

We now assume that each $R^{(k)}(m)$ is specified as either a BM or a GBM.

If we define $X^{(k)}(m) = (X_t^{(k)}(m))_{t \in R}$ by putting $$X_t^{(k)}(m) \stackrel{df}{=} \begin{cases} R_t^{(k)}(m) & \text{if } R^{(k)}(m) \text{ is a } BM \\ \ln(R_t^{(k)}(m)) & \text{if } R^{(k)}(m) \text{ is a } GBM \end{cases},$$

then $X^{(k)}(m)$ is a BM. We make the stronger assumption that $((X^{(k)}(m))_{m=1, \ldots, \beta^{(k)}})_{k=1, \ldots, K}$ is a $$\sum_{k=1}^{K} \beta^{(k)}$$

dimensional Brownian Motion. Suppose that the parameters of this Brownian Motion are given. Let $\mu^{(k)}(m)$ be the mean of (the changes in) $X^{(k)}(m)$ per unit interval of time, for each (k,m), and let $$cov\left(\binom{k}{m}, \binom{k'}{m'}\right)$$

be the calculated covariance of (the changes in) $X^{(k)}(m)$ and $X^{(k')}(m')$ per unit interval of time.

We assume that each $R^{(k)}(m)$ is "known" at some $t_i$ (or, equivalently, at some $D_i$), that is, $(\forall k \in \{1, \ldots, K\})(\forall m \in \{1, \ldots, \beta^{(k)}\})(\exists i) K(k,i,m).$ Definition $$V(k, i_1, i_2, m) \stackrel{df}{=} i_2 > i_1 \wedge K(k, i_1, m) \wedge K(k, i_2, m) \wedge \bigwedge_{\alpha = i_1 + 1}^{i_2 - 1} \neg K(k, \alpha, m)$$

This is equivalent to our previous definition of a "run" starting at $t_{i_1}$ and ending at $t_{i_2}$ if the rates in question are taken to be the zero coupon rates $R_{t_i}^{(k)}(m)$ and if we suppose that the "known" rates are known. We use the symbol V for vertical on the assumption that the zero coupon rates $R_{t_i}^{(k)}(m)$ are represented as a matrix with the time dimension appearing vertically.

Definitions $$\Delta(R, k, i_1, i_2, m) \stackrel{df}{=} \begin{cases} R_{t_{i_2}}^{(k)}(m) - R_{t_{i_1}}^{(k)}(m) & \text{if } R^{(k)}(m) \text{ is a } BM \\ \ln(R_{t_{i_2}}^{(k)}(m) / R_{t_{i_1}}^{(k)}(m)) & \text{if } R^{(k)}(m) \text{ is a } GBM \end{cases}$$

-continued $$\Delta K(k, i, m) \stackrel{df}{=} K(k, i, m) \wedge K(k, i-1, m).$$

We now put $$\xi \stackrel{df}{=} (\Delta(R, k, i_1, i_2, m))_{V(k, i_1, i_2, m)}$$

$$\theta \stackrel{df}{=} (\Delta(R, k, i-1, i, m))_{\neg \Delta K(k,i,m)}.$$

Then the Brownian Motion assumption implies that $$E(\Delta(R, k, i_1, i_2, m)) = \Delta t_{i_1, i_2} \mu^{(k)}(m), \text{ where } \Delta t_{i_1, i_2} \stackrel{df}{=} t_{i_2} - t_{i_1}, \text{ and}$$

$$\mathrm{cov}(\Delta(R, k, i_1, i_2, m), \Delta(R, k', i'_1, i'_2, m')) =$$

$$\mathrm{cov}\left(\binom{k}{m}, \binom{k'}{m'}\right) \sum_{l=i_1+1}^{i_2} \sum_{l'=i'_1+1}^{i'_2} \delta_{l,l'} \Delta t_l$$

Thus we can calculate $E(\xi)$, $E(\theta)$, $\mathrm{cov}(\xi,\xi)$, $\mathrm{cov}(\theta,\xi)$, and $\mathrm{cov}(\theta,\theta)$.

Now we can define $x(Y)=(x(Y)_{(k,i_1,i_2,m)})_{V(k,i_1,i_2,m)}$, as a function of some given $Y=(Y_{(k,i,m)})_{K(k,i,m)}$, by putting $$x(Y)_{(k,i_1,i_2,m)} \stackrel{df}{=} \begin{cases} Y_{(k,i_2,m)} - Y_{(k,i_1,m)} & \text{if } R^{(k)}(m) \text{ is a } BM \\ \ln(Y_{(k,i_2,m)}/Y_{(k,i_1,m)}) & \text{if } R^{(k)}(m) \text{ is a } GBM \end{cases}.$$

Then we can calculate $$E(\theta|\xi=x(Y))=E(\theta)+\mathrm{cov}(\theta,\xi)\mathrm{cov}(\xi,\xi)^{\oplus}(x(Y)-E(\xi))$$

and $$\mathrm{cov}(\theta,\theta|\xi=x(Y))=\mathrm{cov}(\theta,\theta)-\mathrm{cov}(\theta,\xi)\mathrm{cov}(\xi,\xi)^{\oplus}\mathrm{cov}(\xi,\theta).$$

We define the random vectors $$x \stackrel{df}{=} \left(R_{t_i}^{(k)}(m)\right)_{\neg K(k,i,m)} \text{ and } y \stackrel{df}{=} \left(R_{t_i}^{(k)}(m)\right)_{K(k,i,m)}.$$

Now $E(x|y=Y)$ is the vector of expected values of the "unknown" rates $R_{t_i}^{(k)}(m)$ conditional on $y=Y$. It can be calculated using $E(\theta|\xi=x(Y))$, $\mathrm{cov}(\theta,\theta|\xi=x(Y))$ and $Y$. We have $$E(x|y=Y)=(E(R_{t_i}^{(k)}(m)|y=Y))_{\neg K(k,i,m)}.$$

Let us denote by $\underline{E}(x|y=Y)$ the vector of "unknown" rates $R_{t_i}^{(k)}(m)$ "backed out" from $E(\theta|\xi=x(Y))$ given $y=Y$, that is, filling using expected rate changes. Say $$\underline{E}(x|y=Y)=(\underline{E}(R_{t_i}^{(k)}(m)|y=Y))_{\neg K(k,i,m)}.$$

We have still to solve for Y.

Estimating Expected Zero Coupon Rates

We put $$Y_0 \stackrel{df}{=} C(\pi) \text{ and } X_0 \stackrel{df}{=} E(x|y=Y_0). \text{ For } n \geq 1,$$

we put $Y_n \stackrel{df}{=} C(X_{n-1}, \pi)$ and $X_n \stackrel{df}{=} E(x|y=Y_n).$ We continue calculating until $\|Y_n - Y_{n-1}\|_\infty = 0$ (or, in practice, until $\|Y_n - Y_{n-1}\|_\infty = 0$ is sufficiently small). We then put $$X \stackrel{df}{=} X_n (= X_{n-1}) \text{ and } Y \stackrel{df}{=} Y_n (= Y_{n-1}),$$

and get $X=E(x|y=Y)$ and $Y=C(X,\pi)$. We can take $R(X,Y)$ to be a reasonable proxy for the expectation of $(R_{t_i}^{(k)}(m))_{(k,i,m)}$ conditional on the traded bond data $\pi$. Note that correlation effects across maturities, issuers and trading dates have been progressively incorporated into X and Y in the course of the iteration.

Estimating the Modes of the Zero Coupon Rates

We put $$Y_0 \stackrel{df}{=} C(\pi) \text{ and } X_0 \stackrel{df}{=} \underline{E}(x|y=Y_0). \text{ For } n \geq 1,$$

we put $Y_n \stackrel{df}{=} C(X_{n-1}, \pi)$ and $X_n \stackrel{df}{=} \underline{E}(x|y=Y_n).$ We continue calculating until $\|Y_n - Y_{n-1}\|_\infty = 0$. We then put $X \stackrel{df}{=} X_n (= X_{n-1})$ and $Y \stackrel{df}{=} Y_n (= Y_{n-1}),$ and get $X=\underline{E}(x|y=Y)$ and $Y=C(X,\pi)$. We can take $R(X,Y)$ to be a reasonable proxy for the modes of $R_{t_i}^{(k)}(m)$, for $(k,i,m)$, conditional on the traded bond data $\pi$.

Note that, for both these ways of estimating the zero coupon rates, we can use the curves $(C^{(k,i)}(X,\pi))_{(k,i)}$ to price non-traded bonds of issuers $1, \ldots, K$ at the trading dates $D_0, \ldots, D_N$.

Simulating the Zero Coupon Rates

Let X and Y be calculated either as conditional modes or as conditional expectations. Then we have either $X=\underline{E}(x|y=Y)$ and $Y=C(X,\pi)$, or $X=E(x|y=Y)$ and $Y=C(X,\pi)$. We can use $E(\theta|\xi=x(Y))$ and $\mathrm{cov}(\theta,\theta|\xi=x(Y))$ to calculate a random drawing $\tilde{\theta}$ of the normal random vector $\theta$. From $\tilde{\theta}$ and Y, we can derive $\tilde{X}=(\tilde{X}_{(k,i,m)})_{\neg K(k,i,m)}$ by filling with simulated values. We can then recalibrate the "known" rates by putting $$\tilde{Y} \stackrel{df}{=} C(\tilde{X}, \pi),$$

and take $R(\tilde{X},\tilde{Y})$ to be an approximate random drawing of $(R_{t_i}^{(k)}(m))_{(k,i,m)}$ conditional on the traded bond data $\pi$. We can use the simulated curves $(C^{(k,i)}(\tilde{X},\pi))_{(k,i)}$ to derive simulated prices of non-traded bonds of issuers $1, \ldots, K$ at the trading dates $D_0, \ldots, D_N$.

Note

The assumption of consistency may not be satisfied if $\mathrm{cov}(\xi,\xi)$ is singular. Put $$\Gamma \stackrel{df}{=} \{(k, m)|(\exists i_1)(\exists i_2)V(k, i_1, i_2, m)\} \text{ and } R' \stackrel{df}{=} (R^{(k)}(m))_{(k,m)\in\Gamma}.$$

If the unconditional covariance matrix of R' per unit interval of time is non-singular, then $\mathrm{cov}(\xi,\xi)$ is also non-singular and the assumption of consistency is satisfied.

Modelling Spreads over a Base Issuer

We assume that the issuer indexed by k=1, the base issuer, is at all times of a higher credit quality than the other issuers. We assume that the number of maturity buckets is the same for each issuer, so that $\beta^{(k)}=\beta^{(k')}$ for all $k, k' \in \{1, \ldots, K\}$. The standard maturities would typically be chosen to be the same for each issuer, that is, $M_m^{(k)}=M_m^{(k')}$ for all $m\in\{1,\ldots,\beta^{(k)}\}$ and all $k,k'\in\{1,\ldots,K\}$.

For each $k\in\{1,\ldots,K\}$ and each $m\in\{1,\ldots,\beta^{(k)}\}$, we define the zero coupon rate spread series, $S^{(k)}(m)=(S_t^{(k)}(m))_{t\in\mathbb{R}}$, over the base issuer by putting $$S_t^{(k)}(m) \stackrel{df}{=} R_t^{(k)}(m) - R_t^{(1)}(m)\chi_{\{k>1\}}.$$

We assume that $((S^{(k)}(m))_{m=1,\ldots,\beta^{(k)}})_{k=1,\ldots,K}$ is a $$\sum_{k=1}^{K} \beta^{(k)}$$

dimensional Geometric Brownian Motion, thus ensuring that the spreads are positive. So, if we define $$X^{(k)}(m) \stackrel{df}{=} \left(\ln(S_t^{(k)}(m))\right)_{t\in\mathbb{R}},$$

we are assuming that $((X^{(k)}(m))_{m=1,\ldots,\beta^{(k)}})_{k=1,\ldots,K}$ is a $$\sum_{k=1}^{K} \beta^{(k)}$$

dimensional Brownian Motion. We suppose that the parameters of this Brownian Motion are given. Let $\mu^{(k)}(m)$ be the mean of (the changes in) $X^{(k)}(m)$ per unit interval of time, for each $(k,m)$, and let $$cov\left(\binom{k}{m},\binom{k'}{m'}\right)$$

be the calculated covariance of (the changes in) $X^{(k)}(m)$ and $X^{(k')}(m')$ per unit interval of time.

We already have $$K(k,i,m) \stackrel{df}{=} 1 \le k \le K \wedge 0 \le i \le N \wedge 1 \le m \le \beta^{(k)} \wedge (\exists \alpha)(1 \le \alpha \le N(k,i) \wedge \tau_\alpha^{(k,i)} \in \mathcal{B}_m^{(k)}).$$

Let us define $$K^*(k,i,m) \stackrel{df}{=} K(k,i,m) \wedge (k>1 \Rightarrow K(1,i,m)),$$

"The spread $S_{t_i}^{(k)}(m)$ is 'known'."

We will say that $S_{t_i}^{(k)}(m)$ is "known" if $K^*(k,i,m)$ and "unknown" if $\neg K^*(k,i,m)$.

We assume that each $S^{(k)}(m)$ is "known" at some $t_i$, that is, $$(\forall k\in\{1,\ldots,K\})(\forall m\in\{1,\ldots,\beta^{(k)}\})(\exists i)K^*(k,i,m).$$

For $X=(X_{(k,i,m)})_{\neg K(k,i,m)}$ and $Y=(Y_{(k,i,m)})_{K(k,i,m)}$, we can define $S(X,Y)=(S_{(k,i,m)}(X,Y))_{(k,i,m)}$ by putting $$S_{(k,i,m)}(X,Y) \stackrel{df}{=} R_{(k,i,m)}(X,Y) - R_{(1,i,m)}(X,Y)\chi_{\{k>1\}}.$$

We then have $$R(X,Y)=(S_{(k,i,m)}(X,Y)+S_{(1,i,m)}(X,Y)\chi_{\{k>1\}})_{(k,i,m)}.$$

Let us define $$\varphi_k(\alpha) \stackrel{df}{=} \chi_{\{\alpha=1\}} + k\chi_{\{\alpha=2\}}, \text{ for } \alpha \in \{1,2\} \text{ and } k \in \{1,\ldots,K\}.$$

Then, for $k>1$ and given X and Y, we have $$\sum_{\alpha=1}^{2} S_{(\varphi_k(\alpha),i,m)}(X,Y) = R_{(k,i,m)}(X,Y).$$

We also have $$\sum_{\alpha=1}^{2} S_{t_i}^{(\varphi_k(\alpha))}(m) = R_{t_i}^{(k)}(m)$$

for all $(k,i,m)$ such that $k>1$.

We now define $$H(k,i,m) \stackrel{df}{=} K(k,i,m) \wedge \neg K(1,i,m),$$

where H stands for horizontal, so that $$H(k,i,m) \Rightarrow \left(k>1 \wedge \bigwedge_{\alpha=1}^{2} \neg K^*(\varphi_k(\alpha),i,m)\right).$$

For $Y=(Y_{(k,i,m)})_{K(k,i,m)}$, we define $$\psi(Y) \stackrel{df}{=} (Y_{(k,i,m)} - Y_{(1,i,m)}\chi_{\{k>1\}})_{K^*(k,i,m)},$$

the "known" spreads implied by the "known" rates.

Proposition

For $W=(W_{(k,i,m)})_{(k,i,m)}$ and $Y=(Y_{(k,i,m)})_{K(k,i,m)}$, we have $$(\exists X)(W=S(X,Y)) \Leftrightarrow$$

$$\bigwedge_{K^*(k,i,m)} (W_{(k,i,m)} = \psi(Y)_{(k,i,m)}) \wedge \bigwedge_{H(k,i,m)}\left(\sum_{\alpha=1}^{2} W_{(\varphi_k(\alpha),i,m)} = Y_{(k,i,m)}\right).$$

Proof ($\Rightarrow$)

Suppose that $X=(X_{(k,i,m)})_{\neg K(k,i,m)}$ satisfies $W=S(X,Y)$.

Then for all (k, i, m), we have $$W_{(k,i,m)} + W_{(1,i,m)}\chi_{\{k>1\}} = S_{(k,i,m)}(X, Y) + S_{(1,i,m)}(X, Y)\chi_{\{k<1\}}$$
$$= R_{(k,i,m)}(X, Y)$$
$$= X_{(k,i,m)}\chi_{\{\neg K(k,i,m)\}} + Y_{(k,i,m)}\chi_{\{K(k,i,m)\}}.$$

Suppose $K^*(k,i,m)$.
case $k=1$
Then $W_{(k,i,m)} = Y_{(k,i,m)} = \psi(Y)_{(k,i,m)}$.
case $k>1$
Then $K(k,i,m)$, $K(1,i,m)$ and $W_{(k,i,m)} + W_{(1,i,m)} = Y_{(k,i,m)}$.
But $W_{(1,i,m)} = Y_{(1,i,m)}$, because $K(1,i,m)$, so that $$W_{(k,i,m)} = Y_{(k,i,m)} - Y_{(1,i,m)} = \psi(Y)_{(k,i,m)}.$$

Thus we have shown $$\bigwedge_{K^*(k,i,m)} (W_{(k,i,m)} = \psi(Y)_{(k,i,m)}).$$

Now suppose $H(k,i,m)$. Then $k>1$, $K(k,i,m)$ and $\neg K(1,k,m)$, and we have $$\sum_{\alpha=1}^{2} W_{(\varphi_k(\alpha)),i,m} = W_{(k,i,m)} + W_{(1,i,m)} = W_{(k,i,m)} + W_{(1,i,m)}\chi_{\{k>1\}} = Y_{(k,i,m)}.$$

Thus we have shown $$\bigwedge_{H(k,i,m)} \left( \sum_{\alpha=1}^{2} W_{(\varphi_k(\alpha)),i,m} = Y_{(k,i,m)} \right).$$

($\Leftarrow$)
Now suppose $$\bigwedge_{K^*(k,i,m)} (W_{(k,i,m)} = \psi(Y)_{(k,i,m)}) \wedge \bigwedge_{H(k,i,m)} \left( \sum_{\alpha=1}^{2} W_{(\varphi_k(\alpha)),i,m} = Y_{(k,i,m)} \right).$$

Put $$X \stackrel{df}{=} (W_{(k,i,m)} + W_{(1,i,m)}\chi_{\{k>1\}})_{\neg K(k,i,m)}.$$

We show that $W = S(X,Y)$.
case $k=1$ and $K(k,i,m)$
Then $$S_{(k,i,m)}(X, Y) = R_{(k,i,m)}(X, Y) \quad (k = 1)$$
$$= Y_{(k,i,m)} \quad (k = 1 \text{ and } K(k, i, m))$$
$$= \psi(Y)_{(k,i,m)} \quad (k = 1 \text{ and } K(k, i, m))$$
$$= W_{(k,i,m)} \quad (K^*(k, i, m)).$$

case $k=1$ and $\neg K(k,i,m)$
Then $$S_{(k,i,m)}(X, Y) = R_{(k,i,m)}(X, Y) \quad (k = 1)$$
$$= X_{(k,i,m)} \quad (k = 1 \text{ and } \neg K(k, i, m))$$
$$= W_{(k,i,m)} \quad (k = 1 \text{ and definition of } X).$$

case $k>1$ and $K(k,i,m)$ and $\neg K(1,i,m)$
Then $K^*(k,i,m)$ and $S_{(k,i,m)}(X,Y) = Y_{(k,i,m)} - Y_{(1,i,m)} = \psi(Y)_{(k,i,m)} = W_{(k,i,m)}$.
case $k>1$ and $K(k,i,m)$ and $K(1,i,m)$
Then $H(k,i,m)$ and $S_{(k,i,m)}(X,Y) = Y_{(k,i,m)} - X_{(1,i,m)} = Y_{(k,i,m)} - W_{(1,i,m)}$.
But $H(k,i,m)$ implies that $W_{(1,i,m)} + W_{(k,i,m)} = Y_{(k,i,m)}$, so that $$S_{(k,i,m)}(X,Y) = W_{(1,i,m)} + W_{(k,i,m)} - W_{(1,i,m)} = W_{(k,i,m)}.$$

case $k>1$ and $\neg K(k,i,m)$ and $K(1,i,m)$
Then $$S_{(k,i,m)}(X, Y) = X_{(k,i,m)} - Y_{(1,i,m)}$$
$$= W_{(k,i,m)} + W_{(1,i,m)} - \psi(Y)_{(1,i,m)}$$
$$= W_{(k,i,m)} + W_{(1,i,m)} - W_{(1,i,m)} \quad (K^*(k, i, m))$$
$$= W_{(k,i,m)}.$$

case $k>1$ and $\neg K(k,i,m)$ and $\neg K(1,i,m)$
Then $$S_{(k,i,m)}(X, Y) = X_{(k,i,m)} - X_{(1,i,m)}$$
$$= W_{(k,i,m)} + W_{(1,i,m)} - W_{(1,i,m)}$$
$$= W_{(k,i,m)}.$$

Thus we have $S_{(k,i,m)}(X,Y) = W_{(k,i,m)}$ in all cases, so that $S(X,Y) = W$.

Note that the proof shows that if $(\exists X)(W = S(X,Y))$, then such an $X$ is unique (because it must be equal to $(W_{(k,i,m)} + W_{(1,i,m)}\chi_{\{k>1\}})_{\neg K(k,i,m)}$).

Now suppose that $H(k,i,m)$. Then, for $\alpha=1,2$, we can choose $l_\alpha^{(k,i,m)} \in \{0, 1, \ldots, N\}$ such that $|t_{l_\alpha^{(k,i,m)}} - t_i| = \inf\{|t_{i'} - t_i| | K^*(\phi_k(\alpha), i', m)\}$ and $K^*((\phi_k(\alpha), l_\alpha^{k,i,m}), m)$. The existence of each $l_\alpha^{(k,i,m)}$ follows from the assumption that each $S^{(k)}(m)$ is "known" at some date. Note that $l_\alpha^{(k,i,m)}$ is the time index of the "known" spread of the form $S_{t_{i'}}^{(\phi_k(\alpha))}(m)$ that is closest in time to $S_{t_i}^{(\phi_k(\alpha))}(m)$. There may be two choices for $l_\alpha^{(k,i,m)}$. Note also that $l_\alpha^{(k,i,m)} \neq i$ because $H(k,i,m)$ implies that $\neg K^*(\phi_k(\alpha), i, m)$, for $\alpha=1,2$. We can also define $$s_\alpha^{(k,i,m)} \stackrel{df}{=} \chi_{\{l_\alpha^{(k,i,m)} < i\}} - \chi_{\{l_\alpha^{(k,i,m)} > i\}},$$

for $\alpha=1,2$. We will often omit the superscript $(\,)^{(k,i,m)}$ from $l_\alpha^{(k,i,m)}$ and $s_\alpha^{(k,i,m)}$.

Definitions $$S \stackrel{df}{=} (S_{t_i}^{(k)}(m))_{(k,i,m)}. \quad \Delta^*(W, k, i_1, i_2, m) \stackrel{df}{=} \ln\left(\frac{W(k, i_2, m)}{W(k, i_1, m)}\right),$$

for $W = (W_{(k,i,m)})_{(k,i,m)}$.

Then, given H(k,i,m), the Geometric Brownian Motion assumption implies that $S_{t_i}^{(\phi_k(\alpha))}(m) = S_{t_\alpha}^{\phi_k(\alpha)}(m) \exp(s_\alpha \Delta^*(S, \phi_k(\alpha), \min(i, t_\alpha), \max(i, t_\alpha), m))$,
for $\alpha=1,2$. We will sometimes use the alternative notation $S_{(k,i,m)}$ for $S_{t_i}^{(k)}(m)$.

As before, we define $$y \stackrel{df}{=} \left(R_{t_i}^{(k)}(m)\right)_{K(k,i,m)}.$$

We also define $$y^* \stackrel{df}{=} \left(S_{t_i}^{(k)}(m)\right)_{K^*(k,i,m)}.$$

Note that y=Y implies that $y^*=\psi(Y)$.
Let us also define $$V^*(k, i_1, i_2, m) \stackrel{df}{=} i_2 > i_1 \bigwedge K^*(k, i_1, m) \bigwedge K^*(k, i_2, m) \bigwedge$$
$$\bigwedge_{\alpha=i_1+1}^{i_2-1} \neg K^*(k, \alpha, m) \text{ and } \Delta K^*(k, i, m) \stackrel{df}{=} K^*(k, i, m) \wedge K^*(k, i-1, m).$$

We put $$\theta \stackrel{df}{=} (\Delta^*(S, k, i-1, i, m))_{\Delta K^*(k,i,m)}.$$

Suppose that we are given $Y=(Y_{(k,i,m)})_{K(k,i,m)}$, an estimate of the "known" zero coupon rates. First suppose $(\forall(k,i,m)) \neg H(k,i,m)$.

We then put $$\xi \stackrel{df}{=} (\Delta^*(S, k, i_1, i_2, m))_{V^*(k,i_1,i_2,m)}, x(Y) \stackrel{df}{=} \left(\ln\left(\frac{\psi(Y)_{(k,i_2,m)}}{\psi(Y)_{(k,i_1,m)}}\right)\right)_{V^*(k,i_1,i_2,m)}.$$

Then $$\begin{pmatrix} \xi \\ \theta \end{pmatrix}$$

is normal. Now $$E(\Delta^*(S,k,i_1,i_2,m)) = \Delta t_{i_1,i_2} \mu^{(k)}(m),$$

where $$\Delta t_{i_1,i_2} \stackrel{df}{=} t_{i_2} - t_{i_1},$$

and $$cov(\Delta^*(S, k, i_1, i_2, m), \Delta^*(S, k', i'_1, i'_2, m')) =$$

-continued $$cov\left(\binom{k}{m}, \binom{k'}{m'}\right) \sum_{l=i_1+1}^{i_2} \sum_{l'=i'_1+1}^{i'_2} \delta_{l,l'} \Delta t_l.$$

Thus we can calculate $E(\xi)$, $E(\theta)$, $cov(\xi,\xi)$, $cov(\theta,\xi)$ (and $cov(\theta,\theta)$), and therefore also $$E(\theta|\xi=x(Y)) = E(\theta) + cov(\theta,\xi) cov(\xi,\xi)^{\oplus}(x(Y) - E(\xi)).$$

Given $E(\theta|\xi=x(Y))$ and assuming $y^*=\psi(Y)$, we can fill the spreads, using expected spread changes, to get, say, $$\underline{E}(S|\xi=x(Y)) = (\underline{E}(S_{t_i}^{(k)}(m)|\xi=x(Y)))_{(k,i,m)}.$$

But then we have $$\bigwedge_{K^*(k,i,m)} \left(\underline{E}\left(S_{t_i}^{(k)}(m) \mid \xi = x(Y)\right) = \psi(Y)_{(k,i,m)}\right) \text{and } (\forall (k, i, m)) \neg H(k, i, m),$$

so that $\underline{E}(S|\xi=x(Y)) = S(X(Y),Y)$, where $$X(Y) \stackrel{df}{=} \left(E(S_{t_i}^{(k)}(m)|\xi=x(Y)) + E(S_{t_i}^{(1)}(m)|\xi=x(Y))\chi_{\{k>1\}}\right)_{\neg K(k,i,m)}.$$

We put $$\xi(Y) \stackrel{df}{=} \xi.$$

Now suppose that $(\exists(k,i,m)) H(k,i,m)$.
For each (k,i,m) satisfying H(k,i,m), let us define $$a_\alpha^{(k,i,m)}(Y) \stackrel{df}{=} \psi(Y)_{(\varphi_k(\alpha), t_\alpha^{(k,i,m)}, m)}$$

for $\alpha=1,2$, and $$F_Y^{(k,i,m)}(Z) \stackrel{df}{=} \sum_{\alpha=1}^{2} a_\alpha^{(k,i,m)}(Y) e^{Z_\alpha}$$

for $Z=(Z_\alpha)_{\alpha=1,2} \in \mathbb{R}^2$.
Then, given H(k,i,m) and y=Y (and omitting the superscripts $()^{(k,i,m)}$), we have $$\sum_{\alpha=1}^{2} S_{t_i}^{(\varphi_k(\alpha))}(m) =$$

$$\sum_{\alpha=1}^{2} S_{t_\alpha}^{(\varphi_k(\alpha))}(m) \exp(s_\alpha \Delta^*(S, \varphi_k(\alpha), \min(i, t_\alpha), \max(i, t_\alpha), m)) =$$

$$F_Y((s_\alpha \Delta^*(S, \varphi_k(\alpha), \min(i, t_\alpha), \max(i, t_\alpha), m))_{\alpha=1,2}).$$

But $F_Y((s_\alpha \Delta^*(S,\phi_k(\alpha),\min(i,l_\alpha),\max(i,l_\alpha),m))_{\alpha=1,2})$ is not, in general, normal because $F_Y$ is non-linear. Let $(f_Y^{(k,i,m)})^{(Z^{(0)})}$, or just $f_Y^{(Z^{(0)})}$, be the affine approximation of $F_Y$ at $Z^{(0)} = (Z_\alpha^{(0)})_{\alpha=1,2} \in \mathbb{R}^2$. Then, for $Z=(Z_\alpha)_{\alpha=1,2} \in \mathbb{R}^2$, we have, again omitting the superscripts $()^{(k,i,m)}$, $$f_Y^{(Z^{(0)})}(Z) = F_Y(Z^{(0)}) + F_Y'(Z^{(0)})(Z - Z^{(0)}) =$$

$$\sum_{a=1}^{2} \alpha_a(Y) e^{Z_a^{(0)}} + \sum_{a=1}^{2} \frac{\partial F}{\partial Z_a}(Z^{(0)})(Z_a - Z_a^{(0)}) =$$

$$\sum_{a=1}^{2} \alpha_a(Y) e^{Z_a^{(0)}} + \sum_{a=1}^{2} \alpha_a(Y) e^{Z_a^{(0)}}(Z_a - Z_a^{(0)}) =$$

$$\sum_{a=1}^{2} \alpha_a(Y) e^{Z_a^{(0)}} (1 + Z_a - Z_a^{(0)}).$$

So, for any $Z^{(0)} \in \mathbb{R}^2$ (and given H(k,i,m)), $f_Y^{Z^{(0)}}(Z)$ is of the form $a + b^T Z$ for some $a \in \mathbb{R}$, $$a \in \mathbb{R}\, b = \begin{pmatrix} b_1 \\ b_2 \end{pmatrix} \in \mathbb{R}^2,$$

assuming that Z is represented as a column vector. We let $x(Y) = (x_r(Y))_r$ be indexed by all $(k, i_1, i_2, m)$ such that $V^*(k, i_1, i_2, m)$ and by all $(k, i, m)$ such that $H(k, i, m)$. If r corresponds to $V^*(k, i_1, i_2, m)$, we put $$x_r(Y) \stackrel{df}{=} \ln\left(\frac{\psi(Y)_{(k,i_2,m)}}{\psi(Y)_{(k,i_2,m)}}\right),$$

and if r corresponds to H(k,i,m), we put $$x_r(Y) \stackrel{df}{=} Y_{(k,i,m)}.$$

We now calculate X(Y) iteratively.
case n=0
We let $\xi^{(0)}(Y) = (\xi_r^{(0)}(Y))_r$ be indexed by all $(k, i_1, i_2, m)$ such that $V^*(k, i_1, i_2, m)$ and by all $(k, i, m)$ such that $H(k, i, m)$.
If r corresponds to $V^*(k, i_1, i_2, m)$, we put $$\xi_r^{(0)}(Y) \stackrel{df}{=} \Delta^*(S, k, i_1, i_2, m).$$

If r corresponds to H(k,i,m), we put $$\xi_r^{(0)}(Y) \stackrel{df}{=} f_Y^{(Z_0)}((s_a \Delta^*(S, \varphi_k(\alpha), \min(i, l_\alpha), \max(i, l_\alpha), m))_{\alpha=1,2}),$$

where $$Z_0 \stackrel{df}{=} \left(\ln\left(\frac{Y_{(k,i,m)}}{\psi(Y)_{(1,l_1,m)} + \psi(Y)_{(k,l_2,m)}}\right)\right)_{\alpha=1,2}.$$

Given H(k,i,m), we have $$F_Y(Z_0) = \sum_{a=1}^{2} a_\alpha(Y) e^{(Z_0)_\alpha} = \sum_{a=1}^{2} a_\alpha(Y) \exp\left(\ln\left(\frac{Y_{(k,i,m)}}{\psi(Y)_{(1,l_1,m)} + \psi(Y)_{(k,l_2,m)}}\right)\right) =$$

-continued $$\sum_{a=1}^{2} \frac{\psi(Y)_{(\varphi_k(\alpha), l_\alpha, m)}}{\psi(Y)_{(1, l_1, m)} + \psi(Y)_{(k, l_2, m)}} Y_{(k,i,m)} = Y_{(k,i,m)}.$$

Then $$\begin{pmatrix} \xi^{(0)}(Y) \\ \theta \end{pmatrix}$$

is normal.

We have already shown how to calculate $E(\Delta^*S, k, i_1, i_2, m)$ and $\text{cov}(\Delta^*(S, k, i_1, i_2, m), \Delta^*(S, k', i_1', i_2', m'))$. Suppose $Z = (s_\alpha \Delta^*(S, \varphi_k(\alpha), \min(i, l_\alpha), \max(i, l_\alpha), m))_{\alpha=1,2}$, corresponding to H(k, i, m), and $Z' = (s_\alpha' \Delta^*(S, \varphi_{k'}(\alpha), \min(i', l_{\alpha'}), \max(i', l_{\alpha'}), m))_{\alpha=1,2}$, corresponding to H(k', i', m'), where $$s_\alpha' \stackrel{df}{=} s_\alpha^{(k', i', m')} \text{ and } l_\alpha' \stackrel{df}{=} l_\alpha^{(k', i', m')}.$$

Then, for $a, a' \in \mathbb{R}$ and $b, b' \in \mathbb{R}^2$, we have $$E(a + b^T Z) = a + b^T E(Z) = a + b^T \begin{pmatrix} s_1 \mu^{(1)}(m) \Delta t_{\min(i, l_1), \max(i, l_1)} \\ s_2 \mu^{(k)}(m) \Delta t_{\min(i, l_2), \max(i, l_2)} \end{pmatrix},$$

$$\text{cov}(a + b^T Z, a' + b'^T Z') = b^T \text{cov}(Z, Z') b', \text{ and } \text{cov}(Z_\alpha, Z_{\alpha'}') =$$

$$s_\alpha s_{\alpha'}' \text{cov}\left(\begin{pmatrix} \varphi_k(\alpha) \\ m \end{pmatrix}, \begin{pmatrix} \varphi_{k'}(\alpha) \\ m' \end{pmatrix}\right) \sum_{l=\min(i, l_\alpha)+1}^{\max(i, l_\alpha)} \sum_{l'=\min(i', l_{\alpha'}')+1}^{\max(i', l_{\alpha'}')} \delta_{l, l'} \Delta t_l,$$

so that $$\text{cov}(a + b^T Z, a' + b'^T Z') = \sum_{a=1}^{2} \sum_{\alpha'=1}^{2} b_\alpha b_{\alpha'}' s_\alpha s_{\alpha'}' \text{cov}\left(\begin{pmatrix} \varphi_k(\alpha) \\ m \end{pmatrix}, \begin{pmatrix} \varphi_{k'}(\alpha) \\ m' \end{pmatrix}\right)$$

$$\sum_{l=\min(i, l_\alpha)+1}^{\max(i, l_\alpha)} \sum_{l'=\min(i', l_{\alpha'}')+1}^{\max(i', l_{\alpha'}')} \delta_{l, l'} \Delta t_l.$$

We also have $$\text{cov}(a + b^T Z, \Delta^*(S, k'', i_1'', i_2'', m'')) =$$

$$\sum_{a=1}^{2} b_\alpha s_\alpha \text{cov}\left(\begin{pmatrix} \varphi_k(\alpha) \\ m \end{pmatrix}, \begin{pmatrix} k'' \\ m'' \end{pmatrix}\right) \sum_{l=\min(i, l_\alpha)+1}^{\max(i, l_\alpha)} \sum_{l''=i_1''+1}^{i_2''} \delta_{l, l''} \Delta t_l.$$

Thus we can calculate $E(\xi^{(0)}(Y))$, $E(\theta)$, $\text{cov}(\xi^{(0)}(Y), \xi^{(0)}(Y))$ and $\text{cov}(\theta, \xi^{(0)}(Y))$ and therefore also $$E(\theta | \xi^{(0)}(Y) = x(Y)) = E(\theta) + \text{cov}(\theta, \xi^{(0)}(Y)) \text{cov}(\xi^{(0)}(Y), \xi^{(0)}(Y))^{\oplus} (x(Y) - E(\xi^{(0)}(Y))).$$

Given $E(\theta | \xi^{(0)}(Y) = x(Y))$ and assuming $y^* = \psi(Y)$, we can "back out" the spreads (filling using expected spread changes) to get, say, $$\underline{E}(S | \xi^{(0)}(Y) = x(Y)) = (\underline{E}(S_{t_i}^{(k)}(m) | \xi^{(0)}(Y) = x(Y)))_{(k, i, m)}.$$

We then put $$S_0 \stackrel{df}{=} E(S|\xi^{(0)}(Y) = x(Y)).$$

Note that there does not necessarily exist some X such that $S_0 = S(X,Y)$.

case n>0

We let $\xi^{(n)}(Y) = \xi_r^{(n)}(Y)_r$ be indexed by all $(k,i_1,i_2,m)$ such that $V^*(k,i_1,i_2,m)$ and by all $(k,i,m)$ such that $H(k,i,m)$.

If r corresponds to $V^*(k,i_1,i_2,m)$, we define $$\xi_r^{(n)}(Y) \stackrel{df}{=} \Delta^*(S, k, i_1, i_2, m).$$

If r corresponds to $H(k,i,m)$, we define $$\xi_r^{(n)}(Y) \stackrel{df}{=} f_Y^{(Z_n)}((s_\alpha \Delta^*(S, \varphi_k(\alpha), \min(i, \iota_\alpha), \max(i, \iota_\alpha), m))_{\alpha=1,2}),$$

where $$Z_n \stackrel{df}{=} ((s_\alpha \Delta^*(S_{n-1}, \varphi_k(\alpha), \min(i, \iota_\alpha), \max(i, \iota_\alpha), m))_{\alpha=1,2}).$$

Then $$\begin{pmatrix} \xi^{(n)}(Y) \\ \theta \end{pmatrix}$$

is normal. Using the formulae given for the case n=0, we can calculate $E(\xi^{(n)}(Y))$, $E(\theta)$, $\mathrm{cov}(\xi^{(n)}(Y),\xi^{(n)}(Y))$ and $\mathrm{cov}(\theta, \xi^{(n)}(Y))$, and therefore also $$E(\theta|\xi^{(n)}(Y)=x(Y))=E(\theta)+\mathrm{cov}(\theta,\xi^{(n)}(Y))\mathrm{cov}(\xi^{(n)}(Y),\xi^{(n)}(Y))^{\oplus}(x(Y)-E(\xi^{(n)}(Y))).$$

Given $E(\theta|\xi^{(n)}(Y)=x(Y))$ and assuming $y^* = \psi(Y)$, we can "back out" the spreads (filling using expected spread changes) to get, say, $\underline{E}(S|\xi^{(n)}(Y)=x(Y))=S_n$. There does not necessarily exist some $\overline{X}$ such that $S_n = S(X,Y)$, but, given $H(k,i,m)$, we have $$\sum_{\alpha=1}^{2} (S_n)_{(\varphi_k(\alpha),i,m)} = \sum_{\alpha=1}^{2} a_\alpha(Y) \exp\left(\ln\left(\frac{(S_n)_{(\varphi_k(\alpha),i,m)}}{\alpha(Y)}\right)\right)$$

$$= \sum_{\alpha=1}^{2} a_\alpha(Y) \exp(s_\alpha \Delta^*(S_n, \varphi_k(\alpha), \min(i, \iota_\alpha), \max(i, \iota_\alpha), m))$$

$$= F_Y(Z_{n+1}) \text{ and}$$

$$f_Y^{(Z_n)}(Z_{n+1}) = f_Y^{(Z_n)}((s_\alpha \Delta^*(S_n, \varphi_k(\alpha), \min(i, \iota_\alpha), m))_{\alpha=1,2})$$

$$= Y_{(k,i,m)},$$

by the construction of $S_n$.

We continue calculating until $\|S_n - S_{n-1}\|_\infty = 0$.

Then we put $$S(Y) \stackrel{df}{=} S_n. \text{ Say } S(Y) = (S_{(k,i,m)}(Y))_{(k,i,m)}.$$

Then clearly $$\bigwedge_{K^*(k,i,m)} (S_{(k,i,m)}(Y) = \psi(Y)_{(k,i,m)}),$$

and, given $H(k,i,m)$, we have $$\sum_{\alpha=1}^{2} S_{(\varphi_k(\alpha),i,m)}(Y) = \sum_{\alpha=1}^{2} (S_n)_{(\varphi_k(\alpha),i,m)}(Y)$$

$$= F_Y(Z_{n+1})$$

$$= f_Y^{(Z_{n+1})}(Z_{n+1})$$

$$= f_Y^{(Z_n)}(Z_{n+1}) \qquad (Z_{n+1} = Z_n \text{ because } S_n = S_{n-1})$$

$$= Y_{(k,i,m)},$$

so that $$\bigwedge_{H(k,i,m)} \left( \sum_{\alpha=1}^{2} S_{(\varphi_k(\alpha),i,m)}(Y) = Y_{(k,i,m)} \right).$$

Therefore $S(Y)=S(X(Y),Y)$, where $$X(Y) \stackrel{df}{=} (S_{(k,i,m)}(Y) + S_{(1,i,m)}(Y)\chi_{\{k>1\}})_{\neg K(k,i,m)}.$$

We put $$\xi(Y) \stackrel{df}{=} \xi^{(n)}(Y).$$

Thus, in all cases, we have $S(X(Y),Y)=\underline{E}(S|\xi(Y)=x(Y))$. Now let $\underline{E}(S|y=Y)=(\underline{E}(S_{t_i}^{(k)}(m))_{(k,i,m)}$ be "backed out" from $$E\left(\theta \mid y^* = \psi(Y) \wedge \bigwedge_{H(k,i,m)} \left( \sum_{\alpha=1}^{2} S_{(\varphi_k(\alpha),i,m)}(Y) = Y_{(k,i,m)} \right)\right)$$

assuming $y^*=\psi(Y)$ (filling using expected spread changes). Then $E(S|y=Y)$ is well-defined, even though we may not know how to evaluate it: we do not necessarily know how to evaluate $$E\left(\theta \mid y^* = \psi(Y) \wedge \bigwedge_{H(k,i,m)} \left( \sum_{\alpha=1}^{2} S_{(\varphi_k(\alpha),i,m)}(Y) = Y_{(k,i,m)} \right)\right).$$

We can notionally "back out" $\underline{E}(R|y=Y) = (\underline{E}(R_{t_i}^{(k)}(m)|y=Y))_{(k,i,m)}$ from $\underline{E}(S|y=Y)$ by defining $$E\big(R_{t_i}^{(k)}(m)\big|y=Y\big) \stackrel{df}{=} E\big(S_{t_i}^{(k)}(m)\big|y=Y\big) + E\big(S_{t_i}^{(1)}(m)\big|y=Y\big)\chi_{\{k>1\}}.$$

So we have $S(X(Y),Y) \approx E(S|\xi(Y)=x(Y))$, and $\xi(Y)=x(Y)$ is equivalent to $$\bigwedge_{V^*(k,i_1,i_2,m)} \left( \Delta^*(S,k,i_1,i_2,m) = \ln\left(\frac{\psi(Y)_{(k,i_2,m)}}{\psi(Y)_{(k,i_1,m)}}\right) \right)$$

and $y^* = \psi(Y)$ implies that $$\bigwedge_{V^*(k,i_1,i_2,m)} \left( \Delta^*(S,k,i_1,i_2,m) = \ln\left(\frac{\psi(Y)_{(k,i_2,m)}}{\psi(Y)_{(k,i_1,m)}}\right) \right),$$

and, for each $H(k,i,m)$,
$f_Y(s_\alpha \Delta^*(S(X(Y),Y),\phi_k(\alpha)\min(i,l_\alpha),\max(i,l_\alpha),m))_{\alpha=1,2}$
is the affine approximation of $F_Y$ at $(s_\alpha\Delta^*(S(X(Y),Y),\phi_k(\alpha),\min(i,l_\alpha),\max(i,l_\alpha),m))_{\alpha=1,2},$ and $$F_Y((s_\alpha\Delta^*(S,\varphi_k(\alpha),\min(i,\iota_\alpha),\max(i,\iota_\alpha),m))_{\alpha=1,2}) = \sum_{\alpha=1}^{2} S_{t_i}^{(\varphi_k(\alpha))}(m).$$

Thus $S(X(Y),Y) \approx E(S|y=Y)$ and $R(X(Y),Y) \approx E(R|y=Y)$.

Note that if $(\forall (k,\overline{i},m)) \neg H(k,i,m)$, we have $\overline{S(X(Y),Y)} = E(S|y=Y)$ and $R(X(Y),Y) = E(R|y=Y)$. We now solve for Y. We put $$Y_0 \stackrel{df}{=} C(\pi) \text{ and } X_0 \stackrel{df}{=} X(Y_0). \text{ For } n \geq 1,$$

we put $Y_n \stackrel{df}{=} C(X_{n-1},\pi)$ and $X_n \stackrel{df}{=} X(Y_n)$.

We continue calculating until $\|Y_n - Y_{n-1}\|_\infty = 0$. We then put $$Y \stackrel{df}{=} Y_n (= Y_{n-1}) \text{ and } X \stackrel{df}{=} X_n (= X(Y) = X_{n-1}),$$

and get $Y = C(X,\pi)$ and $X \approx \big(\underline{E}\big(R_{t_i}^{(k)}(m)\big|y=Y\big)\big)_{\neg K(k,i,m)}.$ Note that, for each $H(k,i,m)$, we have used an affine approximation of $$\sum_{\alpha=1}^{2} S_{t_i}^{(\varphi_k(\alpha))}(m)$$

by a normally distributed random variable. We can take $R(X,Y)$ to be a reasonable proxy for the modes of $R_{t_i}^{(k)}(m)$, for $(k,i,m)$, conditional on the traded bond data $\pi$. Note that, for $(k,i,m)$ with $k>1$, we have $R_{(k,i,m)}(X,Y) > R_{(1,i,m)}(X,Y)$. We can use the curves $(C^{(k,i)}(X,\pi))_{(k,i)}$ to price non-traded bonds of issuers $1,\ldots,K$ at the trading dates $D_0,\ldots,D_N$.

Note

When calculating $X(Y_n)$ for $n>0$, we can use, for each $H(k,i,m)$, the last calculated iterate of $Z_m$, depending on $Y_{n-1}$, in place of $Z_0$, depending on $Y_n$, as the initial estimate of the vector at which to take the affine approximation of $F_{Y_n}$. This should accelerate convergence.

Simulating the Zero Coupon Rates

Given X and Y, calculated as above, we can use $E(\theta|\xi(Y)=x(Y))$ and $\text{cov}(\theta,\theta|\xi(Y)=x(Y))=\text{cov}(\theta,\theta)-\text{cov}(\theta,\xi(Y))\text{cov}(\xi(Y),\xi(Y))^{\oplus}\text{cov}(\xi(Y),\theta)$ to calculate an approximate random drawing $\tilde{\theta}$ of the normal random vector $\theta$. From $\tilde{\theta}$ and assuming $y^* = \psi(Y)$, we can "back out" $\tilde{S}_0 = ((\tilde{S}_0)_{(k,i,m)})_{(k,i,m)}$ by filling with simulated spread values. Note that there may not exist some X' such that $\tilde{S}_0 = S(X',Y)$. We put $$\tilde{X} \stackrel{df}{=} \big((\tilde{S}_0)_{(k,i,m)} + (\tilde{S}_0)_{(1,i,m)}\chi_{\{k>1\}}\big)_{\neg K(k,i,m)}$$

and recalibrate the "known" rates by putting $$\tilde{Y} \stackrel{df}{=} C(\tilde{X},\pi).$$

Then we can take $R(\tilde{X},\tilde{Y})$ to be an approximate random drawing of $(R_{t_i}^{(k)}(m))_{(k,i,m)}$ conditional on the traded bond data $\pi$, and we can use the simulated curves $(C^{(k,i)}(\tilde{X},\pi))_{(k,i)}$ to derive simulated prices of bonds of issuers $1,\ldots,K$ at the trading dates $D_0,\ldots,D_N$.

Note

The assumption of consistency may not be satisfied if cov $(\xi(Y),\xi(Y))$ is singular for some Y. Put $$\Gamma \stackrel{df}{=} \{(k,m) | (\exists i_1)(\exists i_2) V^*(k,i_1,i_2,m) \vee (\exists i) H(k,i,m)\} \text{ and } S' \stackrel{df}{=} (S^{(k)}(m))_{(k,m) \in \Gamma}$$

If the unconditional covariance matrix of S' per unit interval of time is non-singular, then cov $(\xi(Y),\xi(Y))$ is also non-singular for any Y, and the assumption of consistency is necessarily satisfied.

Modelling Successive Spreads

We assume that the issuers indexed by $k=1,\ldots,K$ are at all times in strictly decreasing order of credit quality. In fact, we can here interpret issuers to mean issuer classes, say those defined by some ratings agency, rather than individual issuers. As before, we assume that the number of maturity buckets is the same for each issuer, and the standard maturities would typically be chosen to be the same for each issuer.

For each $k \in \{1,\ldots,K\}$ and each $m \in \{1,\ldots,\beta^{(k)}\}$, we define the successive spread series, $S^{(k)}(m) = \big(S_t^{(k)}(m)\big)_{t \in \mathbb{R}}$, by putting $S_t^{(k)}(m) \stackrel{df}{=} R_t^{(k)}(m) - R_t^{(k-1)}(m)\chi_{\{k>1\}}.$ We assume that $((S^{(k)}(m))_{m=1,\ldots,\beta^{(k)}})_{k=1,\ldots,K}$ is a $$\sum_{k=1}^{K} \beta^{(k)}$$

dimensional Geometric Brownian Motion, thus ensuring that the successive spreads are positive. So, if we define $$X^{(k)}(m) \stackrel{df}{=} \left(\ln\left(S_t^{(k)}(m)\right)\right)_{t \in \mathbb{R}},$$

we are assuming that $((X^{(k)}(m)_{m=1,\ldots,\beta^{(k)}})_{k=1,\ldots,K}$ is a $$\sum_{k=1}^{K} \beta^{(k)} -$$

dimensional Brownian Motion. We suppose that the parameters of this Brownian Motion are given. Let $\mu^{(k)}(m)$ be the mean of (the changes in) $X^{(k)}(m)$ per unit interval of time, for each (k,m), and let $$\text{cov}\left(\binom{k}{m}, \binom{k'}{m'}\right)$$

be the calculated covariance of (the changes in) $X^{(k)}(m)$ and $X^{(k')}(m')$ per unit interval of time.

We already have $$K(k, i, m) \stackrel{df}{=}$$
$$1 \le k \le K \wedge 0 \le i \le N \wedge 1 \le m \le \beta^{(k)} \wedge (\exists \alpha)(1 \le \alpha \le N(k,i) \wedge \tau_\alpha^{(k,i)} \in_m^{(k)}).$$

Let us define $$K^*(k, i, m) \stackrel{df}{=} K(k, i, m) \wedge (k > 1 \Rightarrow K(k-1, i, m)),$$

"The successive spread $S_{t_i}^{(k)}(m)$ is 'known'."

We will say that $S_{t_i}^{(k)}(m)$ is "known" if $K^*(k,i,m)$ and "unknown" if $\neg K^*(k,i,m)$.

We assume that each $S^{(k)}(m)$ is "known" at some $t_i$, that is, $$(\forall k \in \{1, \ldots, K\})(\forall m \in \{1, \ldots, \beta^{(k)}\})(\exists i) K^*(k,i,m).$$

For $X = (X_{(k,i,m)})_{\neg K(k,i,m)}$ and $Y = (Y_{(k,i,m)})_{K(k,i,m)}$, we define $S(X,Y) = (S_{(k,i,m)}(X,Y))_{(k,i,m)}$ by putting $$S_{(k,i,m)}(X, Y) \stackrel{df}{=} R_{(k,i,m)}(X, Y) - R_{(k-1,i,m)}(X, Y)\chi_{\{k>1\}}.$$

We then have $$R(X, Y) = \left(\sum_{a=1}^{k} S_{(a,i,m)}(X, Y)\right)_{(k,i,m)}.$$

We also define $$H(k_1, k_2, i, m) \stackrel{df}{=} (k_1 = 0 \vee K(k_1, i, m)) \bigwedge$$
$$k_2 > k_1 + 1 \bigwedge K(k_2, i, m) \bigwedge \bigwedge_{\alpha = k_1+1}^{k_2-1} \neg K(\alpha, i, m).$$

Then $H(k_1, k_2, i, m) \Rightarrow k_2 > 1$.

For $Y = (Y_{(k,i,m)})_{K(k,i,m)}$ we define $$\psi(Y) \stackrel{df}{=} (Y_{(k,i,m)} - Y_{(k-1,i,m)}\chi_{\{k>1\}})_{K^*(k,i,m)},$$

the "known" successive spreads implied by the "known" rates.

Proposition

For $W = (W_{(k,i,m)})_{(k,i,m)}$ and $Y = (Y_{(k,i,m)})_{K(k,i,m)}$ we have $$(\exists X)(W = S(X,Y)) \Leftrightarrow$$

$$\bigwedge_{K^*(k,i,m)} (W_{(k,i,m)} = \psi(Y)_{(k,i,m)})$$

$$\wedge \bigwedge_{H(k_1,k_2,i,m)} \left(\sum_{\alpha=k_1+1}^{k_2} W_{(\alpha,i,m)} = Y_{(k_2,i,m)} - Y_{(k_1,i,m)}\chi_{\{k_1 > 0\}}\right).$$

Proof ($\Rightarrow$)

Suppose that $X = (X_{(k,i,m)})_{\neg K(k,i,m)}$ satisfies $W = S(X,Y)$. Then, for all (k, i, m) we have $$\sum_{\alpha=1}^{k} W_{(\alpha,i,m)} = \sum_{\alpha=1}^{k} S_{(\alpha,i,m)}(X, Y)$$
$$= R_{(k,i,m)}(X, Y)$$
$$= X_{(k,i,m)}\chi_{\{\neg K(k,i,m)\}} + Y_{(k,i,m)}\chi_{\{K(k,i,m)\}}$$

Suppose $K^*(k,i,m)$.

case k=1

Then $W_{(k,i,m)} = Y_{(k,i,m)} = \psi(Y)_{(k,i,m)}$.

case k>1

Then $K(k,i,m)$ and $K(k-1, i, m)$, so that $$W_{(k,i,m)} = \sum_{\alpha=1}^{k} W_{(\alpha,i,m)} - \sum_{\alpha=1}^{k-1} W_{(\alpha,i,m)}$$
$$= R_{(k,i,m)(X,Y)} - R_{(k-1,i,m)(X,Y)}$$
$$= Y_{(k,i,m)} - Y_{(k-1,i,m)}$$
$$= \psi(Y)_{(k,i,m)}$$

Then $K_{(k,i,m)}$ and $K(k-1, i, m)$, so that)

$$W_{(k,i,m)} = \sum_{\alpha=1}^{k} W_{(a,i,m)} - \sum_{a=1}^{k-1} W_{(a,i,m)}$$
$$= R_{(k,i,m)}(X, Y) - R_{(k-1,i,m)}(X, Y)$$
$$= Y_{(k,i,m)} - Y_{(k-1,i,m)}$$
$$= \Psi Y_{(i,m)}$$

Thus we have shown $$\bigwedge_{K^*(k,i,m)} (W_{(k,i,m)} = \psi(Y)_{(k,i,m)}).$$

Now suppose $H(k_1,k_2,i,m)$.

case $k_1=0$

Then $K(k_2, i, m)$, so that $$\sum_{a=k1+1}^{k} W(a, i, m) = \sum_{a=1}^{k} W(a, i, m)$$
$$= R_{(k2,i,m)}(X, Y)$$
$$= Y_{(k2,i,m)}$$
$$= Y_{(k2,i,m)} - Y_{(k1,i,m)}\chi_{\{k1>0\}}$$

case $k_1>0$

Then $K(k2, i, m)$ and $K(k1, i, m)$, so that $$\sum_{a=k1+1}^{k_2} W(a, i, m) = \sum_{a=1}^{k_2} W(a, i, m) - \sum_{a=1}^{k_1} W(a, i, m)$$
$$= R_{(k2,i,m)}(X, Y) - R_{(k1,i,m)}(X, Y)$$
$$= Y_{(k2,i,m)} - Y_{(k1,i,m)}$$
$$= Y_{(k2,i,m)} - Y_{(k1,i,m)}\chi\{k1>0\}$$

Thus we have shown $$\bigwedge_{H(k_1,k_2,i,m)} \left( \sum_{a=k_1+1}^{k_2} W_{(a,i,m)} = Y_{(k_2,i,m)} - Y_{(k_1,i,m)}\chi_{\{k_1>0\}} \right).$$

($\Leftarrow$)

Now suppose $$\bigwedge_{K^*(k,i,m)} (W_{(k,i,m)} = \psi(Y)_{(k,i,m)}) \wedge \bigwedge_{H(k_1,k_2,i,m)}$$
$$\left( \sum_{a=k_1+1}^{k_2} W_{(a,i,m)} = Y_{(k_2,i,m)} - Y_{(k_1,i,m)}\chi_{\{k_1>0\}} \right).$$

We put $$X \stackrel{df}{=} \left( \sum_{a=1}^{k} W_{(a,i,m)} \right)_{\neg K(k,i,m)}$$

and show that $W=S(X,Y)$.

We first show that $$K(k, i, m) \Rightarrow Y_{(k,i,m)} = \sum_{a=1}^{k} W_{(a,i,m)},$$

which we prove by induction. Let us define $$H_n \stackrel{df}{=} (\forall k)(\forall i)(\forall m)$$
$$\left( (K(k, i, m) \wedge |\{k' \mid 1 \le k' < k \wedge K(k', i, m)\}| = n) \Rightarrow Y_{(k,i,m)} = \sum_{a=1}^{k} W_{(a,i,m)} \right).$$

It is enough to show $H_n$ for all $n \geqq 0$. We first show $H_0$. Suppose $K(k,i,m)$ and $|\{k'|1 \leqq k'<k \wedge K(k',i,m)\}|=0$. Then $H(0,k,i,m)$, so that $$\sum_{a=1}^{k} W_{(a,i,m)} = \sum_{a=0+1}^{k} W_{(a,i,m)} = Y_{(k,i,m)},$$

by our assumption. Now suppose $H_0, \ldots, H_{n-1}$ for some $n>0$. We show $H_n$. Suppose $K(k,i,m)$ and $|\{k'|1 \leqq k'<k \wedge K(k',i,m)\}|=n$. Then there is a $k^* \in \{1, \ldots, k-1\}$ such that $H(k^*,k,i,m)$. Thus we have $K(k^*,i,m)$ and $|\{k'|1 \leqq k'<k^* \wedge K(k',i,m)\}|<n$, whence, by the induction hypothesis, $$Y_{(k^*,i,m)} = \sum_{a=1}^{k} W_{(a,i,m)}.$$

But $H(k^*,k,i,m)$ implies that $$Y_{(k,i,m)} =$$
$$Y_{(k^*,i,m)} + \sum_{a=k^*+1}^{k} W_{(a,i,m)} = \sum_{a=1}^{k^*} W_{(a,i,m)} + \sum_{a=k^*+1}^{k} W_{(a,i,m)} = \sum_{a=1}^{k} W_{(a,i,m)}.$$

Thus we have $H_n$ for all $$n \geq 0, \text{ and } R(X, Y) = \left( \sum_{a=1}^{k} W_{(a,i,m)} \right)_{(k,i,m)},$$

so that $$S(X, Y) = (R_{(k,i,m)}(X, Y) - R_{(k-1,i,m)}(X, Y)\chi_{\{k>1\}})_{(k,i,m)} =$$
$$\left( \sum_{a=1}^{k} W_{(a,i,m)} - \sum_{a=1}^{k-1} W_{(a,i,m)}\chi_{\{k>1\}} \right)_{(k,i,m)} = (W_{(k,i,m)})_{(k,i,m)} = W.$$

Note that the proof shows that if $(\exists X)(W=S(X,Y))$, then such an X is unique (and is equal to $$\left( \sum_{a=1}^{k} W_{(a,i,m)} \right)_{\neg K(k,i,m)}.$$

Now suppose that $H(k_1,k_2,i,m)$. Then, for $\alpha=k_1+1, \ldots, k_2$, we choose $1_\alpha = 1_\alpha^{(k_1,k_2,i,m)} \in \{0, 1, \ldots, N\}$ such that $|t_{l_\alpha}-$ $t_i = \inf\{|t_{i'} - t_i| \| K^*(\alpha, i', m)\}$ and $K^*(\alpha, l_\alpha, m)$. The existence of each $l_\alpha$ follows from the assumption that each $S^{(k)}(m)$ is "known" at some date. $l_\alpha$ is the time index of the "known" spread of the form $S_{t_{i'}}^{(\alpha)}(m)$ that is closest in time to $S_{t_i}^{(\alpha)}(m)$. There may be two choices for $l_\alpha$. We also have $l_\alpha \neq i$ because $H(k_1, k_2, i, m)$ implies that $\neg K^*(\alpha, i, m)$, for $\alpha = k_1+1, \ldots, k_2$. We also define $$s_\alpha = s_\alpha^{(k_1, k_2, i, m)} \stackrel{df}{=} \chi_{\{l_\alpha < i\}} - \chi_{\{l_\alpha > i\}}.$$

Definitions $$S \stackrel{df}{=} \left(S_{t_i}^{(k)}(m)\right)_{(k,i,m)}.$$

$$\Delta^*(W, k, i_1, i_2, m) \stackrel{df}{=} \ln\left(\frac{W(k, i_2, m)}{W(k, i_1, m)}\right), \text{ for } W = (W_{(k,i,m)})_{(k,i,m)}.$$

Then, given $H(k_1, k_2, i, m)$, the Geometric Brownian Motion assumption implies that $S_{t_i}^{(\alpha)}(m) = S_{t_\alpha}^{(\alpha)}(m) \exp(s_\alpha \Delta^*(S, \alpha, \min(i, t_\alpha), \max(i, t_\alpha), m))$, for $\alpha = k_1+1, \ldots, k_2$. We will sometimes use the alternative notation $S_{(k,i,m)}$ for $S_{t_i}^{(k)}(m)$.

As before, we define $$y \stackrel{df}{=} \left(R_{t_i}^{(k)}(m)\right)_{K(k,i,m)}.$$

We also define $$y^* \stackrel{df}{=} \left(S_{t_i}^{(k)}(m)\right)_{K^*(k,i,m)}.$$

Note that $y = Y$ implies that $y^* = \psi(Y)$.

Let us also define $$V^*(k, i_1, i_2, m) \stackrel{df}{=} i_2 > i_1 \bigwedge K^*(k, i_1, m) \bigwedge K^*(k, i_2, m) \bigwedge$$
$$\bigwedge_{\alpha = i_1+1}^{i_2-1} \neg K^*(k, \alpha, m) \text{ and } \Delta K^*(k, i, m) \stackrel{df}{=} K^*(k, i, m) \wedge K^*(k, i-1, m).$$

We put $$\theta \stackrel{df}{=} (\Delta^*(S, k, i-1, i, m))_{\Delta K^*(k,i,m)}.$$

Suppose that we are given $Y = (Y_{(k,i,m)})_{K(k,i,m)}$, an estimate of the "known" zero coupon rates. First suppose $(\forall (k_1, k_2, i, m)) \neg H(k_1, k_2, i, m)$.

We then put $$\xi \stackrel{df}{=} (\Delta^*(S, k, i_1, i_2, m))_{V^*(k, i_1, i_2, m)},$$

$$x(Y) \stackrel{df}{=} \left(\ln\left(\frac{\psi(Y)_{(k,i_2,m)}}{\psi(Y)_{(k,i_1,m)}}\right)\right)_{V^*(k, i_1, i_2, m)}.$$

Then $$\begin{pmatrix} \xi \\ \theta \end{pmatrix}$$

is normal. Now $$E(\Delta^*(S, k, i_1, i_2, m)) = \Delta t_{i_1, i_2} \mu^{(k)}(m),$$

where $$\Delta t_{i_1, i_2} \stackrel{df}{=} t_{i_2} - t_{i_1},$$

and $$\text{cov}(\Delta^*(S, k, i_1, i_2, m), \Delta^*(S, k', i'_1, i'_2, m')) =$$
$$\text{cov}\left(\binom{k}{m}, \binom{k'}{m'}\right) \sum_{l=i_1+1}^{i_2} \sum_{l'=i'_1+1}^{i'_2} \delta_{l,l'} \Delta t_l.$$

Thus we can calculate $E(\xi)$, $E(\theta)$, $\text{cov}(\xi, \xi)$, $\text{cov}(\theta, \xi)$ (and $\text{cov}(\theta, \theta)$), and therefore also $$E(\theta | \xi = x(Y)) = E(\theta) + \text{cov}(\theta, \xi) \text{cov}(\xi, \xi)^\oplus (x(Y) - E(\xi)).$$

Given $E(\theta \sqcup \xi = x(Y))$ and assuming $y^* = \psi(Y)$, we can fill the spreads, using expected spread changes, to get, say, $$\underline{E}(S | \xi = x(Y)) = (\underline{E}(S_{t_i}^{(k)}(m) | \xi = x(Y)))_{(k,i,m)}.$$

But then we have $$\bigwedge_{K^*(k,i,m)} \left(E\left(S_{t_i}^{(k)}(m\right) | \xi = x(Y)\right) = \psi(Y)_{(k,i,m)}$$

and $(\forall (k_1, k_2, i, m)) \neg H(k_1, k_2, i, m)$, so that $\underline{E}(S | \xi = x(Y)) = S(X(Y), Y)$, where $$X(Y) \stackrel{df}{=} \left(\sum_{\alpha=1}^{k} E(S_{t_i}^{(\alpha)}(m) | \xi = x(Y))\right)_{-K(k,i,m)}.$$

We put $$\xi(Y) \stackrel{df}{=} \xi.$$

Now suppose that $(\exists (k_1, k_2, i, m)) H(k_1, k_2, i, m)$.

For each $(k_1, k_2, i, m)$ satisfying $H(k_1, k_2, i, m)$, let us define $$a_\alpha(Y) = a_\alpha^{(k_1, k_2, i, m)}(Y) \stackrel{df}{=} \psi(Y)_{(\alpha, l_\alpha, m)}$$

for $\alpha = k_1+1, \ldots, k_2$, and $$F_Y(Z) = F_Y^{(k_1,k_2,i,m)}(Z) \stackrel{df}{=} \sum_{\alpha=k_1+1}^{k_2} a_\alpha(Y) e^{Z_\alpha}$$

for $Z=(Z_\alpha)_{\alpha=k_1+1,\ldots,k_2} \in \mathbb{R}^{k_2-k_1}$.

Then, given $H(k_1,k_2,i,m)$ and $y=Y$, we have $$\sum_{\alpha=k_1+1}^{k_2} S_{t_i}^{(\alpha)}(m) = \sum_{\alpha=k_1+1}^{k_2} S_{t_{i_\alpha}}^{(\alpha)}(m) \exp(s_\alpha \Delta^*(S, \alpha, \min(i, \iota_\alpha), \max(i, \iota_\alpha), m))$$

$$= F_Y\big((s_\alpha \Delta^*(S, \alpha, \min(i, \iota_\alpha), \max(i, \iota_\alpha), m))_{\alpha=k_1+1,\ldots,k_2}\big).$$

But $F_Y((s_\alpha \Delta^*(S,\alpha,\min(i,l_\alpha),\max(i,l_\alpha),m))_{\alpha=k_1+1,\ldots,k_2})$ is not, in general, normal because $F_Y$ is non-linear. Let $(f_Y^{(k_1,k_2,i,m)})^{(Z^{(0)})}$, or just $f_Y^{(Z^{(0)})}$, be the affine approximation of $F_Y$ at $Z^{(0)}=(Z_\alpha^{(0)})_{\alpha=k_1+1,\ldots,k_2} \in \mathbb{R}^{k_2-k_1}$. Then, given $Z=(Z_\alpha)_{\alpha=k_1+1,\ldots,k_2} \in \mathbb{R}^{k_2-k_1}$, we have $$f_Y^{(Z^{(0)})}(Z) = F_Y(Z^{(0)}) + F'_Y(Z^{(0)})(Z - Z^{(0)})$$

$$= \sum_{\alpha=k_1+1}^{k_2} a_\alpha(Y) e^{Z_\alpha^{(0)}} + \sum_{\alpha=k_1+1}^{k_2} \frac{\partial F}{\partial Z_\alpha}(Z^{(0)})(Z_\alpha - Z_\alpha^{(0)})$$

$$= \sum_{\alpha=k_1+1}^{k_2} a_\alpha(Y) e^{Z_\alpha^{(0)}} + \sum_{\alpha=k_1+1}^{k_2} a_\alpha(Y) e^{Z_\alpha^{(0)}}(Z_\alpha - Z_\alpha^{(0)})$$

$$= \sum_{\alpha=k_1+1}^{k_2} a_\alpha(Y) e^{Z_\alpha^{(0)}}(1 + Z_\alpha - Z_\alpha^{(0)}).$$

So, for any $Z^{(0)} \in \mathbb{R}^{k_2-k_1}$ (and given $H(k_1,k_2,i,m)$), $f_Y^{(Z^{(0)})}(Z)$ is of the form $a+b^TZ$ for some $a \in \mathbb{R}$, $$b = \begin{pmatrix} b_{k_1+1} \\ \vdots \\ b_{k_2} \end{pmatrix} \in \mathbb{R}^{k_2-k_1},$$

assuming that $Z$ is represented as a column vector.

We let $x(Y)=(x_r(Y))_r$ be indexed by all $(k,i_1,i_2,m)$ such that $V^*(k,i_1,i_2,m)$ and by all $(k_1,k_2,i,m)$ such that $H(k_1,k_2,i,m)$. If $r$ corresponds to $V^*(k,i_1,i_2,m)$, we put $$x_r(Y) \stackrel{df}{=} \ln\left(\frac{\psi(Y)_{(k,i_2,m)}}{\psi(Y)_{(k,i_1,m)}}\right),$$

and if $r$ corresponds to $H(k_1,k_2,i,m)$, we put $$x_r(Y) \stackrel{df}{=} Y_{(k_2,i,m)} - Y_{(k_1,i,m)}\chi_{\{k_1>0\}}.$$

We now calculate $X(Y)$ iteratively.
case n=0

We let $\xi^{(0)}(Y)=(\xi_r^{(0)}(Y))_r$ be indexed by all $(k,i_1,i_2,m)$ such that $V^*(k,i_1,i_2,m)$ and by all $(k_1,k_2,i,m)$ such that $H(k_1,k_2,i,m)$.

If $r$ corresponds to $V^*(k,i_1,i_2,m)$, we put $$\xi_r^{(0)}(Y) \stackrel{df}{=} \Delta^*(S, k, i_1, i_2, m).$$

If $r$ corresponds to $H(k_1,k_2,i,m)$, we put $$\xi_r^{(0)}(Y) \stackrel{df}{=} f_Y^{(Z_0)}\big((s_\alpha \Delta^*(S, \alpha, \min(i, \iota_\alpha), \max(i, \iota_\alpha), m))_{\alpha=k_1+1,\ldots,k_2}\big),$$

where $Z_0 \stackrel{df}{=} \left(\ln\left(\frac{Y_{(k_2,i,m)} - Y_{(k_1,i,m)}\chi_{\{k_1>0\}}}{\sum_{\alpha'=k_1+1}^{k_2} a_{\alpha'}(Y)}\right)\right)_{\alpha=k_1+1,\ldots,k_2}$ A straightforward calculation shows that $H(k_1,k_2,i,m)$ implies that $$F_Y(Z_0)=Y_{(k_2,i,m)}-Y_{(k_1,i,m)}\chi_{\{k_1>0\}}.$$

Then $$\begin{pmatrix} \xi^{(0)}(Y) \\ \theta \end{pmatrix}$$

is normal.

We have already shown how to calculate $E(\Delta^*(S,k,i_1,i_2,m))$ and $\text{cov}(\Delta^*(S,k,i_1,i_2,m),\Delta^*(S,k',i_1',i_2',m'))$. Suppose $Z=(s_\alpha \Delta^*(S,\alpha,\min(i,l_\alpha),\max(i,l_\alpha),m))_{\alpha=k_1+1,\ldots,k_2}$, corresponding to $H(k_1,k_2,i,m)$, and $Z'=(s'_\alpha \Delta^*(S,\alpha,\min(i',l_\alpha),\max(i',l_\alpha),m))_{\alpha=k_1'+1,\ldots,k_2'}$, corresponding to $H(k_1',k_2,i',m')$, where $$s'_\alpha \stackrel{df}{=} s_\alpha^{(k_1',k_2',i',m')} \text{ and } l'_\alpha \stackrel{df}{=} l_\alpha^{(k_1',k_2',i',m')}.$$

Then, for a,a'

$$\in \mathbb{R} \text{ and } b = \begin{pmatrix} b_{k_1+1} \\ \vdots \\ b_{k_2} \end{pmatrix}, b' = \begin{pmatrix} b'_{k_1'+1} \\ \vdots \\ b'_{k_2'} \end{pmatrix} \in \mathbb{R}^{k_2-k_1},$$

we have $$E(a+b^TZ) = a + b^T E(Z) = a + b^T \begin{pmatrix} s_{k_1+1}\mu^{(k_1+1)}(m)\Delta t_{\min(i,\iota_{k_1+1}),\max(i,\iota_{k_1+1})} \\ \vdots \\ s_{k_2}\mu^{(k_2)}(m)\Delta t_{\min(i,\iota_{k_2}),\max(i,\iota_{k_2})} \end{pmatrix},$$

$$\text{cov}(a+b^TZ, a'+b'^TZ') = b^T\text{cov}(Z,Z')b',$$

and $\text{cov}(Z_\alpha, Z'_{\alpha'}) = s_\alpha s'_{\alpha'} \text{cov}\left(\begin{pmatrix}\alpha\\m\end{pmatrix},\begin{pmatrix}\alpha'\\m'\end{pmatrix}\right) \sum_{l=\min(i,\iota_\alpha)+1}^{\max(i,\iota_\alpha)} \sum_{l'=\min(i',\iota'_{\alpha'})+1}^{\max(i',\iota'_{\alpha'})} \delta_{l,l'}\Delta t_l,$ for $\alpha = k_1+1,\ldots,k_2$ and $\alpha' = k_1'+1,\ldots,k_2'$, so that $\text{cov}(a+b^TZ, a'+b'^TZ') = \sum_{\alpha=k_1+1}^{k_2} \sum_{\alpha'=k_1'+1}^{k_2'} b_\alpha b'_{\alpha'},$ -continued $$s_\alpha s'_\alpha, \text{cov}\left(\begin{pmatrix}\alpha\\m\end{pmatrix},\begin{pmatrix}\alpha'\\m'\end{pmatrix}\right)\sum_{l=\min(i,\iota_\alpha)+1}^{\max(i,\iota_\alpha)}\sum_{l'=\min(i',\iota'_{\alpha'})+1}^{\max(i',\iota'_{\alpha'})}\delta_{l,l'}\Delta t_l.$$

We also have $$\text{cov}(a+b^TZ, \Delta^*(S, k'', i''_1, i''_2, m'')) =$$

$$\sum_{\alpha=1}^{2} b_\alpha s_\alpha \text{cov}\left(\begin{pmatrix}\alpha\\m\end{pmatrix},\begin{pmatrix}k''\\m''\end{pmatrix}\right)\sum_{l=\min(i,\iota_\alpha)+1}^{\max(i,\iota_\alpha)}\sum_{l''=i''_1+1}^{i''_2}\delta_{l,l''}\Delta t_l.$$

Thus we can calculate $E(\xi^{(0)}(Y))$, $E(\theta)$, $\text{cov}(\xi^{(0)}(Y),\xi^{(0)}(Y))$ and $\text{cov}(\theta,\xi^{(0)}(Y))$, and therefore also $E(\theta|\xi^{(0)}(Y)=x(Y))=E(\theta)+\text{cov}(\theta,\xi^{(0)}(Y))\text{cov}(\xi^{(0)}(Y),\xi^{(0)}(Y))^{\oplus}(x(Y)-E(\xi^{(0)}(Y)))$.

Given $E(\theta|\xi^{(0)}(Y)=x(Y))$ and assuming $y^*=\psi(Y)$, we can "back out" the spreads (filling using expected spread changes) to get, say, $\underline{E}(S|\xi^{(0)}(Y)=x(Y))=(\underline{E}(S_{t_i}^{(k)}(m)|\xi^{(0)}(Y)=x(Y)))_{(k,i,m)}$.

We then put $$S_0 \stackrel{df}{=} \underline{E}(S|\xi^{(0)}(Y) = x(Y)).$$

Note that there does not necessarily exist some X such that $S_0=S(X,Y)$.

case n>0

We let $\xi^{(n)}(Y)=(\xi_r^{(n)}(Y))_r$ be indexed by all $(k,i_1,i_2,m)$ such that $V^*(k,i_1,i_2,m)$ and by all $(k_1,k_2,i,m)$ such that $H(k_1,k_2,i,m)$.

If r corresponds to $V^*(k,i_1,i_2,m)$, we define $$\xi_r^{(n)}(Y) \stackrel{df}{=} \Delta^*(S, k, i_1, i_2, m).$$

If r corresponds to $H(k_1,k_2,i,m)$, we define $$\xi_r^{(n)}(Y) \stackrel{df}{=} f_Y^{(Z_n)}((s_\alpha\Delta^*(S, \alpha, \min(i, l_\alpha), \max(i, l_\alpha), m))_{\alpha=k_1+1,\ldots,k_2}),$$

where $$Z_n \stackrel{df}{=} ((s_\alpha\Delta^*(S_{n-1}, \alpha, \min(i, l_\alpha), \max(i, l_\alpha), m))_{\alpha=k_1+1,\ldots,k_2}).$$

Then $$\begin{pmatrix}\xi^{(n)}(Y)\\\theta\end{pmatrix}$$

is normal. Using the formulae given for the case n=0, we can calculate $E(\xi^{(n)}(Y))$, $E(\theta)$, $\text{cov}(\xi^{(n)}(Y),\xi^{(n)}(Y))$ and $\text{cov}(\theta,\xi^{(n)}(Y))$, and therefore also $E(\theta|\xi^{(n)}(Y)=x(Y))=E(\theta)+\text{cov}(\theta,\xi^{(n)}(Y))\text{cov}(\xi^{(n)}(Y),\xi^{(n)}(Y))^{\oplus}(x(Y)-E(\xi^{(n)}(Y)))$.

Given $E(\theta|\xi^{(n)}(Y)=x(Y))$ and assuming $y^*=\psi(Y)$, we can "back out" the spreads (filling using expected spread changes) to get, say, $\underline{E}(S|\xi^{(n)}(Y)=x(Y))=S_n$. There does not necessarily exist some X such that $S_n=S(X,Y)$, but, given $H(k_1,k_2,i,m)$, we have $$\sum_{\alpha=k_1+1}^{k_2}(S_n)_{(\alpha,i,m)} = \sum_{\alpha=k_1+1}^{k_2} a_\alpha(Y)\exp\left(\ln\left(\frac{(S_n)_{(\alpha,i,m)}}{\alpha(Y)}\right)\right)$$

$$= \sum_{\alpha=k_1+1}^{k_2} a_\alpha(Y)\exp$$

$$(s_\alpha\Delta^*(S_n, \alpha, \min(i, \iota_\alpha), \max(i, \iota_\alpha), m))$$

$$= F_Y(Z_{n+1})$$

and $$f_Y^{(Z_n)}(Z_{n+1}) = f_Y^{(Z_n)}((s_\alpha\Delta^*(S_n, \alpha, \min(i, \iota_\alpha), \max(i, \iota_\alpha), m))_{\alpha=k_1+1,\ldots,k_2})$$

$$= Y_{(k_2,i,m)} - Y_{(k_1,i,m)}\chi_{\{k_1>0\}},$$

by the construction of $S_n$. We continue calculating until $\|S_n - S_{n-1}\|_\infty = 0$.

Then we put $$S(Y) \stackrel{df}{=} S_n. \text{ Say } S(Y) = (S_{(k,i,m)}(Y))_{(k,i,m)}.$$

Then clearly $$\bigwedge_{K^*(k,i,m)}(S_{(k,i,m)}(Y) = \psi(Y)_{(k,i,m)}),$$

and, given $H(k_1,k_2,i,m)$, we have $$\sum_{\alpha=k_1+1}^{k_2} S_{(\alpha,i,m)}(Y) = \sum_{\alpha=k_1+1}^{k_2}(S_n)_{(\alpha,i,m)}(Y)$$

$$= F_Y(Z_{n+1})$$

$$= f_Y^{(Z_{n+1})}(Z_{n+1})$$

$$= f_Y^{(Z_n)}(Z_{n+1}) \ (Z_{n+1} = Z_n \text{ because } S_n = S_{n-1})$$

$$= Y_{(k_2,i,m)} - Y_{(k_1,i,m)}\chi_{\{k_1>0\}},$$

so that $$\bigwedge_{H(k_1,k_2,i,m)}\left(\sum_{\alpha=k_1+1}^{k_2} S_{(\alpha,i,m)}(Y) = Y_{(k_2,i,m)} - Y_{(k_1,i,m)}\chi_{\{k_1>0\}}\right).$$

Therefore $S(Y)=S(X(Y),Y)$, where $$X(Y) \stackrel{df}{=} \left(\sum_{\alpha=1}^{k} S_{(\alpha,i,m)}(Y)\right)_{\neg K(k,i,m)}.$$

We put $$\xi(Y) \stackrel{df}{=} \xi^{(n)}(Y).$$

Thus, in all cases, we have $S(X(Y),Y)=E(S|\xi(Y)=x(Y))$. Now let $\underline{E}(S|y=Y)=(\underline{E}(S_{t_i}^{(k)}(m))_{(k,i,m)}$ be "backed out" from $$E\left(\theta \mid y^* = \psi(Y) \wedge \underset{H(k_1,k_2,i,m)}{\bigwedge} \left(\sum_{\alpha=k_1+1}^{k_2} S_{(\alpha,i,m)}(Y) = Y_{(k_2,i,m)} - Y_{(k_1,i,m)}\chi_{\{k_1>0\}}\right)\right)$$

assuming $y^*=\psi(Y)$ (filling using expected spread changes). Then $E(S|y=Y)$ is well-defined, even though we may not know how to evaluate it. We can notionally "back out" $\underline{E}(R|y=Y)=(\underline{E}(R_{t_i}^{(k)}(m)|y=Y))_{(k,i,m)}$ from $\underline{E}(S|y=Y)$ by defining $$E(R_{t_i}^{(k)}(m) \mid y = Y) \stackrel{df}{=} \sum_{\alpha=1}^{k} E(S_{t_i}^{(k)}(m) \mid y = Y).$$

So we have $S(X(Y),Y)=\underline{E}(S|\xi(Y)=x(Y))$, and $\xi(Y)=x(Y)$ is equivalent to $$\underset{V^*(k,i_1,i_2,m)}{\bigwedge}\left(\Delta^*(S,k,i_1,i_2,m) = \ln\left(\frac{\psi(Y)_{(k,i_2,m)}}{\psi(Y)_{(k,i_1,m)}}\right)\right) \wedge \underset{H(k_1,k_2,i,m)}{\bigwedge}$$

$$\left(f_Y^{((s_\alpha\Delta^*(S(X(Y),Y),\alpha,\min(i,t_\alpha),\max(i,t_\alpha),m))_{\alpha=k_1+1,\ldots,k_2})}\right.$$

$$\left.((s_\alpha\Delta^*(S,\alpha,\min(i,t_\alpha),\max(i,t_\alpha),m))_{\alpha=k_1+1,\ldots,k_2}\right) =$$

$$Y_{(k_2,i,m)} - Y_{(k_1,i,m)}\chi_{\{k_1>0\}}),$$

and $y^*=\psi(Y)$ implies that $$\underset{V^*(k,i_1,i_2,m)}{\bigwedge}\left(\Delta^*(S,k,i_1,i_2,m) = \ln\left(\frac{\psi(Y)_{(k,i_2,m)}}{\psi(Y)_{(k,i_1,m)}}\right)\right),$$

and, for each $H(k_1, k_2, i, m)$, $$f_Y^{((s_\alpha\Delta^*(S(X(Y),Y),\alpha,\min(i,t_\alpha),\max(i,t_\alpha),m))_{\alpha=k_1+1,\ldots,k_2})}$$

is the affine approximation of $F_Y$ at $$(s_\alpha\Delta * (S(X(Y), Y), \alpha, \min(i, t_\alpha), \max(i, t_\alpha), m))_{\alpha=k_1+1,\ldots,k_2},$$

and $$F_Y(s_\alpha\Delta^*(S, \alpha, \min(i, t_\alpha), \max(i, t_\alpha), m))_{\alpha=k_1+1,\ldots,k_2}) = \sum_{\alpha=k_1+1}^{k_2} S_{t_i}^{(\alpha)}(m).$$

Thus $S(X(Y),Y) \approx \underline{E}(S|y=Y)$ and $R(X(Y),Y) \approx \underline{E}(R|y=Y)$.

Note that if $(\forall(k_1,k_2,i,m))\neg H(k_1,k_2,i,m)$, we have $S(X(Y),Y)=\underline{E}(S|y=Y)$ and $R(X(Y),Y)=\underline{E}(R|y=Y)$. We now solve for Y. We put $$Y_0 \stackrel{df}{=} C(\pi) \text{ and } X_0 \stackrel{df}{=} X(Y_0). \text{ For } n \geq 1,$$

we put $Y_n \stackrel{df}{=} C(X_{n-1}, \pi)$ and $X_n \stackrel{df}{=} X(Y_n)$.

We continue calculating until $\|Y_n - Y_{n-1}\|_\infty = 0$. We then put $$Y \stackrel{df}{=} Y_n(= Y_{n-1}) \text{ and } X \stackrel{df}{=} X_n(= X(Y) = X_{n-1}),$$

and get $Y = C(X, \pi)$ and $X \approx (E(R_{t_i}^{(k)}(m)|y = Y))_{\neg K(k,i,m)}$.

Note that, for each $H(k_1,k_2,i,m)$, we have used an affine approximation of $$\sum_{\alpha=k_1+1}^{k_2} S_{t_i}^{(\alpha)}(m)$$

by a normally distributed random variable. We can take $R(X, Y)$ to be a reasonable proxy for the modes of $R_{t_i}^{(k)}(m)$, for $(k,i,m)$, conditional on the traded bond data $\pi$. Note that, for $(k,i,m)$ with $k>1$, we have $R_{(k,i,m)}(X,Y)>R_{(k-1,i,m)}(X,Y)$. We can use the curves $(C^{(k,i)}(X,\pi))_{(k,i)}$ to price non-traded bonds of issuers $1, \ldots, K$ at the trading dates $D_0, \ldots, D_N$.

Note

When calculating $X(Y_n)$ for $n>0$, we can use, for each $H(k_1,k_2,i,m)$, the last calculated iterate of $Z_m$, depending on $Y_{n-1}$, in place of $Z_0$, depending on $Y_n$, as the initial estimate of the vector at which to take the affine approximation of $F_{Y_n}$. This should accelerate convergence.

Simulating the Zero Coupon Rates

Given X and Y, calculated as above, we can use $E(\theta|\xi(Y)=x(Y))$ and $\text{cov}(\theta,\theta|\xi(Y)=x(Y))=\text{cov}(\theta,\theta)-\text{cov}(\theta,\xi(Y))\text{cov}(\xi(Y),\xi(Y))^\oplus\text{cov}(\xi(Y),\theta)$ to calculate an approximate random drawing $\tilde{\theta}$ of the normal random vector $\theta$. From $\tilde{\theta}$ and assuming $y^*=\psi(Y)$, we can "back out" $\tilde{S}_0=((\tilde{S}_0)_{(k,i,m)})_{(k,i,m)}$ by filling with simulated spread values. Note that there may not exist some X' such that $\tilde{S}_0=S(X',Y)$. We can then put $$\tilde{X} \stackrel{df}{=} \left(\sum_{\alpha=1}^{k} (\tilde{S}_0)_{(k,i,m)}\right)_{\neg K(k,i,m)}.$$

Alternatively:

For $(k,i,m)$, either there is a unique k' such that $$0 < k' < k \bigwedge K(k',i,m) \bigwedge \underset{\alpha=k'+1}{\overset{k-1}{\bigwedge}} \neg K(\alpha,i,m)$$

or no such k' exists. Let $\phi(k,i,m)$ be the unique such k' if it exists or 0 if it does not exist. Then we can define $\tilde{X}=((\tilde{X})_{(k,i,m)})_{\neg K(k,i,m)}$ by putting $$(\tilde{X})_{(k,i,m)} \stackrel{df}{=} Y_{(\varphi(k,i,m),i,m)\chi\{\varphi(k,i,m)>0\}} + \sum_{a=\varphi(k,i,m)+1}^{k} (\tilde{S}_0)_{(a,i,m)},$$

for ¬K(k,i,m). In the case where ¬K(k,i,m) and K(k',i,m) for some k'>k, we can incorporate an error adjustment in the definition of $(\tilde{X})_{(k,i,m)}$. In this case, we can put $$k_0 \stackrel{df}{=} \varphi(k, i, m),$$

$$k_1 \stackrel{df}{=} \inf\{k' \mid k < k' \leq K \wedge K(k', i, m)\},$$

$$\epsilon(k_0, k_1, i, m) \stackrel{df}{=} \frac{Y_{(k_1,i,m)} - Y_{(k_0,i,m)\chi\{k_0>0\}} - \sum_{a=k_0+1}^{k_1} (\tilde{S}_0)_{(a,i,m)}}{k_1 - k_0}.$$

Note that we have $$Y_{(k_1,i,m)} - Y_{(k_0,i,m)\chi\{k_0>0\}} \approx \sum_{a=k_0+1}^{k_1} (\tilde{S}_0)_{(a,i,m)}.$$

We can then put $$(\tilde{X})_{(k,i,m)} \stackrel{df}{=} Y_{(k_0,i,m)\chi\{k_0>0\}} + \sum_{a=k_0+1}^{k_1} (\tilde{S}_0)_{(a,i,m)} + (k-k_0)\epsilon(k_0, k_1, i, m).$$

We recalibrate the "known" rates by putting $$\tilde{Y} \stackrel{df}{=} C(\tilde{X}, \pi).$$

We can then take $R(\tilde{X},\tilde{Y})$ to be an approximate random drawing of $(R_{t_j}^{(k)}(m))_{(k,i,m)}$ conditional on the traded bond data $\pi$. We can use the simulated curves $(C^{(k,i)}(\tilde{X},\pi))_{k,i}$ to derive simulated prices of bonds of issuers 1, . . . , K at the trading dates $D_0, \ldots, D_N$.
Note
The assumption of consistency may not be satisfied if cov $(\xi(Y), \xi(Y))$ is singular for some Y. Put $$\Gamma \stackrel{df}{=} \{(k, m) \mid (\exists i1)(\exists i2) V^*_{(k,i1,i2,m)} V (\exists k_1)(\exists k_2)(\exists i)$$

$$(k_1 + 1 \leq k \leq k_2 \wedge H(k_1, k_2, i, m)]\} \text{ and } S' \stackrel{df}{=} (S(k)(m))$$

If the unconditional covariance matrix of S' per unit interval of time is non-singular, then cov($\xi(Y),\xi(Y)$) is also non-singular for any Y, and the assumption of consistency is necessarily satisfied.
Notes
1. Convergence is not guaranteed. For given inputs, a solution may not exist. If calibration yields a negative spread or a negative zero coupon rate that is modelled as a GBM, the algorithm will fail. If the assumed unconditional dynamics and the traded bond data together produce extreme conditions, the numerical methods employed may fail. In the case of modelling spreads, the numerical methods may also fail if the maturity bucketing is too coarse for the variability in the spreads implied by the traded bond data. If convergence is not sufficiently fast, it can occasionally help to take the next iterate to be, say, the average of the last two iterates. We have only ever found this to be useful for the inner (affine approximation) loop for modelling spreads.
2. One could use norms other than $\|\ \|_\infty$ to test for convergence: any two norms on a finite-dimensional vector space are topologically equivalent.
3. The iterative technique of modelling zero coupon rate curves as a (G)BM can be adapted to handle implied volatility curves, futures curves, forward foreign exchange curves and other curves. By way of example, let us consider implied volatility curves. We can have an implied volatility curve for each underlying asset of the options with which one is concerned. The role of bond issuers is replaced by that of underlying assets. For each asset, one can specify, for options on the asset, a set of maturity buckets and associated standard maturities, as well as an interpolation function for the implied volatilities. The unconditional implied volatility dynamics can be specified as a GBM in several dimensions. Note that implied volatilities can never be negative. The traded implied volatility data is given by specifying observed implied volatilities. Each of these requires the specification of not only the implied volatility (expressed, say, as an annualised figure), but also the maturity of the associated option, the underlying asset and the date on which the option traded. Each standard maturity implied volatility is then defined to be "known" at a given date if an option traded on the given date and the maturity of the option fell in the bucket associated with the standard maturity and the underlying asset of the option is that associated with the implied volatility. One needs to assume that each standard maturity implied volatility is "known" at at least one date. The algorithms described for modelling zero coupon rate curves carry over to the modelling of implied volatility curves except that there is no calibration step because the observed implied volatilities are given directly. One would, of course, need to interpolate the "known" standard maturity implied volatilities from the observed implied volatilities and from the observed implied volatilities together with estimates of the standard maturity implied volatilities that are not "known". One could model separate implied volatility curves for puts and for calls. One could add an extra dimension, say, for the degree to which an option was in- or out-of-the-money at the time of the trade. In this case one would specify, for each asset, a set of buckets and associated standard points for this second dimension. The unconditional implied volatility dynamics would then be based on ordered pairs, each consisting of a standard maturity and a standard point for the second dimension. One would also need to specify interpolation functions of two variables to allow interpolation from the resulting implied volatility surfaces.
4. The methodology can handle real, as opposed to nominal, zero coupon rates or spreads and capital-indexed bonds. One can also combine the modelling of real and nominal zero coupon rates or spreads.
5. One can use the given zero coupon rate or spread modelling for each of several economies and combine them using inter-economy correlations.
7. One can also combine the given zero coupon rate or spread modelling with the modelling of other rates such as foreign exchange rates or stock indices.

Internalising the Calibration Process

The calibration functions that we defined earlier depended on the assumed zero coupon rate or spread dynamics only to the extent that the zero coupon rate or spread dynamics were incorporated into the current estimates of the "unknown" zero coupon rates. We now show how the calibration process can be made to depend directly on the assumed zero coupon rate or spread dynamics.

Suppose we have a traded bond whose issuer is (indexed by) $k \in \{1, \ldots, K\}$, whose yield is y and whose trading date is $D_i$ and whose associated time is $t_i$, for some $i \in \{0, 1, \ldots, N\}$. Let $((\tau_j, X_j))_{j \in \{1, \ldots, \alpha\}}$ be the cash-flow schedule of the bond, where, for $j \in \{1, \ldots, \alpha\}$, $X_j$ is the cash payment at maturity $\tau_j$ days (actual days from the trading date $D_i$). Let $\tau_o$ be the maturity (in days) of the settlement of the bond. Put $$n \stackrel{df}{=} \beta^{(k)}$$

(the number of maturity buckets for issuer k), and, for $j \in \{1, \ldots, n\}$, $$m_j \stackrel{df}{=} M_j^{(k)}$$

(the standard maturities for issuer k) and $$r_j \stackrel{df}{=} R_{t_i}^{(k)}(j)$$

(the standard maturity zero coupon rate for issuer k and trading date $D_i$). Let B be the base, that is, the notional number of days in the year, specified for issuer k. Let $I_{\{(m_1,r_1), \ldots, (m_n,r_n)\}}$ be the specified interpolation function for issuer k, based on the points $(m_1, r_1), \ldots, (m_n, r_n)$. Without loss of generality, we can suppose that $I_{\{(m_1,r_1), \ldots, (m_n,r_n)\}}$ returns, for a given maturity $\tau$ (actual days from $D_i$), a continuously compounding zero coupon rate of base B.

We suppose that the function $$\left\{ \begin{pmatrix} r_1 \\ \cdots \\ r_n \end{pmatrix} \mapsto I_{\{(m_1,r_1), \ldots, (m_n,r_n)\}}(\tau) \right\}$$

is differentiable, as a function of several variables, for the given maturities $m_1, \ldots, m_n$ and for any given maturity $\tau$. This function is differentiable if the specified method of interpolation is, for example, linear, logarithmic linear, cubic spline or logarithmic cubic spline (on any basis), even though the function $I_{\{(m_1,r_1), \ldots, (m_n,r_n)\}}$ is not, in general, differentiable if the method of interpolation is linear or logarithmic linear.

Then we can express the calibration requirement for the given traded bond by the equation $$\exp\left(I_{\{(m_1,r_1), \ldots, (m_n,r_n)\}}(\tau_\sigma)\frac{\tau_\sigma}{B}\right)$$

$$\sum_{j=1}^{\alpha} X_j \exp\left(-I_{\{(m_1,r_1), \ldots, (m_n,r_n)\}}(\tau_j)\frac{\tau_j}{B}\right) = P^{(k)}(y),$$

where $P^{(k)}$ is the pricing function specified for bonds of issuer k. Note that the left hand side of the equation is a differentiable function of the zero coupon rate vector $$\begin{pmatrix} r_1 \\ \cdots \\ r_n \end{pmatrix}$$

and the right hand side is a calculated constant.

Thus we can express the calibration requirement for all the traded bonds (for all issuers and all trading dates) as a set of non-linear simultaneous equations (one equation for each traded bond) where the unknown variables are all random. This is true in the case of modelling spread series as a GBM as well in the case of modelling zero coupon rate series as a (G)BM because zero coupon rates are affine functions of spreads (and spreads are affine functions of zero coupon rates). In the case of modelling spread series as a GBM, the unknown variables can all be taken to be spreads.

Zero Coupon Rate Series Modelled as a (G)BM

First of all, we need to assume not only that each standard maturity zero coupon rate series is "known" at at least one of the specified times $t_0, t_1, \ldots, t_N$ (or, equivalently, at at least one of the specified trading dates), but also that each of these zero coupon rate series is "unknown" at at least one of the specified times. We will see shortly the reason for this latter requirement. This new requirement can always be satisfied by adding, if need be, a new date (and associated time), at which all the zero coupon rates are necessarily "unknown", to the set of specified trading dates.

As before, we calculate the "knowns" and "unknowns" in turn until successive iterates for the "knowns" are equal (that is, until convergence is reached). There are no changes to the method of calculation of the first iterate of the "knowns". There are no changes to the method of calculation of any of the iterates of the "unknowns", given the "knowns", except that they must be based on expected zero coupon rate changes and not on expected zero coupon rates. Suppose that we are to calculate a second or later iterate of the "knowns", given the current estimate of the "unknowns" and the traded bond yields for all issuers and all trading dates. So, at this stage, the "knowns" have unknown values (are unknown) and the "unknowns" have known values (are known). As we showed above, we can express the calibration requirement, depending on the given traded yields, as a set of simultaneous equations whose unknown variables are the standard maturity zero coupon rates. Now some of these zero coupon rates are known (that is, are "unknown") and the others are unknown (that is, are "known"). Thus we get a set of simultaneous equations whose unknown variables are the "known" standard maturity zero coupon rates.

Let us consider a "known" standard maturity zero coupon rate, say $R_{t_i}^{(k)}(m)$ for $m \in \{1, \ldots, \beta^{(k)}\}$. Our assumption above means that the zero coupon rate series $R^{(k)}(m)$ has at least one "unknown". Thus we can choose some $l = l^{(k,i,m)}$ such that $$\neg K(k, \iota, m) \text{ and } |t_l - t_i| = \inf\{|t_j - t_i| | \neg K(k, j, m)\}.$$

Put $s^{(k,i,m)} \stackrel{df}{=} X_{\{\iota<i\}} - X_{\{\iota>i\}}$.

Then, if $R^{(k)}(m)$ is a BM, we have $R_{t_i}^{(k)}(m) = R_{t_l}^{(k)}(m) + s^{(k,i,m)} \Delta(R, k, \min(i,l), \max(i,l), m)$, and, if $R^{(k)}(m)$ is a GBM, we have $R_{t_i}^{(k)}(m) = R_{t_l}^{(k)}(m) \exp(s^{(k,i,m)} \Delta(R, k, \min(i,l), \max(i,l), m))$.

Note that the value of $R_{t_j}^{(k)}(m)$ is known because $R_{t_i}^{(k)}(m)$, is "unknown" ($\neg K(k,l,m)$).

We can then replace each occurrence of an unknown ("known") standard maturity zero coupon rate in the simultaneous equations by an expression involving an unknown zero coupon rate change of the form $\Delta(R,k,\min(i,l),\max(i,l),m)$. In fact, the left hand side of each equation becomes a differentiable function of such unknown zero coupon rate changes. Then, by a process of iterative refinement of affine approximations similar to that used before for the calculation of the "unknowns" in the case of spread modelling (successive spreads or spreads over a base issuer), we can derive the expected values of the unknown zero coupon rate changes. This makes use of the zero coupon rate dynamics. At each step of this iteration, the left hand side of each calibration equation, as a function of the unknown zero coupon rate changes figuring in the equation, is replaced by its affine approximation, depending on the applicable method of interpolation, and we add (to the conditioning) a linearised constraint for each calibration equation. The iteration (the affine approximation loop) requires recalculating, for each calibration equation, the vector of unknown zero coupon rate changes at which to take the affine approximation. We also have "vertical" constraints corresponding to "runs" (where a "run" corresponds to a zero coupon rate which is "unknown" (known) at two distinct trading dates and "known" (unknown) at each intermediate trading date). These "vertical" constraints do not change from one iteration to another of the affine approximation loop. Assuming convergence, we get the non-linear constraints satisfied exactly. The iterative process makes use of the assumed zero coupon rate dynamics as well as the estimates of the "unknown" zero coupon rate values and the traded yields, and handles all issuers and trading dates together. Given the expected values of the unknown zero coupon rate changes and the "unknown" zero coupon rate values, we can then "back out" the next iterate of the "known" zero coupon rate values.

Once the outer loop converges (that is, when successive iterates for the "knowns" are equal), the "knowns" and "unknowns" together determine the calibrated standard maturity curves based on expected zero coupon rate changes. With the new calibration process, there is no version based on expected zero coupon rates (as opposed to expected zero coupon rate changes). Note also that zero coupon curves are not constructed with maturities corresponding to the maturities of traded bonds (unless such maturities happen to be standard maturities) and that the definition of calibrated traded bonds no longer depends on restricting the maturities of the constructed curves.

To simulate calibrated zero coupon rate curves, we can simulate the "unknown" zero coupon rates, given the "knowns" provided by the curves based on expected zero coupon rate changes. Then we can calibrate the "knowns" as shown above, but using the simulated "unknowns" (together with the traded bond yields). Then the simulated "unknowns" together with the calibrated "knowns" derived from them determine the simulated calibrated zero coupon rate curves (which are mutually correlated). This simulation process can be carried out as many times as desired.

Zero Coupon Rate Spread Series Modelled as a GBM

Here we need to assume not only that each standard maturity zero coupon rate spread (successive spread over the base issuer) is "known" (that is, each zero coupon rate figuring in the spread (each leg, say) is "known") at least one of the specified times $t_0, t_1, \ldots, t_N$ (or, equivalently, at at least one of the specified trading dates), but also that each of these spread series has, at at least one of the specified times, each leg "unknown". Note that this is a stronger requirement than that each spread series be "unknown" at at least one of the specified times: we require that, at some time, each leg of the spread be "unknown". This new requirement can always be satisfied by adding, if need be, a new date (and associated time), at which all the zero coupon rates are necessarily "unknown", to the set of specified trading dates.

As before, we calculate the "known" standard maturity zero coupon rates and the "unknown" standard maturity zero coupon rates in turn until successive iterates for the "known" zero coupon rates are equal (that is, until convergence is reached). There are no changes to the method of calculation of the first iterate of the "known" zero coupon rates. There are no changes to the method of calculation of any of the iterates of the "unknown" zero coupon rates, given the "known" zero coupon rates. Suppose that we are to calculate a second or later iterate of the "known" zero coupon rates, given the current estimate of the "unknown" zero coupon rates and the traded bond yields for all issuers and all trading dates. So, at this stage, the "known" zero coupon rates have unknown values (are unknown) and the "unknown" zero coupon rates have known values (are known). As we showed above, we can express the calibration requirement, depending on the given traded yields, as a set of simultaneous equations whose unknown variables are the standard maturity zero coupon rates. But each standard maturity zero coupon rate is an affine function of standard maturity zero coupon rate spreads. So we have, in fact, a set of simultaneous equations whose unknown variables are the standard maturity zero coupon rate spreads. Now some of these spreads are known (that is, their values are determined by the "unknown" zero coupon rates) and the others are unknown (that is, their values are not determined by the "unknown" zero coupon rates). Thus we get a set of simultaneous equations whose unknown variables are the unknown spreads. But by our assumption above, each spread series has, at some trading date, each leg "unknown" (this is not equivalent to each spread series being "unknown" at some trading date). Thus each spread is known at some trading date.

Let us consider an unknown standard maturity zero coupon rate spread, say $S_{t_i}^{(k)}(m)$ for $m \in \{1, \ldots, \beta^{(k)}\}$. First suppose that $k=1$, so that the spread has one leg. Our assumption above means that we can choose some $l = l^{(k,i,m)}$ such that $\neg K(k,l,m)$ and $|t_j - t_i| = \inf\{|t_j - t_i| | \neg K(k,j,m)\}$. Put $$s^{(k,i,m)} \stackrel{df}{=} x_{\{l<i\}} - x_{\{l>i\}}.$$

Then we have $S_{t_i}^{(k)}(m) = S_{t_j}^{(k)}(m) \exp(s^{(k,i,m)} \Delta^*(S,k,\min(i,l),\max(i,l),m))$.

Note that the value of $S_{t_j}^{(k)}(m)$ is known because $S_{t_j}^{(k)}(m) = R_{t_j}^{(k)}(m)$ and $R_{t_i}^{(k)}(m)$ is "unknown" ($\neg K(k,l,m)$). Now suppose that $k>1$, so that the spread has two legs. Then $S^{(k)}(m) = R^{(k)}(m) - R^{(k')}(m)$ for some $k'$. If we are modelling successive spreads, then $k'=k-1$. If we are modelling spreads over a base issuer, then $k'=1$. Our assumption above means that we can choose some $l = l^{(k,i,m)}$ such that $\neg (k,l,m) \wedge \neg K(k',l,m)$ and $|t_j - t_i| \inf\{|t_j - t_i| | \neg K(k,j,m) \wedge \neg K(k',j,m)\}$.

Put $$s^{(k,i,m)} \stackrel{df}{=} x_{\{l<i\}} - x_{\{l>i\}}.$$

Then we have $S_{t_i}^{(k)}(m) = S_{t_j}^{(k)}(m) \exp(s^{(k,i,m)} \Delta^*(S,k,\min(i,l),\max(i,l),m))$. Note that the value of $S_{t_j}^{(k)}(m)$ is known because $R_{t_j}^{(k)}(m)$ and $R_{t_j}^{(k')}(m)$ are both "unknown" ($\neg K(k,l,m) \wedge \neg K(k',l,m)$).

We can then replace each occurrence of an unknown spread in the simultaneous equations by an expression involving an unknown spread change of the form $\Delta^*(S,k,\min(i,l),\max(i,l),m)$. In fact, the left hand side of each equation becomes a differentiable function of such unknown spread changes. Then, by a process of iterative refinement of affine approximations similar to that used before for the calculation of the "unknown" zero coupon rates in the case of spread modelling, we can derive the expected values of the unknown spread changes. In this iteration, the left hand side of each calibration equation, as a function of the unknown spread changes figuring in the equation, is replaced by its affine approximation, and we add (to the conditioning) a linearised constraint for each calibration equation. These linearised constraints need to be recomputed at each step in the iteration. We have "vertical" constraints, corresponding to "runs" of spreads, which do not change from one iteration to another of the affine approximation loop. We also have "horizontal" constraints similar to those used in the calculation of "unknown" zero coupon rates from "known" zero coupon rates, except that here the role that the "known" zero coupon rates played is played by the "unknown" (known) zero coupon rates. Once these "horizontal" constraints are expressed in terms of unknown spread changes, they are non-linear and require affine approximations which need to be recomputed at each step in the iteration. Assuming convergence, we get the non-linear constraints satisfied exactly. Given the expected values of the unknown spread changes and the known spread values, determined by the "unknown" zero coupon rates, we can "back out" the unknown spreads. Then the unknown spreads and the known spreads determine the next iterate of the "known" zero coupon rate values which, together with the "unknown" zero coupon rate values, are calibrated with the traded yields.

Once the outer loop converges (that is, when successive iterates for the "known" zero coupon rates are equal), the "known" and "unknown" zero coupon rates together determine the calibrated standard maturity curves based on expected zero coupon rate changes.

To simulate calibrated zero coupon curves, we can simulate the "unknown" zero coupon rates, given the "known" zero coupon rates provided by the curves based on expected zero coupon rate changes. Then we can calibrate the "known" zero coupon rates as shown above, but using the simulated "unknown" zero coupon rates (together with the traded bond yields). Then the simulated "unknown" zero coupon rates together with the calibrated "known" zero coupon rates derived from them determine the simulated calibrated zero coupon rate curves. This simulation process can be carried out as many times as desired.

In practice, we will need to make the additional assumption that, for any given issuer, maturity bucket and trading date, there is at most one traded bond of the given issuer whose trading date is the given trading date and whose maturity falls in the given maturity bucket. The reason for this assumption is, essentially, that one factor (the standard maturity zero coupon rate, at the given trading date, for the given issuer and maturity bucket) is, in general, inadequate to explain variation that may be multidimensional. This assumption is applicable both in the case where zero coupon rate series are modelled as a (G)BM and in the case where spread series are modelled as a GBM.

Mean Reversion

The stochastic differential equation for a one-dimensional mean-reverting Brownian Motion is $X=(X_t)_{t \in R}$, is $dX_t=(\mu - \alpha X_t)dt + \sigma dW_t$, where $\mu$ is the long term average, per unit interval of time, of the process increments, $\alpha \geq 0$ is the speed of mean-reversion and $\sigma \geq 0$ is the standard deviation, per unit interval of time, of the process increments, and $W=(W_t)_{t \in R}$ is a standard Brownian Motion (mean zero, variance one). This generalises the notion of a Brownian Motion (take $\alpha=0$ to get a Brownian Motion with mean $\mu$ and variance $\sigma^2$ per unit interval of time). In the case where $\alpha>0$, $$\frac{\mu}{\alpha}$$

is called the level of mean reversion.

A one-dimensional mean-reverting Geometric Brownian Motion is a stochastic process of the form $\exp(X)$ where $X=(X_t)_{t \in R}$ is a mean-reverting Brownian Motion. This generalises the notion of a Geometric Brownian Motion.

See Kloeden P., Platen E., Numerical Solution of Stochastic Differential Equations, Springer-Verlag, 1992, where the terminology used is normal mean-reverting process for mean-reverting Brownian Motion and lognormal mean-reverting process for mean-reverting Geometric Brownian Motion.

One can extend these notions to the case of several dimensions.

Let X be a one-dimensional mean-reverting Brownian Motion. Given $X_t$, the value of X at time t, there are formulae for the mean and variance of $X_{t+\Delta t}$ for $\Delta t>0$. This requires the evaluation of stochastic integrals. One can show that the process increment $X_{t+\Delta t}-X_t$ is normally distributed, conditional on the known value for $X_t$. Then $X_{t+\Delta t}$ is also normally distributed, conditional on the known value for $X_t$.

In the case of higher-dimensional mean-reverting Brownian Motions, one can show that given the vector of values of the processes at time t, the vector of process increments over the time interval [t, t+$\Delta$t] is multivariate normal.

Corresponding results can be shown for mean-reverting Geometric Brownian Motions.

Suppose we have incomplete rate data, for a mean-reverting Brownian Motion in several dimensions, at several points in time. Suppose also that each rate is known at at least one point in time. We can choose one known rate, say, the first known, for each rate series. We can then calculate the multivariate normal distribution of the rate changes, for the several rate series and the time intervals determined by successive points in time, conditional on these known rates (exactly one per rate series). This distribution plays the role that the unconditional distribution of rate changes played earlier for non-mean-reverting Brownian Motions. We can then use all the incomplete rate data to determine known and unknown rate changes and calculate the multivariate normal distribution of the unknown rate changes conditional on the known rate changes taking their known values as we did before. We can then fill the unknown rates as we did before for non-mean-reverting Brownian Motions.

This analysis is easily adapted to mean-reverting Geometric Brownian Motions and can be carried through to the application to modelling zero coupon rate curves. It is straight-forward to combine mean-reverting Brownian Motions and mean-reverting Geometric Brownian Motions.

Unconditional Serial Correlation

We now show how the assumption of the existence of a Brownian Motion in several dimensions can be weakened to allow for unconditional serial correlation of rate changes. Note that the Brownian Motion assumption implies that rate changes in several dimensions are serially uncorrelated and, in fact, are serially independent. We suppose, as before, that we have several rate series, a number of specified points in time and a set of incomplete rate data and that each rate series has a known value at at least one of the specified points in time. We also suppose that we have, for each rate series, a specification of its parametric model type as normal or lognormal. These are both parametric probability distributions: a random variable is lognormally distributed if the natural logarithm of the random variable is normally distributed. This corresponds to our former specification of parametric model types (Brownian Motion/Geometric Brownian Motion) for the several rate series. If a rate series is specified as normal, then its rate changes are understood to be differences of rates. If a rate series is specified as be lognormal, then its rate changes are understood to be differences of natural logarithms of rates. We then suppose that the random vector of all rate changes over single time intervals is unconditionally multivariate normal, a single time interval being understood to mean a time interval determined by consecutive specified points in time, and that the parameters of the unconditional multivariate normal distribution are specified. This requires a specification of the unconditional mean for each rate change over a single time interval and a specification of the unconditional covariance for each pair of rate changes over single, possibly different, time intervals, or one could specify unconditional correlations and unconditional standard deviations and calculate the unconditional covariances. Then the rest of the analysis, including the application to modelling zero coupon rate curves, can be carried through except that any simplifications of formulae that were justified by the Brownian Motion assumption are not made if they are not justified by the weakened assumptions.

INDUSTRIAL APPLICABILITY

The present invention provides commercial value in the field of financial modelling. It may be used to provide more accurate input rate data for the historical or Monte Carlo simulation of portfolio values and for the more accurate pricing (and hedging) of individual financial instruments or of portfolios of financial instruments. These applications are important to investment banks and other financial institutions for assessing the values of deals and trading portfolios and for measuring the risks arising out of deals and trading portfolios. More accurate methods of assessing value have direct effects on the profitability of trading activities. More accurate methods of measuring risk-permit more effective management of risk and more efficient allocation of risk capital.

The present invention allows missing rates in historical rate series to be filled in a manner that is statistically consistent with observed rates. In a historical simulation, rate changes derived from filled historical rate series are used to simulate future values of trading portfolios which, in turn, are used to derive measures of the credit and market risk of the trading portfolios. More accurate methods of filling historical rate data lead to more accurate measures of risk.

Monte Carlo simulations of the credit or market risk of trading portfolios are normally based on complete sets of current rates. The present invention allows Monte Carlo simulations to be based on incomplete sets of recent rates. A further advantage of the present invention is that it allows the modelling of value and risk to be based on specific hypotheses or scenarios concerning the future levels of rates. This allows greater refinement in the so-called "stress testing" of portfolios where the impact of specific adverse rate scenarios on portfolio values is analysed.

The present invention may also be used for the more accurate pricing (and hedging) of financial instruments. Unobserved input rates required for pricing models may be estimated or simulated in a manner that takes account of other rates, possibly observed at other times. For example, to value an option of some given maturity that has not recently traded, the option's implied volatility may be estimated or simulated from the calculated implied volatilities of recently traded options (on the same asset) of possibly different maturities. Note that the implied volatility of a traded option is the volatility, over the life of the option, of the price of the underlying asset of the option which, when used as the input in an option pricing model, gives a fair value equal to observed market price of the option. Another possibility for valuing options and other types of derivative financial instruments is to use the conditional rate dynamics based on an incomplete set of recent rates to simulate contingent pay-offs. Simulated pay-offs would allow the estimation of the expected value of a pay-off and this could be discounted to the present using the appropriate risk-free rate to provide a fair value. This approach would require a shift from the real world dynamics to risk-neutral dynamics.

The present invention may also be used to validate data used for pricing and risk analysis. The detection and removal of spurious data contribute to the integrity of systems for pricing and risk management.

The present invention also has potential application to time series other than the rate series of financial markets.

It will be appreciated by persons skilled in the art that many variations and/or modifications may be made to the invention as shown in the specific embodiments without departing from the spirit or scope of the invention as broadly described. The present embodiments are, therefore, to be considered in all respects as illustrative and not restrictive.

It is noted that the present invention can be expressed as a computer program or software to cause a computer to perform the method. The computer program can have data input means to receive the assumed unconditional dynamics or unconditional distribution, as appropriate, and the incomplete rate data or traded bond data, as appropriate. The computer program can have data output means to output the modelled values. The computer program can have the modelling engine to carry out the steps defined by the method.

It is also noted that the term conditional zero coupon rate dynamics is used to denote the zero coupon rate dynamics implied by the unconditional zero coupon rate dynamics and the traded bond data (specified bond trades).

Further, it is noted that in Australia, the base issue may be chosen to be the Commonwealth of Australia. For each pair of issuers, the maturities of the specified zero coupon rate series for the two issuers can correspond.

Specifying the unconditional dynamics of the zero coupon rate spreads series as Geometric Brownian Motion ensures that modelled zero coupon rate spreads are positive, which can accord with assumptions made about the relative credit quality of the issuers. Zero coupon rate curve may include maturity points corresponding to the maturities of the traded bonds whose issuers and trading dates are associated with the curve.

The term conditional zero coupon rate dynamics can be used to denote the zero coupon rate dynamics implied by the unconditional zero coupon rate spread dynamics and the traded bond data (specified bond trades). For example, the step of populating the unknown rates with simulated values may be carried out by taking a random drawing from the multidimensional conditional probability distribution of the unknown rate changes and then inferring the simulated values from the random drawing of the unknown rate changes and the known rate values.

It is noted that rate dynamics is understood to mean a probabilistic model of how rate series change in value over time. Further, the term conditional rate dynamics denotes the rate dynamics implied by the unconditional rate dynamics and the known rate values.

The dimension of the problem as solved in the present method grows quickly and geometrically as both the number of rate series and the number of specified times increase. Although the assumption of Brownian motion or geometric Brownian motion implies that the rate changes in several dimensions are unconditionally serially independent, that does not mean that the rate changes in several dimensions are not conditionally serially dependent. The method of modelling may be viewed as an exercise in unraveling the nature of such multidimensional serial dependence.

What I claim is:

1. A system for generating a model of unknown values of one or more rate series at specified times for use in analyses based on the modelled unknown values, the one or more rate series having, at the specified times, unconditional rate dynamics characterized by a defined parametric model type, each rate series having at least one known value, the system comprising at least one computing device configured to:
   receive input indicative of the defined parametric model type;
   receive input indicative of a known or unknown rate value for each rate series and for each specified time;
   generate the values of the known rate changes;
   generate an unconditional probability distribution of the known and unknown rate changes;
   generate a probability distribution of the unknown rate changes conditional on the known rate changes taking their known values; and
   provide an output constituting the model or values derived therefrom.

2. A system according to claim 1 wherein the specified times are uniformly spaced and the defined parametric model type does not depend on the known rate values.

3. A system according to claim 1 wherein the computing device is configured to generate marginal probability distributions of the unknown rate values conditional on the known rates taking their known values, and the marginal probability distributions of the unknown rates are generated by the computing device from the generated conditional probability distribution of the unknown rate changes and from the known rate values.

4. A system according to claim 1 further comprising:
   populating the unknown rates with numerical values such that the rate changes arising out of the known rate values and the populated unknown rate values take expected values conditional on the known rates taking their known values; or
   populating the unknown rates with expected values conditional on the known rates taking their known values; or
   populating the unknown rates with simulated values being conditional on the known rates taking their known values.

5. A system according to claim 4 wherein
   populating the unknown rates is effected using the conditional probability distribution of the unknown rate changes and the known rate values; and
   populating the unknown rates with simulated values is effected by taking a random drawing from the conditional probability distribution of the unknown rate changes and then deriving the simulated values from the random drawing of the unknown rate changes and the known rate values.

6. A system according to claim 1 wherein the time underlying the defined parametric model type is calendar time, trading time or other preferred time system, wherein trading time is derived from calendar time by excising non-trading periods from the time continuum, and wherein, when the time underlying the defined parametric model type is taken to be trading time, the computing device is configured to receive input indicative of the length in trading days of each interval of calendar time.

7. A system according to claim 1 and configured to generate a model of the dynamics of one or more specified zero coupon rate series of one or more bond issuers at specified trading dates conditional on specified trades in bonds of the issuers for use in analyses based on the modelled dynamics, the specified zero coupon rate series each having one or more specified standard maturities and the standard maturity zero coupon rate series having, at the specified trading dates, unconditional dynamics characterised by a defined parametric model type, wherein the computing device is configured to:
   receive input indicative of the defined parametric model type;
   receive input indicative of the trades in the bonds of the one or more issuers;
   iteratively generate the dynamics of the specified zero coupon rate series at the specified trading dates conditional on the specified trades in the bonds of the one or more issuers; and
   provide an output constituting the model or values derived therefrom.

8. A system according to claim 7 wherein the specified trading dates are uniformly spaced and the defined parametric model type does not depend on the specified bond trades.

9. A system according to claim 7 further comprising, for each issuer, configuring the computing device to receive input indicative of a bond pricing function and, for zero coupon rates of the given issuer, an interpolation function, a compounding frequency and a notional number of days in the year.

10. A system according to claim 7 wherein the parameters of the defined parametric model type are determined from historically observed trades in bonds of the one or more issuers.

11. A system according to claim 7 wherein each trade in the bonds of the one or more issuers inputted into the computing device is assigned a trading date, an issuer, a settlement date, a maturity date, a coupon rate, a coupon frequency and a traded yield and, for each issuer and each specified trading date, the maturities of the traded bonds of the given issuer that traded on the given trading date are distinct.

12. A system according to claim 7 wherein, for each specified standard maturity zero coupon rate series, there is specified a trading date such that a specified bond trade exists having an assigned trading date being the given trading date, an assigned issuer being that of the given standard maturity zero coupon rate series and an assigned maturity being close to that of the given standard maturity zero coupon rate series.

13. A system according to claim 7 comprising configuring the computing device to iteratively generate, for each issuer and for each specified trading date, an expected value of a zero coupon rate curve being conditional on the specified bond trades in the bonds of the one or more issuers, or a zero coupon rate curve comprising zero coupon rates having values being modes conditional on the specified trades in the bonds of the one or more issuers, or a simulated zero coupon rate curve being conditional on the specified trades in the bonds of the one or more issuers.

14. A system according to claim 13 wherein a generated zero coupon rate curve includes maturity points additional to the maturities of the specified standard maturity zero coupon rate series of the issuer being associated with the curve and includes maturity points corresponding to the maturities of the traded bonds having issuers and trading dates being associated with the curve.

15. A system according to claim 13 wherein each generated zero coupon rate curve is calibrated against the bond trades having assigned issuers and trading dates being associated with the curve, and covariance effects arising out of trades in bonds of other issuers at other trading dates are incorporated.

16. A system according to claim 7 wherein the time underlying the defined parametric model type is measured as calendar time or as trading time or other preferred time system, and the computing device is configured to receive input specifying the length in trading days of each interval of calendar time when the time underlying the defined parametric model type is trading time.

17. A system according to claim 1 and configured to generate a model of the dynamics of one or more specified zero coupon rate series of one or more bond issuers at specified trading dates conditional on specified trades in bonds of the one or more issuers for use in analyses based on the modelled dynamics, the specified zero coupon rate series each having one or more specified standard maturities and the number of specified standard maturity zero coupon rate series of each issuer being equal and the specified standard maturity zero coupon rate series determining standard maturity zero coupon rate spread series having, at the specified trading dates, unconditional dynamics characterised by a defined parametric model type, wherein the computing device is configured to:
   receive input indicative of the defined parametric model type;
   receive input indicative of the trades in the bonds of the one or more issuers;
   iteratively generate the dynamics of the specified zero coupon rate series at the specified trading dates conditional on the specified trades in the bonds of the one or more issuers; and provide an output constituting the model or values derived therefrom.

18. A system according to claim 17 wherein the specified trading dates are uniformly spaced and the defined parametric model type does not depend on the specified trades.

19. A system according to claim 17 wherein the computing device is configured to receive input indicative of, for each issuer, a bond pricing function and, for zero coupon rates of the given issuer, an interpolation function, a compounding frequency, and a notional number of days in the year.

20. A system according to claim 17 wherein one of the one or more bond issuers is specified as the base issuer having at all times a higher credit quality than the other issuers; and
   the determined standard maturity zero coupon rate spread series comprise the specified standard maturity zero coupon rate series for the base issuer and, for each issuer other than the base issuer and for each specified standard maturity zero coupon rate series for the given issuer, the difference between the specified standard maturity zero coupon rate series and the corresponding specified standard maturity zero coupon rate series for the base issuer where the correspondence depends on the ordering of the standard maturity zero coupon rate series by their associated maturities; or
   the one or more bond issuers are ordered in descending order of credit quality, and the determined standard maturity zero coupon rate spread series comprise the specified standard maturity zero coupon rate series for the base issuer and, for each issuer other than the base issuer and for each specified standard maturity zero coupon rate series for the given issuer, the difference between the given standard maturity zero coupon rate series and the corresponding specified standard maturity zero coupon rate series for the previous issuer in the ordering of issuers by credit quality where the correspondence depends on the ordering of the standard maturity zero coupon rate series by their associated maturities.

21. A system according to claim 17 wherein the parameters of the defined parametric model type are determined from historically observed trades in bonds of the one or more issuers.

22. A system according to claim 17 wherein each trade in the bonds of the one or more issuers inputted into the computing device is assigned a trading date, an issuer, a settlement date, a maturity date, a coupon rate, a coupon frequency and a traded yield, and, for each issuer and each specified trading date, the maturities of the traded bonds of the given issuer that traded on the given trading date are distinct.

23. A system according to claim 17 wherein, for each standard maturity zero coupon rate spread series determined by the specified standard maturity zero coupon rate series, there is a specified trading date such that for each standard maturity zero coupon rate series in the given standard maturity zero coupon spread series, a specified bond trade exists having an assigned trading date being the given trading date, an assigned issuer being that of the given standard maturity zero coupon rate series and an assigned maturity being close to that of the given standard maturity zero coupon rate series.

24. A system according to claim 17 wherein the computing device is configured to iteratively generate, for each issuer and for each specified trading date, a zero coupon rate curve comprising zero coupon rates having values being modes conditional on the specified trades in the bonds of the one or more issuers or a simulated zero coupon rate curve being conditional on the specified trades in the bonds of the one or more issuers.

25. A system according to claim 24 wherein each generated zero coupon rate curve includes maturity points additional to the maturities of the specified standard maturity zero coupon rate series of the issuer being associated with the curve and includes maturity points corresponding to the maturities of the traded bonds having issuers and trading dates being associated with the curve.

26. A system according to claim 24 wherein each generated zero coupon rate curve is calibrated against the bond trades having assigned issuers and trading dates being associated with the curve, and covariance effects arising out of trades in bonds of other issuers at other dates are incorporated.

27. A system according to claim 1 configured to detect the known values, of one or more rate series at specified times, that are extreme, the one or more rate series having, at the specified times, unconditional dynamics characterized by a defined parametric model type, wherein the computing device is configured to:
   receive input indicative of the defined parametric model type;
   receive input indicative of a known or unknown rate value for each rate series and for each specified time;
   receive input indicative of a subset of the known rates comprising those that are to be accepted without question;
   receive input indicative of a confidence level and configuring the computer to generate, for each known rate that is not to be accepted without question and for each subset of the known rates that does not include the given known rate and that includes the known rates that are to be accepted without question, a confidence interval, based on the given confidence level, for the given rate conditional on the rates belonging to the given subset taking their known values;

iteratively generate a subset of the known rates that are not to be accepted without question such that, for each rate belonging to the subset, the value of the rate does not lie within the confidence interval, based on the given confidence level, generated for the rate conditional on the known rates which do not belong to the subset taking their known values, and for each known rate that does not belong to the subset and that is not to be accepted without question, the value of the rate lies within the confidence interval, based on the given confidence level, generated for the rate conditional on the values of the known rates which do not belong to the subset, with the exception of the given known rate; and provide an output constituting the rate values that are extreme at the given confidence level.

28. A system according to claim 27 wherein the rate values are known for all rate series and for all specified times, and the subset of the known rates comprising those that are to be accepted without question is chosen to be empty.

29. A system according to claim 27, wherein the at least one computing device is further configured to:

rely on the marginal probability distribution of a known rate to generate a confidence interval, based upon the given confidence level, for the given rate conditional on the rates belonging to the given subset taking their known values;

wherein a confidence interval is generated for each known rate that is not to be accepted without question and for each subset of the known rates that includes the known rates that are to be accepted without question and does not include the given rate.

30. A system according to claim 1 configured to generate a model of the dynamics of one or more rate series at specified times conditional on specified observed values of the rate series for use in analyses based on the output model, each rate series being a function of one or more variables and having one or more specified standard values of each variable and the rate series having for all combinations of specified standard values of the variables, at the specified times, unconditional dynamics characterised by a defined parametric model type, wherein the computing device is configured to:

receive input indicative of the defined parametric model type;

receive input indicative of the observed values of the specified rate series;

iteratively generate the dynamics of the specified rate series at the specified times conditional on the specified observed values of the rate series; and provide an output constituting the model or values derived therefrom.

31. A system according to claim 30 wherein the specified times are uniformly spaced and the defined parametric model type does not depend on the observed values of the rate series.

32. A system according to claim 30 wherein the parameters of the defined parametric model type are determined from historically observed values of the rate series.

33. A system according to claim 30 wherein each of the inputted observed values of the specified rate series is assigned a time, a value for each of the one or more variables, and a numeric value.

34. A system according to claim 30 wherein, for each specified rate series and for each combination of standard values of the variables, there is a specified time such that a specified observed value of the given rate series exists having an assigned time being the given time and having an assigned value of each variable being close to the standard value of the variable in the given combination of standard values of the variables, and the system further comprises configuring the computing device to receive input indicative of an interpolation function for each specified rate series.

35. A system according to claim 30 wherein the time underlying the defined parametric model type is calendar time, trading time or other preferred time system, and wherein, if the time underlying the defined parametric model type is trading time, the computing device is configured to receive input specifying the length in trading days of each interval of calendar time.

36. A system according to claim 30 wherein the computing device is configured to iteratively generate, for each specified rate series and each specified time, a set of values for the rate series comprising rates having values being expected values conditional on the inputted observed values of the rate series, a set of values for the rate series comprising rates having values being modes conditional on the inputted observed values of the rate series, or a set of values for the rate series comprising rates being simulated values conditional on the inputted observed values of the rate series.

37. A system according to claim 36 wherein each generated set of rates is calibrated against the inputted observed values having rate series and times being associated with the set of rates, and incorporates covariance effects arising out of the observed values of all the specified rate series at all the specified times, wherein a generated set of rates includes rates at combinations of values of the variables additional to the combinations of standard values of the variables specified for the rate series being associated with the set of rate and includes combinations of values of the variables corresponding to those associated with the inputted observed values having rate series and times being associated with the set of rates.

38. A method of generating a model of unknown values of one or more rate series at specified times for use in analyses based on the modelled unknown values, the one or more rate series having, at the specified times, unconditional rate dynamics characterised by a defined parametric model type, each rate series having at least one known value, the method comprising:

specifying the defined parametric model type;

specifying a known or unknown rate value for each rate series and for each specified time;

generating values of the known rate changes;

generating an unconditional probability distribution of the known and unknown rate changes;

generating a probability distribution of the unknown rate changes conditional on the known rate changes taking their known values; and providing an output constituting the model or values derived therefrom.

39. A method according to claim 38 of generating a model of the dynamics of one or more specified zero coupon rate series of one or more bond issuers at specified trading dates conditional on specified trades in bonds of the issuers for use in analyses based on the modelled dynamics, the one or more specified zero coupon rate series each having one or more specified standard maturities and the standard maturity zero coupon rate series having, at the specified trading dates, unconditional dynamics characterised by a defined parametric model type, the method comprising:

specifying the defined parametric model type;
specifying trades in the bonds of the one or more issuers;
iteratively generating the dynamics of the specified zero coupon rate series at the specified trading dates conditional on the specified trades in the bonds of the one or more issuers; and
providing an output constituting the model or values derived therefrom.

40. A method according to claim 38 of generating a model of the dynamics of one or more specified zero coupon rate series of one or more bond issuers at specified trading dates conditional on specified trades in bonds of the one or more issuers for use in analyses based on the modelled dynamics, the specified zero coupon rate series having one or more specified standard maturities and the number of specified standard maturity zero coupon rate series of each issuer being equal and the specified standard maturity zero coupon rate series determining standard maturity zero coupon rate spread series having, at the specified trading dates, unconditional dynamics characterised by a defined parametric model type, the method comprising:
specifying the defined parametric model type;
specifying the trades in the bonds of the one or more issuers into the computing device;
iteratively generating the dynamics of the specified zero coupon rate series at the specified trading dates conditional on the specified trades in the bonds of the one or more issuers; and
providing an output constituting the model or values derived therefrom.

41. A method according to claim 38 of detecting the known values, of one or more rate series at specified times, that are extreme, the one or more rate series having, at the specified times, unconditional dynamics characterised by a defined parametric model type, the method comprising:
specifying the defined parametric model type;
specifying a known or unknown rate value for each rate series and for each specified time;
specifying a subset of the known rates comprising those that are to be accepted without question;
specifying a confidence level and generating, for each known rate that is not to be accepted without question and for each subset of the known rates that does not include the given known rate and that includes the known rates that are to be accepted without question, a confidence interval, based on the given confidence level, for the given rate conditional on the rates belonging to the given subset taking their known values;
iteratively generating a subset of the known rates that are not to be accepted without question such that, for each rate belonging to the subset, the value of the rate does not lie within the confidence interval, based on the given confidence level, constructed for the rate conditional on the known rates which do not belong to the subset taking their known values, and for each known rate that does not belong to the subset and that is not to be accepted without question, the value of the rate lies within the confidence interval, based on the given confidence level, generated for the rate conditional on the values of the known rates which do not belong to the subset, with the exception of the given known rate; and
providing an output constituting the rate values that are extreme at the given confidence level.

42. A method according to claim 38 of generating a model of the dynamics of one or more specified rate series at specified times conditional on specified observed values of the rate series for use in analyses based on the model, each rate series being a function of one or more variables and each variable having one or more specified standard values, and the rate series having for all combinations of specified standard values of the variables, at the specified times, unconditional dynamics characterised by a defined parametric model type, the method comprising:
specifying the defined parametric model type;
specifying the observed values of the specified rate series;
iteratively generating the dynamics of the specified rate series at the specified times conditional on the specified observed values of the rate series; and
providing an output constituting the model or values derived therefrom.

43. A computer program product comprising a computer useable medium including a computer readable program, wherein the computer readable program, when executed on a computer causes the computer to:
generate a model of unknown values of one or more rate series at specified times for use in analyses based on the modelled unknown values, the one or more rate series having, at the specified times, unconditional dynamics characterised by a defined parametric model type, each rate series having at least one known value, wherein the computer readable program causes the computer to generate the model by:
receiving the defined parametric model type of the unconditional rate dynamics;
receiving a known or unknown rate value for each rate series and for each specified time;
generating the values of the known rate changes;
generating an unconditional probability distribution of the known and unknown rate changes;
generating a probability distribution of the unknown rate changes conditional on the known rate changes taking their known values; and
providing an output from the computer constituting the model or values derived therefrom.

44. A system according to claim 15 wherein, for each generated zero coupon rate curve and for each bond trade having assigned issuer and trading date being associated with the curve, the bond price derived from the curve by employing the method of interpolation specified for the issuer assigned to the curve equals the bond price derived by applying to the traded yield specified for the bond trade the bond pricing function specified for the same issuer.

45. A system according to claim 26 wherein, for each generated zero coupon rate curve and for each bond trade having assigned issuer and trading date being associated with the curve, the bond price derived from the curve by employing the method of interpolation specified for the issuer assigned to the curve equals the bond price derived by applying to the traded yield specified for the bond trade the bond pricing function specified for the same issuer.

46. A system according to claim 15 wherein, for each generated zero coupon rate curve and
for each bond trade having assigned issuer and trading date being associated with the curve, the bond price derived from the restriction of the curve to maturities not greater than the maturity specified for the bond trade by employing the method of interpolation specified for the issuer assigned to the curve equals the bond price derived by applying to the traded yield specified for the bond trade the bond pricing function specified for the same issuer.

47. A system according to claim 26 wherein, for each generated zero coupon rate curve and for each bond trade having assigned issuer and trading date being associated with the curve, the bond price derived from the restriction of the curve to maturities not greater than the maturity specified for the bond trade by employing the method of interpolation specified for the issuer assigned to the curve equals the bond price derived by applying to the traded yield specified for the bond trade the bond pricing function specified for the same issuer.

* * * * *